(12) United States Patent
Galli

(10) Patent No.: US 11,920,211 B2
(45) Date of Patent: Mar. 5, 2024

(54) METHOD FOR OBTAINING CONCENTRATED BRINE OF MINIMUM IMPURITY CONTENT FROM BRINE FOUND IN NATURAL SALT FLATS AND SALT MARSHES, SAID METHOD HAVING MINIMUM ENVIRONMENTAL IMPACT AND MAXIMUM LITHIUM RECOVERY

(71) Applicant: Daniel Ernesto Galli, San Salvador de Jujuy (AR)

(72) Inventor: Daniel Ernesto Galli, San Salvador de Jujuy (AR)

( * ) Notice: Subject to any disclaimer, the term of this patent is extended or adjusted under 35 U.S.C. 154(b) by 262 days.

(21) Appl. No.: 16/626,819

(22) PCT Filed: Jun. 27, 2018

(86) PCT No.: PCT/ES2018/070460
§ 371 (c)(1),
(2) Date: Mar. 23, 2020

(87) PCT Pub. No.: WO2019/002653
PCT Pub. Date: Jan. 3, 2019

(65) Prior Publication Data
US 2023/0313338 A1    Oct. 5, 2023

Related U.S. Application Data

(60) Provisional application No. 62/525,024, filed on Jun. 26, 2017.

(51) Int. Cl.
*C22B 26/12* (2006.01)
*C22B 3/20* (2006.01)

(52) U.S. Cl.
CPC ............... *C22B 26/12* (2013.01); *C22B 3/20* (2013.01)

(58) Field of Classification Search
CPC .................................. C22B 26/12; C22B 3/20
See application file for complete search history.

(56) References Cited

U.S. PATENT DOCUMENTS 4,271,131 A * 6/1981 Brown .................. C01D 15/04
423/166

FOREIGN PATENT DOCUMENTS

| CN | 1398785 A | 2/2003 |
| CN | 102099296 A | 6/2011 |
| WO | 2013049952 A1 | 4/2013 |
| WO | 2014/078908 A1 | 5/2014 |

OTHER PUBLICATIONS

International Search Report issued in corresponding International Application No. PCT/ES2018/070460 dated Nov. 6, 2018 (2 pages).
Written Opinion issued in corresponding International Application No. PCT/ES2018/070460 dated Nov. 6, 2018 (5 pages).
Office Action issued in corresponding CN Application No. 201880055506.9 with English translation dated Jan. 19, 2022 (18 pages).

* cited by examiner

*Primary Examiner* — Yong L Chu
(74) *Attorney, Agent, or Firm* — Osha Bergman Watanabe & Burton LLP

(57) ABSTRACT

A procedure of minimum environmental impact and maximum lithium recovery for obtaining concentrated brines with minimal impurity content from brines that embed natural salt flats and salt marshes, the procedure wherein the following stages are comprised: a) building fractional crystallization ponds by solar evaporation; b) filling the ponds with natural brine; c) initially pre-concentrating natural brine to the maximum possible lithium concentration in the liquid phase without precipitating lithium-containing salts; d) cooling the pre-concentrated brine obtained in c) ensuring maximum precipitation of salts containing sulfate anion; e) chemically pre-treating the liquid phase of brine separated from precipitated salts by cooling to minimize sulfate anions in the liquid phase after cooling; f) finally pre-concentrating the pre-treated liquid phase to the maximum possible lithium concentration in it without precipitating lithium-containing salts; g) chemically treating the liquid phase of brine separated from precipitated salts at the stage f) to minimize the concentration of magnesium, calcium, boron and sulfate in the liquid phase; and h) concentrating the liquid phase obtained at the stage g).

23 Claims, 12 Drawing Sheets

METHOD FOR OBTAINING CONCENTRATED BRINE OF MINIMUM IMPURITY CONTENT FROM BRINE FOUND IN NATURAL SALT FLATS AND SALT MARSHES, SAID METHOD HAVING MINIMUM ENVIRONMENTAL IMPACT AND MAXIMUM LITHIUM RECOVERY

FIELD OF THE INVENTION

This invention is related to the extraction and processing of natural brines that saturate the evaporitic sediments of chemical and clastic origin, which make up different types of aquifers developed in the salt bodies of, for example, the Argentine Puna, the Bolivian Altiplano and the Atacama Desert. In particular, it refers to a maximum recovery method and minimum environmental impact to obtain brines with a lithium ion concentration of approximately 80 g/dm$^3$, with minimum impurity content, an attribute that becomes them chemically appropriate for obtaining high purity lithium compounds. More particularly, this invention also comprises a recovery method and minimum environmental impact to obtain other salts of interest for use in agriculture, livestock and industry.

BACKGROUND OF THE INVENTION

In particular, salt flats and salt marshes of the Argentine Puna, Bolivian Altiplano and Atacama Desert are deposits that lie in endorheic basins that functioned as a receptacle of insoluble material inputs and liquids from the tectone-volcanic framework. These inputs accumulated as chemical evaporitic sediments and clastic sediments, where groundwater reservoirs are developed, consist of brine carrying a wide variety of ions. As a result of this accumulation process, a same salt body may contain one or more free, semi-confined and/or confined aquifers, which may or may not be interconnected and may also have different permeability for the liquid phase, i.e. interstitial brine, to circulate through them more or less easily.

Due to the accumulation of chemical sediments, these salt bodies carry important reserves of solid minerals of interest, such as ulexite, tincal, colemanite, mirabilite, thenardite, halite and others. In addition, the brine that occupies the interstitial space of aquifers, is a dense and virtually neutral and homogeneous sodium chloride solution, which may include other anions such as sulfate, borates, carbonate or bicarbonate and other cations such as potassium, lithium, magnesium, calcium, barium, strontium, iron, rubidium and caesium. The concentration of ions in the brine contained in the aquifers is the result of the balance between the recharge which was received and is received, and what is lost by evapotranspiration and/or discharges that occur with other types of higher or lower aquifers and/or drainage to other hydrogeological sub-basins. This explains the different chemism the aforementioned salt bodies have, which are clearly complex, dynamic and fragile hydrogeological systems.

As described, it is very important that the extraction and processing of brines contained in these salt bodies minimize the impact of the disturbances that will necessarily occur as a result of: (i) the extraction of brine by pumping; (ii) the use of reagents; and (iii) the handling and final disposal of effluents. Experience teaches that the processes that meet these requirements are those that aim to achieve maximum recovery with minimum environmental impact, giving priority to the natural separation of the chemical species of interest, minimizing the use of reagents and minimizing the use of primary non-renewable energy sources by giving priority to the use of renewable energy resources and available weather conditions where salt flats and salt marshes are located.

The mining resources contained in salt bodies are non-renewable natural resources because their natural availability, which is a measurable and quantifiable concept, decreases as their extraction evolves. Then, in addition to the extraction and processing process that is applied complies with what is specified in the previous paragraph, other necessary conditions must be met to ensure the sustainability of the operation over time. These other conditions are: giving priority to the use of Human Resources of populations close to the site of deposit and making the necessary forecasts for future generations to have the financial means to resolve the problems that may lead to the exploitation of non-renewable natural resources.

The current interest in obtaining lithium compounds has led to the start of several projects aimed at the extraction of lithium contained mainly in the salt flats and salt marshes of the Argentine Puna, Bolivian Altiplano and Atacama Desert in Chile. Among the main reasons for this interest in lithium, the following reasons are highlighted:

I. It is used in a wide variety of industrial applications such as raw material for the manufacture of earthenware, glass, porcelain, enamel and others.

II. It is used in the manufacture of high-density energy accumulators that are used as:
 a way of accumulating energy from non-permanent renewable sources such as solar, wind, tidal energy, etc.;
 key components of portable devices;
 a way of accumulating energy during low demand periods for later use;
 solution where there is no primary energy source.

III. The possibility of using high density energy accumulators in electric vehicles will allow for greater efficiency in the use of primary energy sources and a considerable reduction in the emission of Greenhouse Gases (GHGs) in urban areas.

IV. It is precursor to tritium, a hydrogen isotope used in energy generation through nuclear fusion:

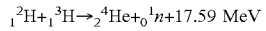
$$_1^2H + {}_1^3H \rightarrow {}_2^4He + {}_0^1n + 17.59 \text{ MeV}$$

The fusion of deuterium and tritium is the most promising of hydrogen fusion reactions, but tritium does not occur in nature, as it has a half-life of approximately 10 years. The most promising source of tritium appears to be the reproduction of tritium from lithium-6, by the neutron bombardment in the reaction:

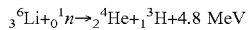
$$_3^6Li + {}_0^1n \rightarrow {}_2^4He + {}_1^3H + 4.8 \text{ MeV}$$

V. Lithium salts, particularly lithium carbonate and lithium citrate, are used in the treatment of mania and bipolar depression. It's a mood stabilizer.

VI. Lithium chloride and lithium bromide have a high hygroscopicity so they are excellent drying agents.

VII. Lithium stearate is a general-purpose lubricant in high temperature applications.

VIII. Lithium is a highly used agent in the synthesis of organic compounds.

IX. Lithium hydroxide is used in spacecrafts and submarines to purify air by extracting carbon dioxide.

X. It is a common component of aluminum, cadmium, copper and manganese alloys used in aeronautical construction, and it has been successfully used in the manufacture of ceramics and lenses such as those of telescopes.

But lithium is not the only species of interest contained in natural brines. Depending on the chemical composition and the extraction and processing procedure that is applied, it is also possible to obtain the following products:

1) Sodium chloride: It is used as a raw material to produce salt for human consumption, as salt for industrial use, as salt bread for direct use in livestock and as raw material for the production of mineralized salt for use in livestock.
2) Sodium sulfate (99%): is mainly used in detergent industry and paper industry.
3) Potassium chloride (95%): It is used as a fertilizer.
4) Potassium sulfate: It is also used as a fertilizer.
5) Magnesite (magnesium carbonate): If natural brine has a high value of magnesium/lithium ratio, e.g. greater than approximately 30, pre-treatment with sodium carbonate or trona is necessary. The solid phase generated in this pre-treatment is magnesite that is used in steelmaking, construction and photographic industry. In addition to magnesite, magnesium is obtained from use in metallurgy for the production of light alloys, and magnesium salts that are mainly used in the pharmaceutical industry.
6) Calcium and magnesium salts: The solid effluents generated in the treatment process contain calcium sulfate and magnesium hydroxide. From these solid effluents it is possible to obtain: (i) magnesium sulfate that is used as a fertilizer; and (ii) calcium sulfate that is used as an agricultural gypsum.
7) Also, depending on the chemical composition of the brine and the process that is applied, it is possible to obtain rubidium and caesium salts.

In general, the known processes for the extraction and processing of brines contained in the salt flats, initially aim to obtain lithium carbonate and/or lithium hydroxide and/or lithium chloride, as high purity solids. Lithium in brine is in the form of lithium ion [$Li^+$], and the processes referred to may be identified as belonging to one of the following categories:

Processes in which "raw" lithium carbonate and/or "raw" lithium hydroxide are obtained from a properly concentrated and treated brine, and are then subjected to a purification process. These processes can be called obtaining-purification (O-P processes).

Processes in which lithium is separated from a conditioned natural brine or a pre-concentrated and conditioned brine, by any separation process and, from the product resulting from this process, the lithium compounds of interest are obtained, such as lithium carbonate, lithium hydroxide or lithium chloride. Between the separation processes used and those that are planned to be used, it is possible to mention separation by selective absorption towers, separation by electrochemical processes, chemical separation by precipitation of low solubility lithium salts, such as lithium phosphate, solvent extraction, supercritical extraction processes. In all these processes, which can be called separation-obtaining processes (S-O processes), brine is conditioned before starting the lithium separation process.

FIGS. 1 to 7 show the processes generally used in prior art, and those intended to use for the extraction and processing of brines contained in the salt flats. Although the O-P processes included in FIGS. 1, 2 and 3 do not generally return adulterated brine to the salt flat, there are cases where this can happen; in these cases the flow that returns to the salt flat is generally lower than for the case of the S-O processes. But it is important to clarify that, if minimizing the environmental impact and maximizing the recovery degree of the applied process is prioritized, in no way is the return of adulterated and/or depleted brine acceptable, nor the discharge of other liquid effluents to the endorheic basin where the salt body lies.

FIG. 1 shows a concentration process in evaporation ponds with fractional crystallization, as described in U.S. Pat. No. 7,858,057 B2 dated Dec. 28, 2010, applicable to brines with low sulfate anion content. These brines may be of natural occurrence, may be the result of a mixture of natural brines, for example, one with high calcium content mixed with another one with a high sulfate content, or they may be the result of a natural brine treated with calcium or barium soluble salts, e.g. calcium chloride or barium chloride, to reduce its sulfate anion content, precipitating it as calcium sulfate or as barium sulfate, respectively. The evaporation and fractional crystallization process consists of a sequence of solar evaporation ponds. In these ponds, sodium chloride first crystallizes and precipitates; then a mixture of sodium chloride and potassium chloride; the following is the pond in which it also crystallizes and precipitates carnalite ($KCl \cdot MgCl_2 \cdot 6H_2O$); in the pond that follows, the bischofite ($MgCl_2 \cdot 6H_2O$) is added to the salts that crystallize and precipitate; and in the latter, lithium-carnalite ($LiCl \cdot MgCl_2 \cdot 7H_2O$) is also among the salts that crystallize and precipitate. Although this is a non-adulterated brine return process to the salt flat and that allows the obtaining of a brine with high lithium concentration of approximately 6% w/w, it has the following disadvantages:

If the natural brine must be treated to reduce its sulfate anion content, the flow entering the treatment plant is very large, thereby investment and pumping costs, reactor operation and operation of the solid-liquid separation equipment of the treatment plant increase significantly.

In most natural brines of Argentine Puna and Bolivian Altiplano, the mass ratio of sulfate/lithium concentrations is greater than approximately 10. Then, the treatment of these natural brines to reduce their content in sulfate anion requires the use of a significative quantity of reagents, generates important volume of solid effluents and increases the losses of species of interest, which are retained in the moisturizing solution of these solid effluents. This means an increase in the specific consumption of reagents, a greater environmental impact due to an increase in the specific generation of solid effluents and a decrease of process recovery.

As described in such U.S. Pat. No. 7,858,057 B2, concentrated brine obtained with approximately 6% w/w of lithium has a high boron content of approximately 0.8% w/w and a high magnesium content of approximately 1.65% w/w. As described in U.S. Pat. No. 5,219,550 A, boron is removed by extraction with an alcohol with the consequent cost of operation and regeneration and loss replenishment of this auxiliary fluid. As described in U.S. Pat. No. 7,858,057 B2, magnesium is removed in a first stage by mixing the concentrated brine with the mother water from the lithium carbonate precipitation stage. With this recycle, the solution from which lithium carbonate is obtained will increase the concentration of the other impurities contained in the concentrated brine; this means that it is necessary to purge some of the referred mother water, by conditioning the quality of the product obtained and the recovery degree to the purge regime which was applied.

Lithium separated from the liquid phase as a lithium-carnalite in the solar evaporation ponds considerably reduces the recovery degree of this procedure. While this reduction may be limited by leaching the salts harvested from the ponds where lithium-carnalite was precipitated with a lower lithium-concentration brine from an earlier stage of the solar evaporation concentration process, this leaching process has the following drawbacks: (i) it is virtually not possible to recover the entire lithium contained in the lithic carnalite; (ii) leaching should then be carried out when draining and washing precipitated salts in the ponds where the lithium-carnalite was precipitated. This means a longer time to reach the maximum production the pond system can deliver; and (iii) there is a significant increase in operating cost.

Processes similar to the scheme in FIG. 1 have been those that are traditionally used for a long time. For this reason, any process using solar evaporation ponds is misqualified as a "traditional process". But, as described in this invention, when taking into account the chemical composition of the brines contained in the salt flats and the importance of minimizing the environmental impact and maximizing the recovery degree aiming to minimize the flow of extraction for the same production, minimize the specific use of reagents and the specific generation of solid effluents, not to return adulterated brine or discharge other liquid effluents to the salt flat. Taking advantage of the prevailing climatic conditions of the region, the resulting process is an absolutely innovative process that ensures sustainable evolution over time.

The processes shown in FIGS. 2 and 3 summarize what is detailed in US patent documents 2011300041 A1 dated Dec. 8, 2011 entitled "Process for Recovering Lithium from a Brine" and WO 2014078908 A1 dated May 30, 2014 entitled "Process for Recovering Lithium from a Brine with Reagent Regeneration and Low Cost Process for Purifying Lithium". These processes do not consider obtaining brine with high lithium concentration. Although they are highly recoverable, the "raw" lithium compound, in these cases lithium carbonate, is separated from a saturated brine in sodium chloride that has a low lithium concentration of approximately 10 $g/dm^3$. Due to the high impurity content in this brine, the purification process of the raw product is more expensive.

In the case of FIG. 2, the brine is concentrated as much as possible without crystallizing and precipitating salts containing lithium in its chemical formula; in this case, the salts that crystallize and precipitate in the initial concentration ponds, prior to treatment, contain concentrated natural brine as moisturizing solution, without any contamination by the effect of treatment. In contrast, salts that crystallize and precipitate in the final concentration pond after treatment do not contain concentrated natural brine as moisturizing solution, but treated and concentrated brine.

In the case of the process corresponding to FIG. 3, the treatment is performed before starting the concentration process with fractional crystallization in solar evaporation ponds where the natural brine, or a brine that has some degree of concentration before treatment lower than that corresponding to the process described in FIG. 2 is treated. This improves the evaporation rate by reducing the magnesium content in the brine that is concentrated in the ponds. But it has the following disadvantages: (i) it is necessary to use a higher amount of reagents; (ii) the amount of solid effluents after treatment is also higher, which means greater loss of species of interest in solid effluents; and iii) salts that crystallize and precipitate in the different ponds do not contain concentrated natural brine as moisturizing solution, but treated and concentrated brine. The latter determines that obtaining products of commercial interest from these salts is more expensive. It is also clear that in the case of the process corresponding to FIG. 3, the amount of brine entering the treatment plant is considerably greater than that equivalent to the process corresponding to FIG. 2. On the other hand, in the case of the process corresponding to FIG. 2, the solid effluent obtained in the treatment plant contains calcium sulfate and magnesium hydroxide; from this solid effluent, with a simple leaching process, it is possible to obtain agricultural gypsum and magnesium sulfate that is used as a fertilizer. In contrast, for the FIG. 3 process, the effluent of the reagent regeneration plant is a solution of calcium chloride and magnesium chloride, which cannot be discharged into salt flat.

The processes in FIG. 4 are separation-obtaining (S-O) processes by means of chemical-physical separation such as molecular filters, selective absorption towers or electrochemical processes. In most of these processes natural brine should be conditioned to a greater or lesser degree, depending on the lithium separation process that is applied. Conditioning may consist of heating brine and/or reducing the concentration of some ions that could interfere with the separation process which is used. In all these processes, the amount of natural brine entering the conditioning process and lithium separation process of the liquid phase is also very large. While these processes make it easier to obtain high purity lithium compounds, the amount of depleted brine coming out of the separation equipment is very large, practically equal to the one that comes in. FIG. 4 shows how this brine is subjected to a fractional crystallization process in solar evaporation ponds to prevent its return to salt flat.

Where the processes listed in FIG. 5, natural brine is first treated and then entered into the separation equipment through chemical processes. In these processes the amount of brine with low lithium concentration, i.e. treated and depleted brine, which comes out of the separation equipment is practically equal to that entering the treatment plant; consequently, it is also very large. This brine is subjected to a fractional crystallization process in solar evaporation ponds to avoid its return to salt flat and obtain other compounds of commercial interest. In this case, since it is a chemical separation, the salts that crystallize and precipitate in the different ponds do not contain concentrated natural brine as moisturizing solution, but brine adulterated by treatment and separation process. This determines that obtaining products of commercial interest from these salts is more expensive than for the processes listed in FIG. 4.

The O-P processes listed in FIGS. 1 and 2 are performed with a specific low consumption of thermal and mechanical energy, compared to those performed with very high specific consumption of both forms of energy that the S-O processes listed in FIGS. 4 and 5 have. The process in FIG. 3 has a significant specific consumption of thermal and mechanical energy in the reagent regeneration process.

In addition, it is important to note that the investment corresponding to the S-O processes with no return of adulterated and/or depleted brine is always much greater than that corresponding to the O-P processes which are also with no return. It is clear that any process of separating lithium from a natural brine, in which this ion has a much lower concentration than almost all of the other ions that accompany it, is more onerous than the process of obtaining lithium carbonate from a concentrated and treated brine.

Processes with return of adulterated and/or depleted brine to the salt flat in FIGS. 6 and 7 have been proposed, but they should not be considered feasible due to their high impact on the dynamic balance of salt flats. The return of adulterated and/or depleted brine, and/or the discharge of any other liquid effluent to the same endorheic basin where the salt deposit lies, is an irreversible process. Both treated and/or depleted brine and any other liquid effluent, such as an aqueous solution of calcium chloride and/or magnesium chloride, have a different chemical composition and also different temperature, density, conductivity and/or viscosity; their return or discharge impacts by modifying the physical properties, the ionic relationships and/or chemical composition that characterize the natural brines contained in the aquifers of the salt deposit. The return and/or discharge of the referred liquids are not always possible and may also result in an alteration of the initial natural hydrogeological conditions. Considering that this return and/or discharge can enter into any of the aquifers that make up the hydrogeological system, these impacts can have short, medium and long-term consequences, which are very difficult to predict. This is especially true considering that in recent years extremophilic microbial ecosystems have been reported, such as microbiolites, oncolites, microbial mats, endoevaporites, etc., associated with minerals in salt flats and Andean lagoons. Undoubtedly, these microbial ecosystems have an important scientific, biotechnological and heritage value. On the other hand, the return of adulterated brine with low lithium content will surely increase the value of magnesium/lithium, sulfate/lithium and boron/lithium ratios. The increase in these ratios has the consequence of reducing the recovery degree by increasing the use of reagents and the generation of solid effluents over time.

Finally, and as a summary, the procedures applied in prior art do not give priority to the necessary conditions to ensure that the activity is sustainable over time. None of them uses all the advantages offered by the weather conditions of high mountain. In addition, many of these procedures do not give priority to maximize the recovery degree and some of them only aim to obtain lithium compounds without taking into account the importance of the integral use of natural brines that are extracted from the aquifers contained in salt bodies.

SUMMARY OF THE INVENTION

Figure 1:
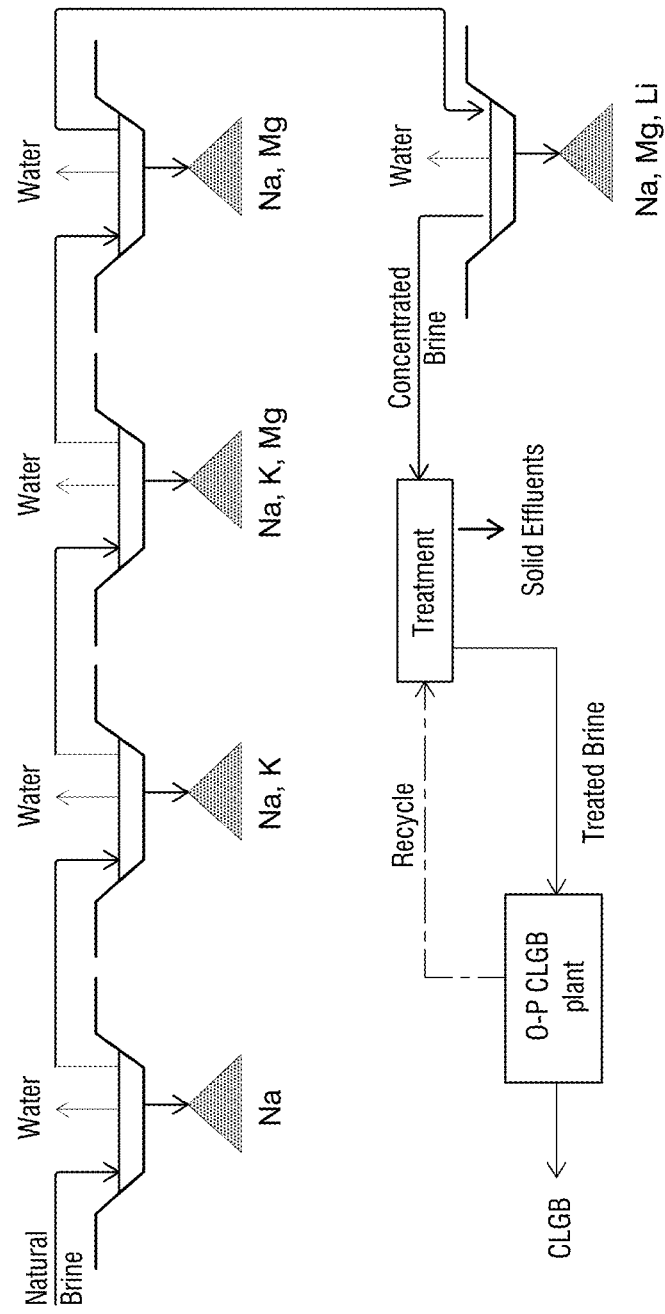
FIG. 1 schematically shows an O-P process of prior art with no return of depleted brine to salt flat for brines with a low sulfate anion concentration, comprising a concentration in solar evaporation ponds (pozas de evaporación solar, PES) with fractional crystallization.
Figure 2:
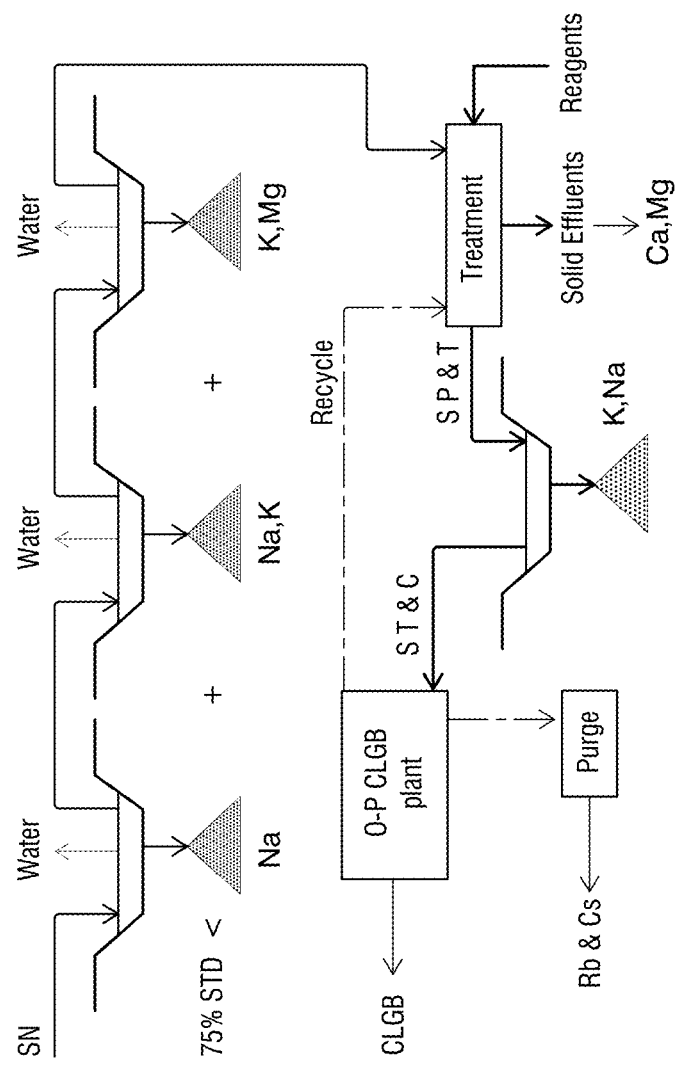
FIG. 2 schematically shows an O-P process of prior art with no return of depleted brine to salt flat, comprising a maximum lithium concentration in the concentrated natural brine in solar evaporation ponds (PES).
Figure 3:
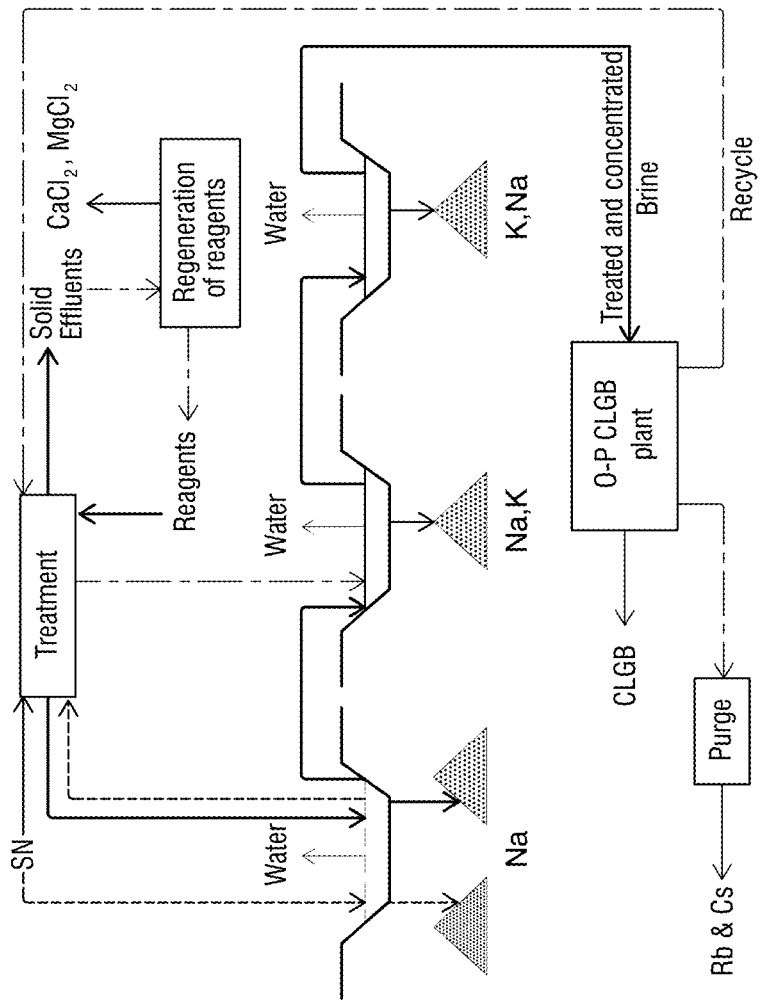
FIG. 3 schematically shows an O-P process of prior art with no return of depleted brine to salt flat, comprising an initial treatment or pre-treatment at the maximum possible lithium concentration in untreated brine and with reagent regeneration.
Figure 4:
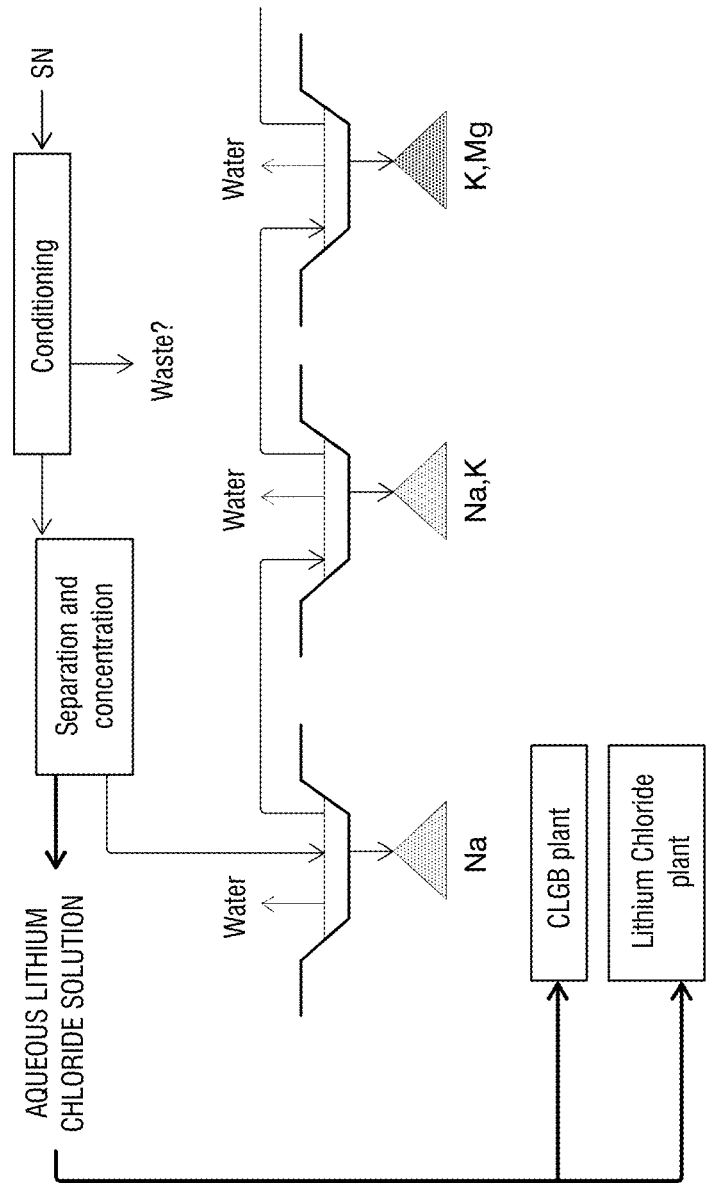
FIG. 4 schematically shows an S-O process of prior art with no return of depleted brine to salt flat, comprising a physical-chemical separation.
Figure 5:
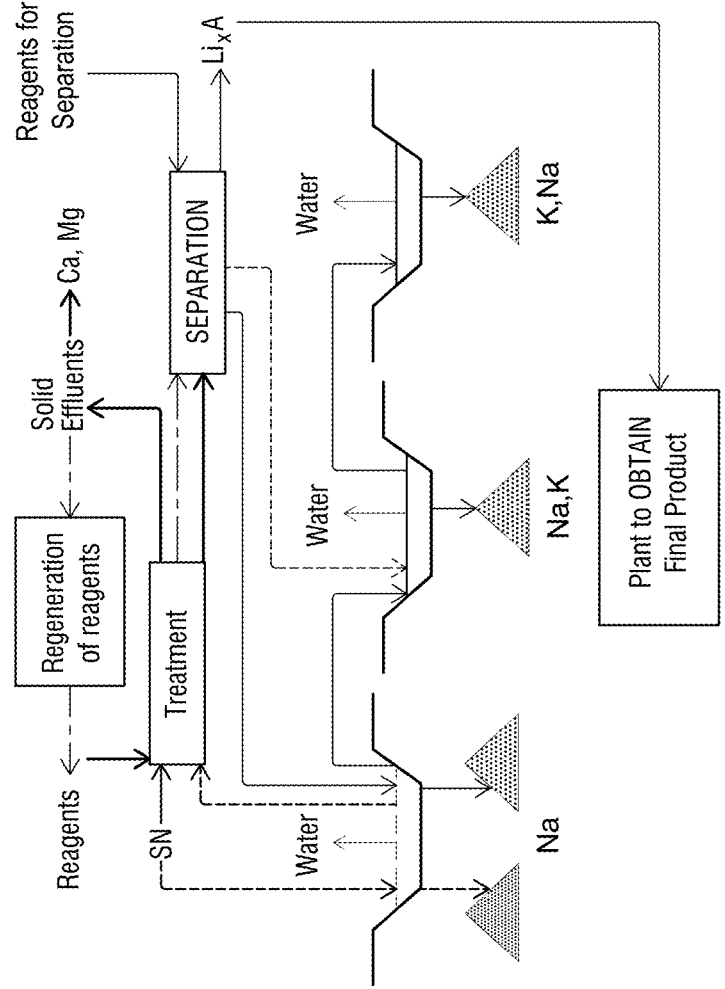
FIG. 5 schematically shows an S-O process of prior art with no return of depleted brine to salt flat, comprising a chemical separation.
Figure 6:
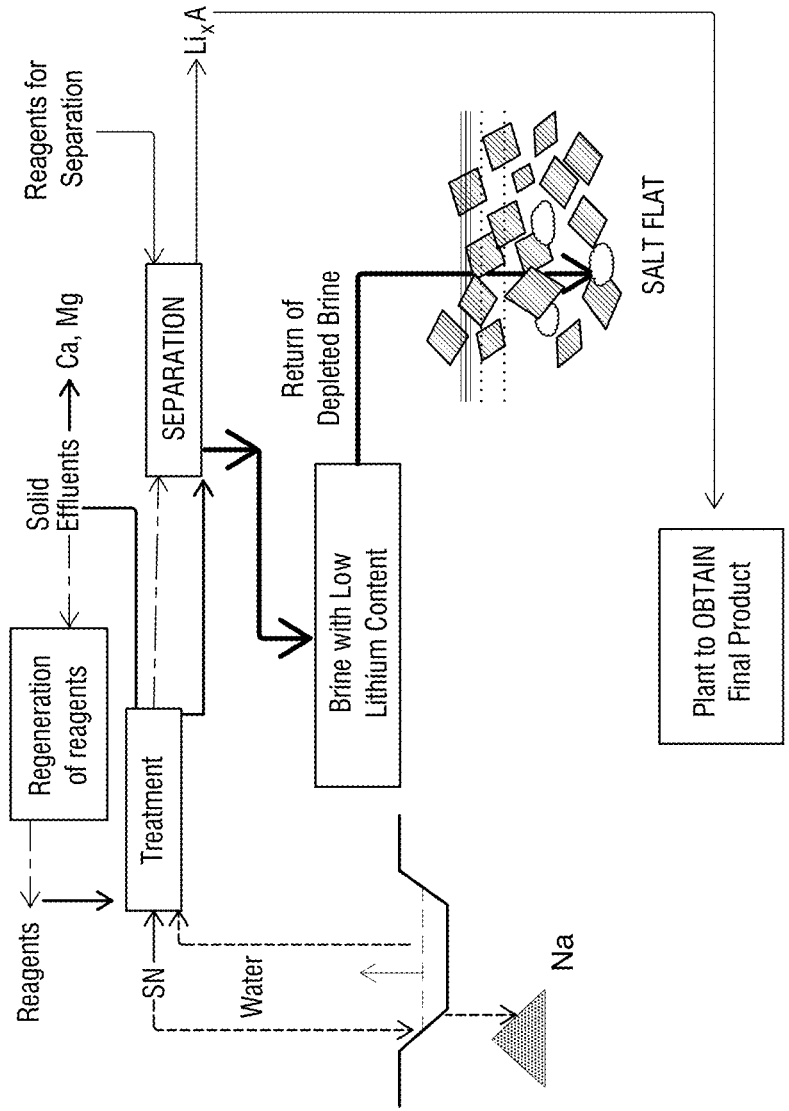
FIG. 6 schematically shows an S-O process of prior art with return of depleted brine to salt flat, comprising a physical-chemical separation.
Figure 7:
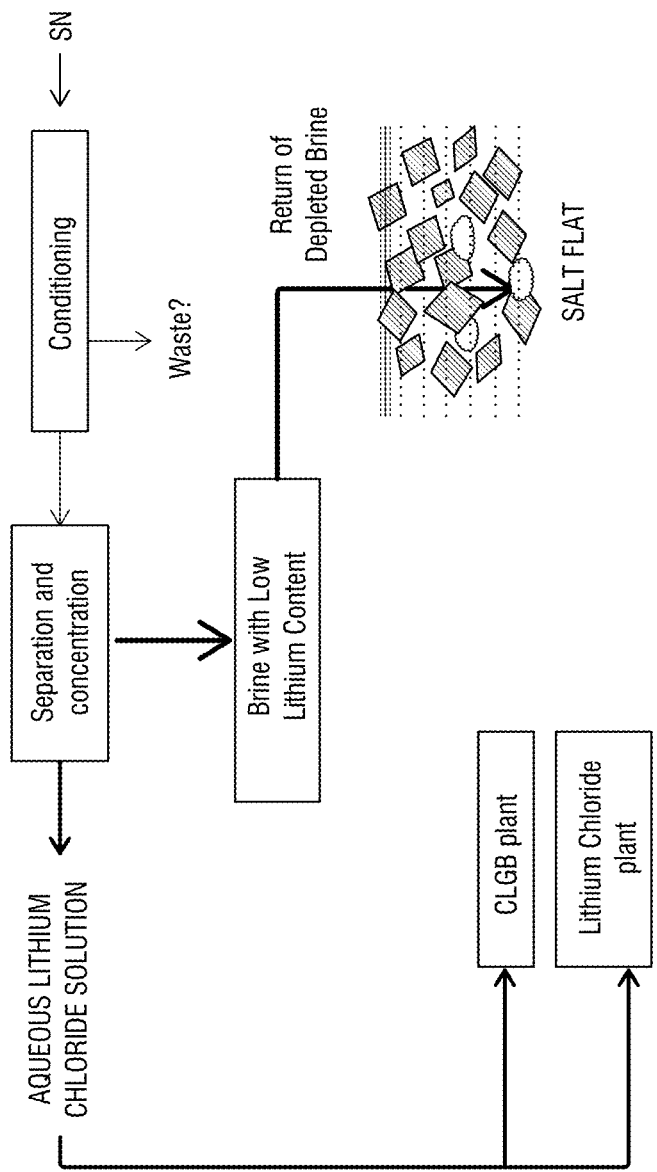
FIG. 7 schematically shows an S-O process of prior art with return of depleted brine to salt flat, comprising a chemical separation.

The procedure object of this invention comprises an initial pre-concentration stage with fractional crystallization of natural brine in solar evaporation ponds, for the purposes of reaching the maximum lithium concentration in the liquid phase without crystallizing and precipitating salts that contain this element in their chemical formula. At this stage the first compounds of commercial interest, such as sodium chloride and potassium chloride, are separated and the volume of the liquid phase is significantly reduced. If the mass ratio of magnesium/lithium concentrations is less than a certain value in the liquid phase with initial pre-concentration, preferably approximately 2, the procedure continues to directly treat this liquid phase with lime and sodium sulfate, as described below. Otherwise, the procedure continues as described below. The concentration of sulfate anions in brine with initial pre-concentration depends on the room temperature and, consequently, varies throughout the year. When this concentration is approximately 20% higher than that corresponding to the equilibrium sulfate anion concentration in the liquid phase when it is cooled at approximately −7° C., the aforementioned reduction in the volume allows to face the next stage consisting of cooling this liquid phase to reach a temperature preferably between −6° C. and approximately −8° C. Under these conditions, sulfate anion-containing salts in their chemical formula crystallize by cooling, by substantially reducing the mass ratio of sulfate/lithium concentrations in the aforementioned liquid phase. Depending on the volume to be processed and the quantity and latent heat of the crystallizing salts, this cooling can be performed in natural crystallizers, taking advantage of the low temperatures of winter months, or in mechanical cooling crystallization equipment.

When the sulfate anion concentration in brine with initial pre-concentration, which varies depending on the room temperature, is preferably approximately 20% lower than that corresponding to the equilibrium concentration in the liquid phase when it is cooled at about −7° C., the cooling stage is not necessary. The procedure continues a stoichiometric chemical pre-treatment to the sulfate anion content of the post-cooling liquid phase with an aqueous calcium chloride or barium chloride solution. It is also possible to use calcium hydroxide, but as explained in the detailed description of the invention, this option is not convenient. Due to this reduction in the sulfate content it is possible to continue the pre-concentration of the pre-treated liquid phase until a new maximum possible lithium concentration value is reached, without crystallizing and precipitating lithium-containing salts in their chemical formula; this final pre-concentration is always performed in solar evaporation ponds. While the new maximum lithium concentration value depends on the evolution of lithium, magnesium and potassium concentrations in the final pre-concentration ponds, the mass ratio of magnesium/lithium concentrations in the liquid phase that delivers the final pre-concentration stage is always lower than that corresponding to pre-treated brine. When this new maximum lithium concentration value is such that the mass ratio of magnesium/lithium concentrations is not less than approximately 2, it is possible to continue the final pre-concentration process by adding the quantity of potassium chloride needed to avoid the crystallization of lithium-carnalite to the last ponds of this process. In any case, during this final pre-concentration stage the mass ratio of magnesium/lithium concentrations is significantly reduced by crystallization and precipitation of magnesium and potassium salts, and the liquid phase is able to undergo a chemical treatment with a minimum aggregate of reagents to reduce the contents of magnesium, calcium, sulfate and boron. This treatment is conducted at two stages: (i) a first stage in which calcium hydroxide is added, for example in the form of lime slurry, calculated stoichiometrically with respect to magnesium content, and an aqueous sulfate anion-containing solution, which is obtained by dissolution in water or in the recycling solution of precipitated salts at the cooling stage of anhydrous or decahydrated sodium sulfate, or a mixture of both, calculated stoichiometrically with respect to the calcium-ion content after precipitation of magnesium hydroxide; solid effluents obtained at this first stage of treatment are filtered and washed, by recycling the wash water for suspension and dissolution of reagents used at this same stage; and (ii) at the second stage, the liquid phase is treated with the necessary quantity of an aqueous sodium hydroxide solution to adjust pH and ensure a minimum magnesium content in the liquid phase, by then adding a stoichiometrically calculated aqueous sodium carbonate solution to separate the remaining calcium ions, and finally adding an aqueous barium chloride solution to separate the remaining sulfate ions. When the liquid phase obtained at the end of the final pre-concentration has a lithium concentration greater than approximately 35 g/dm$^3$, it is diluted during treatment to minimize lithium loss in the solid effluents generated and, at the end of it, has a lithium content between approximately 10.5 g/dm$^3$ and approximately 12 g/dm$^3$. When the lithium concentration after final pre-concentration is low, as described in the example of the brine from the Rio Grande Salt flat, and it is not economically feasible to dispose of potassium chloride, the pre-concentrated brine is subjected to the chemical treatment as described by adding less water with reagents. In the latter case, the liquid phase obtained after treatment is concentrated in solar evaporation ponds to reach concentrations between approximately 65 g/dm$^3$ and approximately 75 g/dm$^3$. When pre-concentrated brine can reach a lithium concentration greater than 35 g/dm$^3$, the liquid phase obtained after treatment can also be concentrated in solar evaporation ponds to reach concentrations between approximately 65 g/dm$^3$ and approximately 75 g/dm$^3$. This concentrated brine can be transported to sites with a good industrial infrastructure and has very low impurity content which facilitates operation and minimizes the cost of obtaining very pure lithium compounds. But, as showed in the detailed description of the invention and in the example of brine from the Pozuelos Salt flat, the alternative of transporting pre-concentrated brine with more than approximately 35 g/dm$^3$ of lithium to places with an industrial infrastructure has important advantages from an economic technical viewpoint; in this case the chemical treatment is performed at the same plant where the final concentration process is performed in mechanical evaporation equipment, and the concentrated brine also reaches concentrations between approximately g/dm$^3$ and approximately 75 g/dm$^3$, has low impurity content and is obtained in less time. The procedure object of this invention allows selecting, for each case, the best alternative of application for the seven stages involved. For all possible alternatives, it has low mechanical and thermal energy requirement. In addition, avoiding the crystallization and precipitation of lithium-containing salts in their chemical formula in any of the stages, and by minimizing the use of reagents and an efficient system of separation and wash of crystallized and precipitated salts in the ponds and solid effluents generated in pre-treatment and treatment, the procedure has a recovery degree between approximately % and approximately 75%. Finally, the procedure object of this invention is applicable to an industrial scale and is a minimum environmental impact procedure, mainly because it is performed with no return of depleted and/or adulterated brine or any other liquid effluent to salt flat.

DETAILED DESCRIPTION OF THE INVENTION

This invention comprises a procedure for the extraction and processing of natural brines that aims to meet the necessary conditions from the viewpoint of the procedure, to be sustainable over time. For natural brines generally and particularly for those contained in any salt body of the Argentine Puna, Bolivian Altiplano, Atacama Desert or any evaporite, this is achieved on the basis of the following:

1. Maximize the lithium recovery degree and optimize that of each and all other chemical species of interest contained in natural brines. In all cases, the recovery degree is measured as the quantity expressed in a given mass unit of each chemical species contained in the marketable quantity of final product obtained, when a volume of natural brine extracted from the salt flat by pumping or coming from a free-flowing well containing a mass unit of the same chemical species is processed. When maximizing and optimizing the recovery degree, the extraction flow of natural brine required for the same production is minimized. This involves minimizing the catchment area associated with each extraction point and minimizing the disturbance pumping causes in the hydrogeochemical system. It is important to clarify that, depending on the characteristics of each salt body, pumping can be performed from a natural pond built by digging a shallow vat on the surface of the crystalline core of a free aquifer and/or from a deep well built with a drilling equipment.
2. Determine the maximum possible pumping flow of each extraction point so that the catchment area does not affect freshwater aquifers and the disturbance caused by the pumping is such that the hydrogeochemical system returns to an equilibrium state.
3. Minimize the specific use of reagents and the specific generation of solid effluents, using the advantages provided by the weather conditions of the region where the salt deposits are located.
4. In no case return adulterated and/or depleted brine or discharge any other liquid effluent to the endorheic basin where the salt deposit lies.
5. Include alternatives to optimize specific thermal and mechanical energy requirements from primary sources, by taking advantage of the weather conditions in the region where the salt deposits are located.

But, in addition, the application of the procedure object of this invention is sustainable over time because it enables the use of human resources that are available in populations close to the lay sites of salt deposits.

As described above, there are other necessary conditions, which do not depend on the procedure being applied and must be met in order for the extraction and processing of brines contained in the salt flats to be sustainable over time. As, for example, making the necessary forecasts for future generations of populations close to the lay site of the resource to have the economic means to solve the problems that may cause the exploitation of non-renewable natural resources.

The procedure object of this invention consists of a succession of stages that alternate pre-concentration processes with crystallization and precipitation of salts in solar evaporation ponds, with cooling processes, pre-treatment and treatment of pre-concentrated brine, to finish with a final concentration process of treated brine.

The procedure object of this invention gives priority to the maximization of the recovery degree by avoiding the crystallization and precipitation of lithium ion-containing salts in their chemical formula. This is met at all stages comprising the procedure.

The procedure described in this invention also gives priority to the maximization of the recovery degree, by minimizing the lithium content in the moisturizing solution that retains the crystals obtained after drainage and wash in the concentration and cooling processes, and optimizing the filtration and wash operations of solid effluents obtained in the pre-treatment and treatment processes of pre-concentrated brines.

In the aforementioned geographical region, there are a few salt flats that have ion ratios w/w with very high values relative to the average values. For example, the Incahuasi salt flat, located in the Catamarca Province, has the following values: magnesium/lithium=103, sulfate/lithium=173, boron/lithium=9 and potassium/lithium=38. For salt flats with similar characteristics to Incahuasi the procedure begins with:
an initial pre-concentration stage consisting of reducing the volume of brine as much as possible through a concentration process in solar evaporation ponds, without affecting the recovery degree; and
an initial pre-treatment stage with sodium carbonate or trona to crystallize, precipitate and separate the solid phase as magnesite. Continue pre-treatment by acidifying the liquid phase with hydrochloric acid to separate some boron as boric acid.

The procedure then continues the cooling stage and the other stages described below, for the brines contained in most salt flats of Argentine Puna, Bolivian Altiplano, Atacama Desert, or any evaporite.

As shown in the Table below, the ion ratios w/w, corresponding to the brines contained in most salt flats, have magnesium/lithium values less than 20, sulfate/lithium less than 70, boron/lithium less than 1.5 and potassium/lithium less than 40.

Table of Ion Ratios w/w

| Salt flat | magnesium/ lithium | sulfate/ lithium | boron/ lithium | potassium/ lithium |
|---|---|---|---|---|
| Atacama | 6.4 | <1 | 0.3 | 12 |
| Diablillos | 4 | 12.1 | 1.1 | 10 |
| Pozuelos | 4.1 | 5.8 | 0.6 | 6.3 |
| Rincón | 10.6 | 22.8 | 1.9 | 19 |
| Hombre Muerto | 1.7 | 13.9 | 0.7 | 10.7 |
| Cauchari | 2.9 | 29.4 | 2.2 | 8.3 |
| Salinas Grandes | 2.8 | 3.7 | 0.13 | 11 |
| Pastos Grandes | 5.3 | 16.8 | 1.1 | 9.7 |
| Centenario | 7.5 | — | — | 15 |
| Ratones | 5.6 | 18 | 0.7 | 11.5 |
| Jama | 5 | — | 1.3 | 17 |
| Río Grande | 12.4 | 83.8 | 1.01 | 17.9 |
| Olaroz | 3.4 | 25.8 | 1.6 | 8.5 |
| Arizaro | 19 | 27 | <0.5 | 29 |
| Laguna Verde | 2 | 0.6 | 1.4 | 9 |
| Maricunga | 7 | 0.6 | 0.5 | 7.3 |

In salt flats such as Laguna Verde in Catamarca, Argentina, and Maricunga in Chile, natural brine has a high calcium content and low sulfate content. In these cases it is necessary to reduce the calcium content by natural crystallization of any hydrate or by the addition of trona or coipa. It is also possible to reduce the calcium content by mixing, where possible, this brine with another one that has a high sulfate content and low calcium content, from another salt flat or another area of the same salt flat as is the case, for example, in the Atacama salt flat. The procedure then continues the pre-treatment stage and the other stages described below mainly for the brines contained in most salt flats of the Argentine Puna, Bolivian Altiplano and Atacama Desert.

For salt flats with brines that do not have a high calcium content, and that have mass ratio values of magnesium/lithium concentrations less than 25, sulfate/lithium less than 100, boron/lithium less than 2 and potassium/lithium less than 50, the procedure object of this invention consists of the performance of the following stages:
I. Initial pre-concentration stage of natural brine.
II. Cooling stage.
III. Pre-treatment stage.
IV. Final pre-concentration stage.
V. Treatment stage.
VI. Post-treatment concentration stage.
VII. Final concentration stage.

Before starting the description of the stages that define the procedure, it is important to clarify that the concentration and fractional crystallization processes could be performed in mechanical equipment employing mechanical compression, evaporation in multiple stages, flash evaporation or adiabatic cooling crystallization, depending on the availability and cost of thermal and mechanical energy at the site of the resource location. But, taking into account the significant quantity of water that needs to be evaporated at stages I and IV, and the weather conditions of the region where the salt flats are located where there is high solar radiation, low rainfall, strong winds and low relative humidity in room, it is convenient to perform this operation in solar evaporation ponds. These ponds are large vats of approximately 2.5 m deep, with waterproofed floors and walls naturally or artificially, for example, preferably with PVC or polyethylene HDPE membranes, minimizing the losses of brine contained therein. For example, for an HDPE membrane of approximately 2 mm thick, the loss is estimated at approximately 0.4% of the volume pumped into a pond operating with a height of liquid phase of approximately 0.45 m; when the thickness of the membrane increases up to approximately 2.5 mm, the loss is reduced at less than approximately 10% of that corresponding to the membrane of approximately 2 mm; for this reason, to achieve greater recovery, it is convenient that the ponds operating at a higher lithium concentration are waterproofed with thicker membranes. Before waterproofing, floors must be smoothed and leveled with the minimum slope needed to counteract the wind effects; the walls must also be smoothed and built with the maximum slope that allows the material available in the area for construction.

In the procedure object of this invention, the initial pre-concentration and final pre-concentration stages are concentration and fractional crystallization processes that use solar evaporation ponds. These stages may include one or more substages defined by the lithium concentration in the brine entering into the substage, and the lithium concentration of the brine coming out thereof. In turn, each substage can be performed with one or more ponds in accordance with the volume of natural brine being processed, the recommended size for the construction and operation of the ponds, and the need to optimize the periodic harvesting process of the crystals deposited at the bottom of them. The post-treatment and final concentration stages can also be performed using solar evaporation ponds, with the same considerations described for the initial and final pre-concentration stages; but if transport of the pre-concentrated or pre-treated brine to a place with a better industrial infrastructure is chosen, these stages will be performed in thermally assisted mechanical evaporative crystallizers.

Stage I begins by pumping natural brine to the pond(s) of its first substage. The lithium concentration in the pond(s) of the last substage of this stage is that corresponding to a considerable volume reduction, preferably a lithium concentration close to the possible maximum one of reaching without crystallizing and precipitating lithium-containing salts at this substage to the lithium in their chemical formula. Depending on the characteristics of the natural brine being processed, the volume of brine with initial pre-concentration coming out of stage I may result in a value between approximately 3% and approximately 20% of the natural brine volume pumped into the pond(s) of its first substage. This volume reduction allows: i) continuous obtaining and accumulation of brine with initial pre-concentration during the months of a higher evaporation rate than in the southern hemisphere and the aforementioned geographical area corresponds to the months of August to May, to then continue, when necessary, with the cooling stage during the months with a lower minimum temperature corresponding to the months of June and July if using the natural conditions is chosen; or ii) without the need to accumulate pre-concentrated brine during the months of a higher evaporation rate, perform the cooling process continuously, using mechanical cooling crystallization equipment. Stage I comprises the following periods:

Charging Period of the Pond System Included at the Stage.

When cooling is necessary and in the case of using natural conditions, it is appropriate that in the southern hemisphere this period ends between 1 June and 31 July of the year in which the following period begins, which corresponds to the period of obtaining brine with initial pre-concentration. This is thus to minimize the size of the specially built ponds for brine accumulation with initial pre-concentration. When mechanical cooling crystallization equipment is used, there are no conditions for the end date of this charging period. In any case, the duration of this period is a function of the lithium concentration at the beginning and end of the stage, the height of free brine specified for the operation of the ponds of each substage, the retention of brine in the crystal bed deposited at the bottom of each pond and the average evaporation rate during the charging period.

First Period of Obtaining and Accumulating Brine with Initial Pre-Concentration, without Harvesting Crystallized and Precipitated Salts in the Ponds.

During this period, each pond generates a concentrated liquid phase flow, which depends on the lithium concentration at which the pond operates, the flow and the lithium concentration that has the brine entering into it and the evaporation rate. But from this total flow, the ponds only deliver the flow corresponding to the free liquid phase, retaining the trapped flow in the effective porosity of the crystal bed and the flow corresponding to the moisturizing solution associated with the crystals. As the evaporation rate varies throughout the year, for the same lithium concentration in the brine entering into the pond, the flow of this brine must change to maintain a constant lithium concentration at which the pond operates. In the event that it is necessary to process a minimum flow with a constant lithium concentration, such as the existence of a free-flowing well, the pond system should be designed for the average evaporation rate of the months with lower values, and another source of brine must be available, e.g. pumping from a surface vat or from a deep well. In any of these cases, if the concentration and flow of brine delivered by the stage is to be kept constant, the liquid phase level of the ponds involved must be adequately modified. Only in the event that the cooling stage is necessary and natural conditions are chosen, this period should end between 15 and 31 May each year for the same region.

Cleaning Period of Initial Pre-Concentration Ponds.

When the quantity of salts deposited at the bottom of a pond reaches a certain height preferably not greater than one meter, the free liquid phase is pumped into an auxiliary pond with the capacity to also contain the brine drained from the crystal bed and wash water of the precipitated salts. Preferably, the area of auxiliary pond should be equal to the area of the pond that is in the cleaning process. Crystals are drained by trenching and the drained brine is also pumped into the auxiliary pond. If the liquid phase at which the pond operates in the washing process has a lithium ion concentration greater than approximately 1.5 mg/dm$^3$, it is necessary to wash the crystals by immersion adding a volume of water, preferably fresh water, equivalent to the estimated volume for the effective porosity of the crystal bed after drainage. The post-washed crystals are drained again by trenching and all the wash water is pumped into the auxiliary pond. Post-drained and/or post-washed crystals are harvested and heaped up grains for threshing in an area specially intended for accumulation for later use. The brine contained in the auxiliary pond is pumped back to the pond that was cleaned, and the auxiliary pond is intended for the cleaning of another pond. It is clear that, immediately after charging, the free brine height in the clean pond is higher than the height during the first unharvested operating period and, although it has a lower lithium concentration by dilution with wash water, the total quantity of lithium contained in it is higher. For this reason, during the new unharvested operation, the pond will deliver a little less than the total concentrated brine flow, in comparison to that which is actually produced. This is because it delivers the free brine flow produced in the new unharvested operation, plus a fraction of the trapped flow in the porosity of the crystal bed during the previous unharvested operation, plus the moisturizing solution flow associated with the crystals deposited at the bottom of the pond during the previous unharvested operation, and less the quantity of equivalent moisturizing solution, quantity of brine with the same lithium concentration at which the pond operates, which retain the post-washed and drained crystals, obtained during the previous unharvested operation. In this case, if the flow and lithium concentration in the brine delivering the stage is to be kept constant, the liquid phase level of the ponds involved must be adequately modified. But in this new unharvested period, the flow delivering the stage will be greater than that delivered during the first unharvested period. At the end of this new unharvested period the free brine height will have the same value with which the pond operated throughout the first unharvested period.

Subsequent Periods of Obtaining and Accumulating Initial Pre-Concentrated Brine, without Harvesting Crystallized and Precipitated Salts in the Ponds.

During these periods the ponds operate as described for the first unharvested period, and the only difference is a greater height of free brine, as expressed in the previous item. For cooling using natural conditions, these periods must end between 15 and 31 May each year.

Crystalized and precipitated salts in the first ponds of initial pre-concentration generally contain more than approximately 95% sodium chloride. Particularly those that crystallize and precipitate in the ponds that reach a lithium ion concentration less than approximately 2.5 g/dm$^3$ are those used to produce salt for human consumption, salt for industrial use, salt breads for direct use in livestock and as raw material for the production of mineralized salt for use in livestock.

If the mass ratio of magnesium/lithium concentrations is less than a certain value in the liquid phase delivering stage I, preferably approximately 2, the procedure continues with stage V, treating this brine with initial pre-concentration directly as described below. Otherwise, the procedure continues as described below.

The sulfate concentration in the liquid phase delivered by stage I depends on the temperature of the liquid phase and, consequently, varies throughout the year. When this concentration is between approximately 10% and approximately 20% higher than the sulfate anion concentration that has this liquid phase after being cooled at approximately −7° C., it is necessary to perform stage II. Otherwise, stage II is not performed and the procedure continues with the performance of stage III.

Stage II consists of a cooling process of brine with initial pre-concentration. This cooling process can be performed continuously, using mechanical cooling crystallization equipment, decreasing the temperature of the pre-concentrated brine up to temperatures between approximately −8° C. and approximately −6° C. In this case, the solids separated from the liquid phase mechanically are washed with a freshwater mass approximately equal to 30% of mass of drained crystals. Wash water is mixed with the obtained liquid phase and pumped to stage III. The mechanically washed and drained crystals are heaped up grains for threshing, to be then used as a raw material for obtaining sodium sulfate and/or potassium sulfate and/or potassium chloride. Sodium sulfate is mainly used in the detergent industry and in the cellulose pulp industry. Potassium sulfate and potassium chloride are used as fertilizers in agriculture. Where economically appropriate, sodium sulfate obtained at this stage is used as a reagent in the treatment corresponding to stage V described below; if it is appropriate to sell this sodium sulfate, the sulfate anions required at stage V may come from mirabilite containing decahydrated sodium sulfate and/or thenardite containing anhydrous sodium sulfate, minerals available, for example, in the aforementioned geographic Region.

The cooling process comprising stage II can also be carried out taking advantage of the minimum low temperatures and minimum absolute temperatures less than approximately −10° C. and approximately −17° C., respectively, characteristics of the months of June and July in the high mountain range at more than 3,600 msnm, where more than 90% of the salt deposits in the Region are located. This operation is carried out in natural crystallizers consisting of large and shallow vats of approximately 0.50 m, with leveled floors and smoothed and waterproofed floors and walls naturally or artificially, for example, preferably with PVC or polyethylene HDPE membranes, minimizing the losses of brine contained therein. In these vats the brine is charged with initial pre-concentration and exposed to natural cold for a preferable range between approximately 7 and approximately 9 days. Under these conditions salts containing, among others, ions to sulfate anion crystallize and precipitate. The free liquid phase and that obtained by runoff are pumped to accumulation ponds from where the pre-treatment plant is powered. Drained crystals are washed by immersion adding a quantity of fresh water preferably equal to that estimated for the effective porosity of the precipitated crystal bed to the crystallizers. Wash water obtained by runoff is also pumped into the same accumulation ponds. Washed and drained crystals are harvested from the crystallizers and heaped up grains for threshing, to be then used as described for the use of mechanical cooling crystallization equipment.

The free liquid phase and that obtained at this stage have a mass ratio of sulfate/lithium concentrations, whose value is generally between approximately % and approximately 40% of the value corresponding to natural brine. In the same proportion, the required quantity of reagents and the quantity of solid effluents generated in pre-treatment are reduced if natural brine or brine were pre-treated with initial pre-concentration. This, in addition to reducing the environmental impact of the process, maximizes the recovery degree by minimizing the losses associated with the moisturizing solution of the solid effluents generated.

Stage III consists of the chemical pre-treatment of brine resulting from stage II, in order to further reduce the value of the mass ratio of sulfate/lithium concentrations. The brine is charged into a stirred reactor, and mixed with the stoichiometric quantity of cations associated with the sulfate ions forming an insoluble salt; these cations power to the reactor as an aqueous solution. Preferably, this pre-treatment is performed by adding stoichiometrically an aqueous calcium chloride solution or an aqueous barium chloride solution, in concentrations close to those corresponding to those of saturation, preferably approximately 90% of the value corresponding to those of saturation at room temperature; the solid and liquid phases of the heterogeneous mixture obtained are separated by centrifugation or filtration, washing the solid phase with a quantity of fresh water approximately equal to one third of the mass of the drained solid effluent generated. It is also possible to use calcium hydroxide added in the form of lime slurry as a source of calcium ions; in this case the quantity of solid effluent generated is greater because the crystallization and precipitation of magnesium hydroxide is added, and the separation of the solid and liquid phases is more operationally difficult, because the solid effluent retains greater moisturizing solution and wash is more difficult. On the other hand, by separating the magnesium ions from the liquid phase, the potassium concentration will continue to increase throughout the concentration process, reaching very high values in the final concentrated brine. The pre-treatment process comprising stage III can also be run on continuous reactors and continuous liquid-solid separation systems. The liquid phase and wash water are mixed and pumped into the pond(s) of the first substage of stage IV. Depending on the reagent used, the solid phase obtained from pre-treatment may be calcium sulfate that can be marketed as agricultural gypsum or barium sulfate that is used as filler material in rubber products, paints such as permanent white, linoleum and, among other applications, such as pharmacopoeia.

By performing stage IV it is possible to continue the concentration process and fractional crystallization in solar evaporation ponds, due to the reduction of the sulfate content of the pre-treated liquid phase. Depending on the chemical composition of the brine being processed, at the first substage of this stage, sodium chloride and potassium chloride can crystallize and precipitate; at the next stage the crystallization and precipitation of carnalite can be added and at the next stage if it is convenient one more substage, bischofite. The lithium concentration reached at this stage is the maximum possible one to reach without precipitating lithium-containing salts in their chemical formula. When for this new maximum lithium concentration value the mass ratio in magnesium/lithium concentration is not less than approximately 2, it is possible to continue the final pre-concentration stage by adding the quantity of potassium chloride needed to avoid crystallization of lithium-carnalite to the last ponds of this stage. The latter, when the availability of the required quantity of potassium chloride is feasible, as shown in the example of brine processing from the Pozuelos Salt flat; otherwise, the procedure continues, by treating the brine with the lowest possible mass ratio of magnesium/lithium concentrations to obtain without the addition of potassium chloride, as shown in the example of brine processing from the Rio Grande Salt flat. In any case, during this final pre-concentration stage the mass ratio of magnesium/lithium concentrations is significantly reduced by crystallization and precipitation of magnesium and potassium salts, and the liquid phase is able to undergo a chemical treatment with the minimum possible addition of reagents to reduce the contents of magnesium, calcium, sulfate and boron. As for the ponds covered by stage I, the ponds included at this stage also have a charging period, a first unharvested operating period and cleaning periods that alternate with subsequent unharvested periods.

If the pre-concentrated brine obtained at the end of stage IV has a higher lithium concentration of approximately 35 g/dm$^3$, the procedure considers the alternative of transporting this brine to places with an industrial infrastructure, for example, locating the raw and purified plants in the vicinity of a power plant making possible cogeneration, where stages V, VII and VII will be performed more efficiently. In addition, this alternative has important advantages based on the considerations detailed below, when transporting a pre-concentrated brine with, for example, approximately 2.78% w/w lithium:

a) The transport of liquids has a cost per ton equivalent to approximately 80% of the solid transport cost. Consequently, transporting approximately 6.76 t of pre-concentrated brine per ton of lithium carbonate, economically only equivalent to transporting approximately 5,408 t.

b) When transporting pre-concentrated brine to a site with an industrial infrastructure, the treatment stage described below is not performed in the salt flat and does not need to be transported from the salt flat approximately 4.3 t of solid effluents generated per ton of lithium carbonate, which can be marketed as by-products or as co-products. The transport of approximately these 4.3 t is included in the transport of brine. It is also not necessary to transport approximately 1.7 t of high-purity sodium chloride obtained per ton of lithium carbonate, at stages VI and VII of final concentration. The transport of these approximately 1.7 t is also included in the transport of brine.

c) When transporting pre-concentrated brine to a site with an industrial infrastructure, it is not necessary to transport approximately 1.148 t of reagents to the salt flat, but it is necessary to transport approximately 1.57 t of anhydrous sodium sulfate from the salt flat to the site with an industrial infrastructure.

d) As a summary of the above considerations, when transporting pre-concentrated brine to a site with a better industrial infrastructure, approximately 0.270 t less material, calculated on the basis of the transport of solids, is transported between the salt flat and the chosen site.

e) Not only is the net quantity that is transported between the salt flat and the site with a chosen industrial infrastructure lower, but the value of what is transported is also lower, thus it also lowers the cost of transport insurance.

f) When transporting pre-concentrated brine to a site with a better industrial infrastructure, stages VI and VII of final concentration are performed in thermally assisted evaporative crystallizers. Under these conditions a greater recovery is achieved and approximately 15.5 t of distilled water per ton of lithium carbonate is generated; the distilled water obtained is used in the wash of crystallized salts at stages VI and VII.

g) The increased recovery resulting from the most efficient execution of treatment and stages VI and VII in a site with an industrial infrastructure also means lower specific reagent consumption and lower specific generation of solid effluents.

h) When pre-concentrated brine is transported to a site with a better industrial infrastructure, the treated brine that has a low calcium, magnesium and sulfate content is concentrated in thermally assisted evaporative crystallizers. In this case, the concentrated brine with a lithium concentration between approximately 65 g/dm$^3$ and approximately 75 g/dm$^3$ and with low impurity content is obtained approximately 362 days before. If, in addition, the lithium carbonate plant is located in the same place, this product is obtained approximately 17 months after starting pumping to the first ponds of stage I, when the ponds operate with approximately 0.20 m of free brine height. On the other hand, this alternative also allows the possibility of purging and concentrating part of the raw reactor's recycle to obtain other chemical species of interest present in natural brine such as rubidium and caesium.

i) When stages VI and VII are performed in evaporative crystallizers, the process requires a lower quantity of thermal energy of approximately 4,200,000 kcal per ton of lithium carbonate produced from any primary source. The cost of this thermal energy, currently less than approximately USD 140/t of produced lithium carbonate, is fully offset by the advantages detailed above.

Stage V consists of the chemical treatment of brine obtained at the final pre-concentration stage. This treatment aims to reduce the contents of magnesium, calcium and sulfate at very low values, and also reduce the boron content. Stage V is performed at two substages. When the lithium concentration in the liquid phase that delivers stage IV is approximately 35 g/dm$^3$ or greater, substage V.1 consists of charging the pre-concentrated brine to a reactor with very good stirring and, while maintaining stirring, first add a quantity of water to reduce the lithium concentration by approximately 50%, and then add a lime slurry containing a preferably calculated quantity of calcium hydroxide with approximately 10% in excess of the stoichiometric value to precipitate all magnesium ions. Immediately afterwards and maintaining stirring, add an aqueous solution containing a stoichiometrically calculated quantity of sulfate anions to precipitate the remaining calcium ions in the liquid phase, then to the calcium hydroxide aggregate. Calcium hydroxide is preferably added as a preferably prepared lime slurry by suspending a ton of solid in a volume between approximately 2.5 m$^3$ and approximately 3 m$^3$ of water, preferably fresh water, wash water of solid effluents or recycling mother water of "raw" and purified lithium carbonate plants. The sulfate anions are added as a prepared aqueous solution, for example, dissolving between approximately 0.300 tons and approximately 0.370 tons of anhydrous sodium sulfate in approximately one cubic meter of water, preferably fresh water, wash water of solid effluents or recycling mother water of "raw" and purified lithium carbonate plants.

It is important to note that the sulfate anion input can also be made partially or completely by adding: i) separate sodium sulfate at the cooling stage, either as anhydrous sodium sulfate or as decahydrated sodium sulfate, reducing the costs of reagents; ii) mirabilite, thenardite or a mixture of these minerals, if they do not contain water-soluble calcium, magnesium or boron compounds. The solid and liquid phases of the heterogeneous mixture obtained after treatment are separated by centrifugation or filtration, preferably using a filter press, washing the solid phase with a quantity of water, preferably fresh water, approximately equal to approximately 2 m$^3$/t of dry solids obtained after treatment; wash water is used to dilute pre-concentrated brine and/or to add the reagents used at this substage V.1. The use of the filter press ensures that the loss of lithium in the post-washed solid effluent is less than approximately % of the dry solid effluent mass. This leads to a recovery degree at the treatment stage greater than approximately 95%. As a result of dilution to prevent salts that have lithium in their chemical formula from crystallizing and precipitating, the liquid phase obtained at substage V.1 has a lithium concentration preferably between approximately 11 g/dm$^3$ and approximately 13 g/dm$^3$. For some brines, the lithium concentration in the liquid phase that delivers stage IV may be less than approximately 35 g/dm$^3$ and, in some cases, much less than in the case of brine from the Rio Grande Salt flat. In these cases it is convenient: i) not to dilute by adding fresh water; (ii) to add calcium hydroxide solidly not as lime slurry; and (iii) to use as little water as possible to add the sulfate anions. Known the resulting calcium, magnesium and sulfate concentrations in the liquid phase that delivers stage V.1, the procedure continues the performance of substage V.2. The process comprising this substage of the procedure consists of treating the brine obtained in V.1 in a stirred reactor to which the minimum quantity required of an aqueous sodium hydroxide solution with a low concentration, preferably less than approximately 150 g/dm$^3$ is added to ensure its stability, in order to increase pH at approximately 11.2 and thus minimize the magnesium ion content in the liquid phase. Immediately afterwards, and maintaining stirring, an aqueous sodium carbonate solution is added, in order to minimize the calcium ion content in the liquid phase. The quantity of sodium carbonate is calculated stoichiometrically with respect to calcium ion content; the concentration of the aqueous sodium carbonate solution should preferably be equal to approximately 90% of the value corresponding to saturation at room temperature. Then, and maintaining the stirring, an aqueous barium chloride solution that preferably contains the stoichiometric quantity of reagent needed to precipitate all the sulfate anions contained in this brine is added; the concentration of the aqueous barium chloride solution should preferably be equal to approximately 90% of the value corresponding to saturation at room temperature. The heterogeneous mixture obtained is separated by centrifugation or filtration, washing the solid phase with a freshwater mass approximately equal to one third of the drained solid effluent mass generated. The processes at substages V.1 and V.2 of the procedure object of this invention can also be performed in continuous reactors and continuous liquid-solid separation systems.

In all cases studied, pre-concentrated and treated brine can be categorized as a brine with low impurity content considering that the mass ratios of ion/lithium concentrations are below the following values:

magnesium/lithium<0.005
potassium/lithium<0.1
calcium/lithium<0.1
sulfate/lithium<0.1
boron/lithium<0.09

This brine is not saturated, has low density and low content of total dissolved solids (sólidos totales disueltos, STD).

When it is not possible to reach a lithium concentration greater than approximately 35 g/dm$^3$ in the pre-concentrated brine without crystallizing lithium-containing salts in their chemical formula, the treatment plant must be located near the site where the ponds operate. In addition, if the brine entering into stage V is such that after treatment at the substages V.1 and V.2 has a lithium concentration greater than approximately 9 g/dm$^3$, the procedure object of this invention offers as an alternative to obtain "raw" lithium carbonate from the pre-concentrated and treated brine obtained at stage V. In this case, and due to the low lithium concentration in the liquid phase delivered by stage V, the "raw" lithium carbonate plant will be located in the same place where the ponds and the treatment plant operate. The purification of this "raw" lithium by applying the carbon dioxide purification process, filtering the lithium bicarbonate solution obtained after the carbonation process and using ion exchange resins to reduce the calcium content in this solution will result in a high-purity product.

But, as demonstrated earlier, if the liquid phase that delivers stage IV has a higher lithium concentration of approximately 35 g/dm$^3$, it is always better to transport pre-concentrated brine to sites with a better industrial infrastructure. In this case, after performing stage V, it is convenient to continue stages VI and VII to power the lithium carbonate plant with concentrated brine and with lower impurity content.

In the case of not transporting pre-concentrated brine due to the low lithium concentration in the brines delivered by the stage IV, if it is decided not to produce "raw" lithium carbonate from the liquid phase delivered by stage V, even if the lithium concentration in this brine is greater than approximately 9 g/dm$^3$, the performance of stages VI and VII of final concentration is continued, until a lithium ion concentration between approximately 65 g/dm$^3$ and 75 g/dm$^3$ is reached in the brine. These stages can be performed in a solar pond system in which sodium chloride crystals will mainly be crystallized and precipitated. But, if in the vicinity of the site of the pre-concentration ponds and the treatment plant industrial infrastructure is available, taking into account that the contents of calcium, magnesium and sulfate are low in the liquid phase that delivers stage V, there are more advantages to perform these final concentration stages in thermally assisted evaporative crystallizers. In these cases, high-purity sodium chloride and distilled water, which is very useful considering that fresh water is a scarce resource in the Region of salt flats, will also be obtained as by-products.

As shown in the following Table, for the three Examples presented below in detail, as the process evolves through the stages involved, the mass ratios of ion/lithium concentration are reduced for impurities.

Table of Evolution of Brines of Each Salt Flat in Examples 1, 2 and 3 in Accordance with the Progress of the Procedure of the Invention.

| S. Diablillos | Ca/Li | Mg/Li | B/Li | Na/Li | SO$_4$/Li | K/Li |
|---|---|---|---|---|---|---|
| SN | 1.33 | 4.00 | 1.07 | 84.37 | 12.12 | 9.96 |
| FL I | 0.04 | 3.60 | 1.07 | 15.92 | 9.77 | 9.34 |
| FL II | 0.03 | 3.50 | 1.06 | 13.54 | 3.51 | 8.74 |
| FL III | 0.81 | 3.70 | 0.99 | 12.77 | 0.01 | 6.03 |
| FL IV | 0.50 | 1.32 | 0.47 | 0.09 | 0.01 | 0.10 |
| FL V | 0.11 | 4.68E−0.5 | 0.05 | 3.12 | 0.03 | 0.09 |
| FL VI | 0.07 | 1.5E−05 | 0.04 | 0.93 | 0.03 | 0.09 |
| FL VII | 0.027 | 1.2E−05 | 0.023 | 0.013 | 0.015 | 0.089 |

| S. Pozuelos | Ca/Li | Mg/Li | B/Li | Na/Li | SO$_4$/Li | K/Li |
|---|---|---|---|---|---|---|
| SN | 3.4 | 10.8 | 1.08 | 299 | 14.6 | 9.7 |
| FL I | 0.02 | 8.3 | 0.97 | 2.22 | 5.82 | 3.84 |
| FL II | 0.017 | 7.8 | 0.84 | 1.71 | 3.76 | 2.06 |
| FL III | 0.23 | 8.49 | 0.78 | 2.0 | 0.34 | 2.2 |
| FL IV | 0.09 | 1.77 | 0.35 | 0.02 | 0.024 | 0.02 |
| FL V | 6E−04 | 4.68E−0.5 | 0.10 | 3.8 | 0.003 | 0.03 |
| FL VI | 9E−04 | 5E−05 | 0.095 | 0.87 | 0.001 | 0.03 |
| FL VII | 5E−04 | 4E−05 | 0.089 | 0.016 | 0.001 | 0.025 |

| S. Rio Grande | Ca/Li | Mg/Li | B/LI | Na/Li | SO4/Li | K/Li |
|---|---|---|---|---|---|---|
| SN | 0.64 | 12.46 | 1.02 | 302 | 84 | 18 |
| FL I | 0.05 | 12.12 | 1.1 | 39 | 58 | 16 |
| FL II | 0.04 | 11.81 | 0.93 | 16 | 9.3 | 8 |
| FL III | 0.52 | 12.07 | 1.1 | 16 | 1.67 | 0.86 |
| FL IV | 0.01 | 7.30 | 0.77 | 0.09 | 0.437 | 0.065 |
| FL V | 0.03 | 0.01 | 0.22 | 14 | 0.047 | 0.07 |
| FL VI | 9E−04 | 1E−04 | 0.18 | 0.9 | 0.001 | 0.04 |
| FL VII | 5E−04 | 4E−05 | 0.088 | 0.016 | 0.001 | 0.025 |

FL I: Liquid phase that delivers stage I.
FL II: Liquid phase that delivers stage II.
FL III: Liquid phase that delivers stage III.
FL IV: Liquid phase that delivers stage IV.
FL V: Liquid phase that delivers stage V.
FL VI: Liquid phase that delivers stage VI.
FL VII: Liquid phase that delivers stage VII.

When it is not possible to transport pre-concentrated brine to a site with an industrial infrastructure with more than approximately 35 g/dm$^3$ of lithium, the possibility of obtaining a treated brine with a lithium concentration between approximately 65 g/dm$^3$ and approximately 75 g/dm$^3$ and with low impurity content, enables to transport it to places with a better infrastructure for the location of raw and purified lithium carbonate plants. While this has the disadvantage of increasing the transport cost of concentrated brine and recycling solution per ton of lithium carbonate produced, it has advantages that far outweigh this increase. The most important advantage is the reduction of the operating cost by the availability of thermal and electrical energy at lower costs, for example, by locating the plants of raw and purified products in the vicinity of a power plant and operating more efficiently without pressurized reactors, due to the fact that it is located at lower height above sea level. On the other hand, this alternative also provides the possibility of concentrating the recycle of plants of raw and purified products in such a way that it is possible to transport the same quantity of liquid that is transported to lithium carbonate plants to the pond sector; this optimizes the transport system between ponds and plants. This alternative also allows the possibility of purging and concentrating part of the recycle of raw reactor to obtain other chemical species present in natural brine such as rubidium and caesium.

Figure 8:
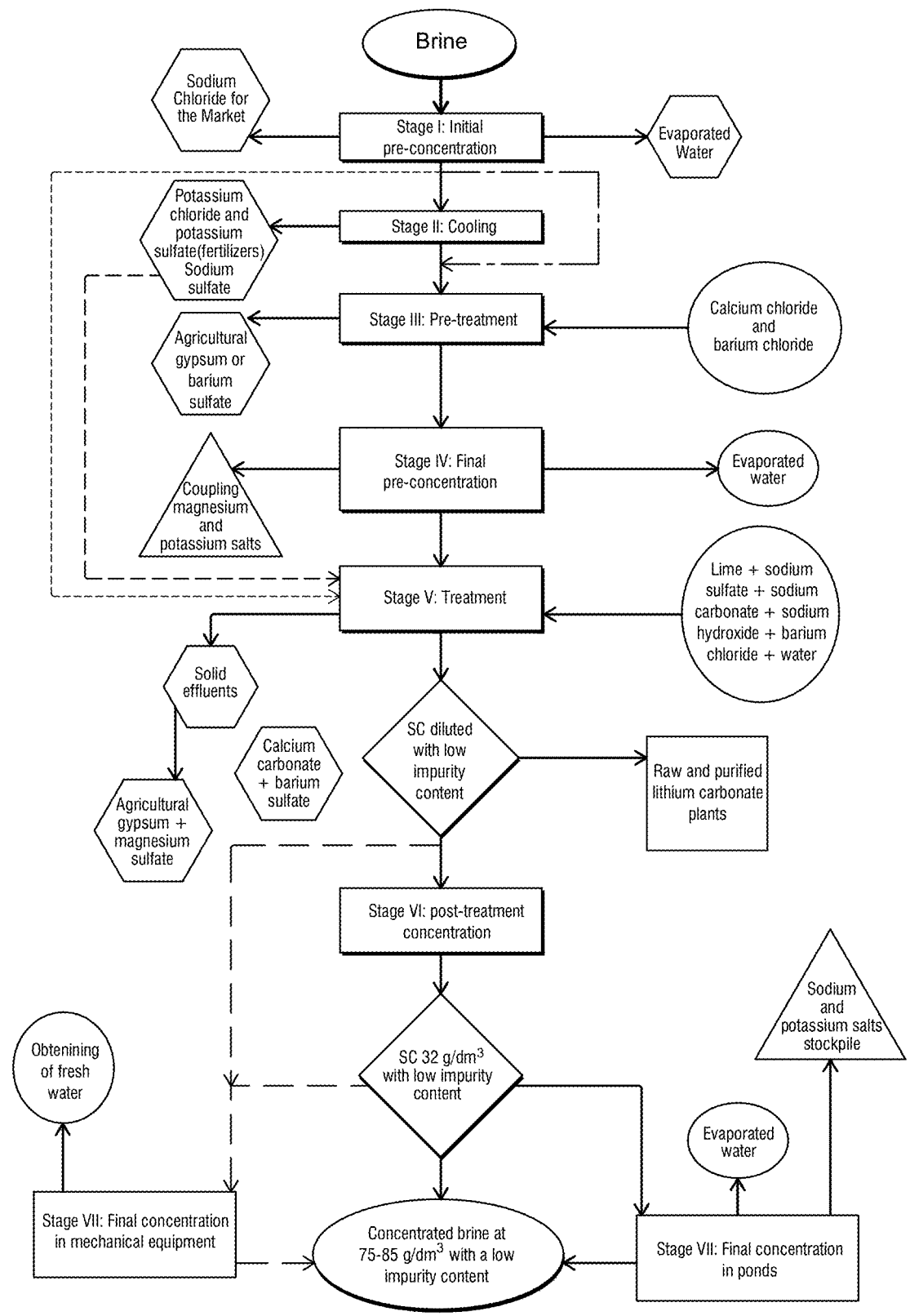
FIG. 8 shows a flowchart of a preferred form of conducting the procedure in accordance with this invention.

FIG. 8 contains the flowchart of the procedure object of this invention, whose main characteristics are the following:
1) The execution of the procedure for obtaining concentrated brine with low impurity content at seven stages: initial pre-concentration, cooling, pre-treatment, final pre-concentration, treatment, post-treatment concentration and final concentration.
2) The processing of all brine extracted from the salt flat that ensures no return to the basin of depleted and/or adulterated brine, or any other liquid effluent.
3) Obtaining high-purity sodium chloride at the first substage of the initial pre-concentration stage. This product is used as a raw material to produce salt for human consumption, as well as salt for industrial use, salt breads for direct use in livestock and raw material for the production of mineralized salt for use in livestock.
4) The definition of a degree of lithium concentration, as a limit of the initial pre-concentration stage I without crystallizing lithium-containing salts in their chemical formula, to ensure a significant volume reduction of the liquid phase.
5) The operational feasibility of the cooling stage execution using mechanical cooling crystallization equipment, when the volume of the liquid phase that delivers stage I is not very large, for example, preferably between approximately 5% and approximately 12% of the volume of incoming natural brine and the quantity of sulfate anion-containing salts and crystallize by cooling is not high, for example, less than 6 tons of equivalent anhydrous salt per ton of lithium carbonate.
6) The operational feasibility of the execution of the cooling stage during the months of June and July taking advantage of the low temperatures that characterize the climate where the main salt flats of the southern hemisphere are located, when the quantity of heat, i.e. sensitive heat plus latent heat, to be extracted from the liquid phase that delivers stage I is high because the quantity of sulfate anion-containing salts and cooling crystallization is high, for example, greater than about 6 tons of equivalent anhydrous salt per ton of lithium carbonate.
7) Depending on the chemical composition of brine, obtaining sodium sulfate and/or potassium chloride and/or potassium sulfate, from the separate salts at the cooling stage. Sodium sulfate is used in the paper and glass industry; potassium salts are used as fertilizers.
8) The possibility of using the separate sodium sulfate at the cooling stage as an input of sulfate anions at the treatment stage. This reduces the cost of reagents per ton of lithium carbonate.
9) Minimization of the use of reagents, e.g. calcium chloride or barium chloride, at the pre-treatment stage, for having managed to significantly and naturally reduce the sulfate/lithium ratio using favorable weather conditions or mechanical cooling crystallizers.
10) The increase in lithium recovery, by efficient wash of solid effluents obtained at the pre-treatment stage, using a water mass equal to one third of the drained solid effluent mass obtained.
11) Obtaining barium sulfate from the solid effluents obtained at the pre-treatment stage, when barium chloride is used as a reagent. This product is used as a filler material in rubber products, in paints as permanent white and in linoleum, among other applications.
12) Obtaining calcium sulfate from the solid effluents obtained at the pre-treatment stage, when calcium chloride is used as a reagent. This product is used as an agricultural gypsum.
13) Obtaining a mixture of sodium chloride and potassium chloride at the first substages of stage IV, from which potassium chloride which is used as a fertilizer can be obtained.
14) The definition of a degree of lithium concentration, as a limit of final pre-concentration stage IV, to ensure a low magnesium/lithium ratio and, at the same time, the execution of substage V.1 of lithium recovery treatment greater than approximately 95% due to the separation and wash of the solid effluents obtained, using a filter press.
15) The alternative of transporting pre-concentrated brine with more than g/dm$^3$ to sites with an industrial infrastructure where stages V, VI and VII are performed by improving the performance of the procedure.
16) The possibility of adding, when necessary, potassium chloride to the last substages of stage IV, to reach a lithium concentration greater than approximately 35 g/dm$^3$, without crystallizing lithium-containing salts in their chemical formula. When the availability of potassium chloride at the site of pond system, this is feasible.
17) The alternative of continuing with stages V, VI and VII at the same execution site of stages I, II, III and IV, obtaining brine with a lithium concentration between approximately 65 g/dm$^3$ and approximately g/dm$^3$, and with low impurity content.
18) Treatment at stage V of brine with final pre-concentration at two substages. At the first substage V.1, using calcium hydroxide and sodium sulfate, or other water-soluble sulfates of chemical or mining origin such as mirabilite or thenardite as reagents, to reduce the contents of magnesium, calcium and boron. At the second substage V.2, using a minimum quantity of sodium hydroxide, sodium carbonate and barium chloride to minimize the contents of magnesium, calcium and sulfate.
19) The increase in lithium recovery by efficient wash of solid effluents obtained at the substage V.1, using a water mass equal to approximately 2 m$^3$/t of dry solids obtained after treatment.
20) The increase in lithium recovery by efficient wash of solid effluents obtained at substage V.2, using a water mass equal to one third of the drained solid effluent mass obtained.
21) The minimum specific reagent consumption used at the treatment stage due to the minimum mass ratio of magnesium/lithium concentrations obtained in the liquid phase that delivers stage IV.
22) Obtaining marketable quantities of agricultural gypsum and magnesium sulfate as a fertilizer processing all the solid effluent generated at the treatment stage.
23) The possibility of obtaining a "raw" lithium carbonate with low impurity content, from the brine obtained as a liquid phase after the treatment stage.
24) The possibility of obtaining battery-grade lithium carbonate from the "raw" lithium carbonate referred to in item 23 above).
25) Ensure the increase in lithium recovery by the use of cleaning and washing ponds of salts obtained in the ponds included at stages I, IV, VI and VII, and in the crystallizers included at the cooling stage II. This increase in recovery reduces specific reagent consumption.
26) Determine that the volume of water for washing salts referred to in the aforementioned item 25) is related to the volume of effective porosity of the crystal bed deposited on the floor of the ponds and natural crystallizers, and with the lithium concentration in the liquid phase that embeds crystals.
27) Consider minimizing the area of the cleaning ponds, properly defining the pond area of each substage included at stages I, IV, VI and VII.
28) Consider using thermally assisted evaporative crystallizers from any primary source for the execution of stages VI and VII.
29) Enable to obtain fresh water, when the alternative of performing the final concentration stage in mechanical equipment is chosen.
30) Enable increased lithium recovery by the best separation and wash of solids, when stages VI and VII are performed in evaporative crystallizers.
31) Enable the transport of the concentrated brine obtained, to places with a better infrastructure for the location of raw and purified lithium carbonate plants. This allows for better plant yields and lower operating costs.
32) When it is planned to operate by transporting recycling brine to the pond sector, the procedure provides the possibility of transporting the same quantity of liquid that returns to the ponds from the location of them, optimizing the transport system between ponds and plants.

33) Obtaining concentrated brine with low impurity content also provides the possibility of operating "raw" and purified lithium carbonate plants without the need to transport solutions that are recycled to the location of the ponds.

34) When "raw" and purified lithium carbonate plants are located in places with a good industrial infrastructure, it is possible to accumulate and concentrate the purge of the "raw" reactor in order to obtain commercially valuable compounds from other chemical species present in natural brine, e.g. rubidium and caesium.

35) The procedure object of this invention allows to produce lithium carbonate and/or lithium hydroxide with the quality specifications required by different users, in a single plant located in a site with a good industrial infrastructure, to which the following is transported: i) pre-concentrated brine with more than 35 g/dm$^3$ of lithium to perform stages V, VI and VII and then produce the lithium compounds, and ii) treated and concentrated brine with more than 65 g/dm$^3$ of lithium to produce the lithium compounds.

The operating variables of each and all stages of the procedure object of this invention were determined based on the results obtained in a field and laboratory test (ensayo de campo y de laboratorio, ECL).

The volume required to initiate the ECL is calculated based on the lithium ion content of the natural brine to be processed, and the volume to be obtained from concentrated brine at approximately 75 g/dm$^3$, at the end of the process. This final volume should be such that it is possible to verify the process of obtaining any of the pure lithium compounds, e.g. lithium carbonate. Preferably, this volume should be greater than approximately 3 dm$^3$. Then, assuming a recovery level of approximately 70%, the initial volume for the field and laboratory test should be greater than:

$$V_{initial} > \frac{3*75}{0.7*[Li^+]_{SN}}$$

For most brines contained, for example, in the salt flats from the Argentine Puna, Bolivian Altiplano and Atacama Desert, the lithium content is between approximately 350 mg/dm$^3$ and approximately 1,500 mg/dm$^3$. This determines that the initial volume for the ECL is generally between approximately 220 dm$^3$ and approximately 920 dm$^3$.

The operating variables that are measured during the execution of ECL, simulating the evolution of the stages that are performed in solar evaporation ponds such as those corresponding to stages I, IV, VI and VII, are:

The incoming and outcoming volume (V) of the liquid phase (fase líquida, FL) of each substage that integrates the stage [V FL(x)].

The temperature, density, pH, quantity of total dissolved solids (sólidos totales disueltos, STD) and the incoming and outcoming chemical composition of the liquid phase of each substage that integrates the stage.

For crystallized, precipitated and separated solids by runoff at each substage that integrates the stage, the mass, chemical composition, total mass of evaporated water are determined when they are heated at approximately 105° C., salts contained are determined and humidity (H) is estimated. The volume value of the moisturizing solution is also calculated.

For stage II, the following is measured:

The incoming and outcoming volume (V) of the liquid phase (FL) of the stage.

The temperature, density, pH, quantity of total dissolved solids (STD) and incoming and outcoming chemical composition of the liquid phase of the stage.

For crystallized, precipitated and separated solids by runoff at the stage, the mass, chemical composition, total mass of evaporated water are determined when they are heated at approximately 105° C., salts contained are determined and humidity (H) is estimated. The volume value of the moisturizing solution is also calculated.

At stages III and V, the following is determined:
a) The quantity of reagents required at each substage.
b) The temperature, density, pH, quantity of total dissolved solids (STD) and incoming and outcoming chemical composition of the liquid phase of each substage.
c) The mass, chemical composition, total mass of evaporated water when they are heated at approximately 105° C., salts contained are determined and humidity (H) of solid effluents obtained in each pre-treatment and treatment substage is estimated. The volume value of the moisturizing solution of these solid effluents is also calculated.

With the information obtained from ECL and, in order to show that the procedure object of this invention is applicable on an industrial scale, for example, for 10,000 t of lithium carbonate per year, the operating variables that characterize the evolution of the ponds included at stages I, IV, VI and VII for the first period of unharvested operation and the following harvesting operating periods that alternate with the cleaning periods. Then, what aforementioned operating variables are indicated, and how the value corresponding to the default annual production is obtained.

Annual liquid phase volumes entering into the pond(s) of Stages I.1, IV.1 and VI: Extrapolated from ECL results Lithium concentration, density and content of total dissolved solids from the liquid phase entering into the solar evaporation ponds included in the procedure: Data obtained from ECL Lithium concentration, density and content of total dissolved solids from the brine that comes out of any of the solar evaporation ponds included in the procedure: Data which is obtained from ECL and is the variables at which the ponds operate.

Total annual volume of the liquid phase generated in any of the solar evaporation ponds included in the procedure: Calculated using a mass balance for lithium.

Total mass of evaporated water when the drained precipitated solids are heated at approximately 105° C.; salts contained are determined and humidity (H) is estimated: Data obtained from ECL.

Annual quantity of precipitated salts in dry base mass units (sales precipitadas, SP): Calculated using a mass balance that, in addition to the contents of total dissolved solids in the liquid phase that annually enters into the pond and in the total annual volume of the liquid phase generated, the crystallization water contained in the precipitated salts must be taken into account; for the post-harvest operating period, the result is compared to the corresponding value extrapolated from ECL.

Moisturizing solution volume (Volumen de solución de mojadura, $V_{SM}$) of precipitated salts: Calculated based on the humidity of the precipitated salts, density and content of total dissolved solids from the liquid phase at which the pond operates; for the post-harvest operating period it is compared to the corresponding value extrapolated from ECL.

Quantity of water evaporated by the pond: Calculated using a mass balance.

Pumping water: For the purpose of avoiding crystallization in pipes and fittings it is considered to be equal to approximately 0.5% of the pumped unsaturated brine flow, and equal to approximately 1% of the flow pumped if saturated liquid phase is treated.

Effective porosity volume of the crystal bed: It is estimated based on the magnesium chloride content in the liquid phase, in accordance with the patent filed by Ulrich E. G. (1971).

Water for washing precipitated salts and solid effluents obtained at the pre-treatment and treatment stages: For the calculation the following is considered: i) precipitated salts in ponds are washed by immersion one or more times, depending on the lithium concentration in the phase liquid, with a volume of fresh water of the order of the volume corresponding to the effective porosity of the crystal bed; ii) solid effluents obtained at the pre-treatment stage and treatment substage V.2 are washed with a water mass equal to one third of the drained solid effluent mass obtained; iii) solid effluents obtained at substage V.1 are washed with a water volume of approximately 2 m$^3$ per ton of dry solid effluent, in accordance with the results of experiences in the use of filter press.

Equivalent volume recovered from moisturizing solution by washing precipitated salts: With the washing procedure described in the previous item, a recovery of approximately 80% of the brine trapped in the precipitated crystal bed and between approximately 45% and approximately 85% of the lithium contained in the moisturizing solution of the solid phase is considered, depending on the concentration of the liquid phase in equilibrium with the precipitated crystals.

Liquid phase volume that delivers any of the solar evaporation ponds included in the procedure: Calculated using a mass balance that considers the volume of trapped brine, effective porosity volume, and moisturizing solution volume for the operation of the first unharvested period, and the recovery percentages indicated in the previous item for subsequent unharvested periods. For any post-harvest operating period it is compared to the corresponding value extrapolated from ECL.

Total volume of precipitated salts: It is calculated with the mass and density, dry base of the precipitated salts, the total porosity volume, the trapped brine volume plus the estimated empty space at approximately 5% of the total porosity, and the calculated moisturizing solution volume.

Total volume of precipitated salts per mass unit: Calculated by dividing the total volume of precipitated salts multiplied by the mass of precipitated salts.

Average evaporation rate in the period: Obtained by trials, which are executed throughout a year, in defined evaporation and volume area containers, determining the quantity of water evaporated by differences in weight. These tests are performed for the different liquid phases at which the ponds at stages I, IV, VI and VII of the procedure operate, and the results are corrected with a factor preferably equal to 0.70 to obtain the value corresponding to the operation of the ponds. EXAMPLE 4 details a test to obtain evaporation rate values at different concentrations and chemical composition of liquid phases.

Annual water mass that evaporates each solar evaporation pond included in the procedure: Calculated with a mass balance that considers the incoming annual brine mass, annual brine mass generated, mass of precipitated solids, annual mass of pumping water of incoming brine and, except for the first unharvested period, the water needed to wash the precipitated salts after a year Area of each solar evaporation pond included in the procedure: Calculated with the annual water mass evaporating the pond and the average annual evaporation rate corresponding to the chemical composition of the liquid phase at which the pond operates.

Growth of the salt bed at the bottom of the ponds within two years: Calculated with the total volume of precipitated salts and the area of the pond. The result is preferably added to approximately 0.15 m, which is the height of salt that is estimated to leave as a sacrifice for protection of the waterproof cover.

Free brine height: predetermined. This variable depends on the charging time of the pond system.

Liquid phase fraction retained in the bed of precipitated salts: Calculated with the annual volume of liquid phase retained in effective porosity, with the annual volume of liquid phase retained as a moisturizing solution and with the total annual volume of liquid phase generated by the pond.

Final volume of the liquid phase for the charging period: for each solar evaporation pond included in the procedure, it is calculated with the free brine height, the liquid phase fraction retained in the bed of precipitated salts and the total area of the pond.

Charging time: For each solar evaporation pond included in the procedure, it is calculated with the final volume of the liquid phase for the charging period and the total annual volume of liquid phase generated by the pond.

Operating variables of stages II, cooling; III, pre-treatment; and V, treatment; they are also obtained by extrapolating the information obtained in the field and laboratory tests and from the annual volumes that deliver stages I and IV.

Examples

Three examples of field and laboratory tests and calculation of the operating variables that characterize the evolution of the seven stages of the procedure are described for brine from three salt flats. For the purpose of showing the different alternatives offered by the procedure, the following is considered:

in example 1 the cooling process at Stage II is carried out with mechanical cooling crystallization equipment and the concentration equipment corresponding to stages VI and VII is performed in solar evaporation ponds.

in example 2 the cooling process at stage II is carried out with mechanical cooling crystallization equipment, pre-concentrated brine is transported and stages V, VI and VII are performed in a site with an industrial infrastructure.

in example 3 the cooling process at stage II is carried out by taking advantage of natural conditions and the concentration one corresponding to stages VI and VII is carried out in solar evaporation ponds.

By way of example, the results of field and laboratory tests and calculation of operating variables performed for brine contained in the Diablillos, Pozuelo y Río Grande salt flats are detailed below.

Example 1: Natural Brine from the Diablillos Salt Flat

This Salt flat is a salt deposit located in the Region of Argentine Puna at more than 3,900 msnm.
Field and Laboratory Test
STAGE I: Initial Pre-Concentration
On day 1, at 4,050 msnm, three similar ponds with natural brine identified as [1]FL (i) are charged to start the solar evaporation and fractional crystallization process.

| [1]FL (i): Initial liquid phase of stage I | | | | | |
|---|---|---|---|---|---|
| [1]V FL(i)= | 542 | dm$^3$ | [5]ρ (i)= | 1.125 | kg/dm$^3$ |
| [2]A FL(i)= | 2.7648 | m$^2$ | pH (i)= | 6 | UpH |
| [3]h FL(i)= | 19.6 | cm | [6]T= | 17 | ° C. |
| [4]STD FL(i)= | 180 | g/dm$^3$ | | | |

[1]V: Volume
[2]A: Area
[3]h: height
[4]STD: Total dissolved solids
[5]ρ: density
[6]T: Temperature Initial Liquid Phase Chemistry (FL (i)):

| UNIT | DETERMINATION | | | | | |
|---|---|---|---|---|---|---|
| | Li$^+$ mg/dm$^3$ | Ca$^{++}$ mg/dm$^3$ | Mg$^{++}$ mg/dm$^3$ | B$_4$O$_7^-$ mg/dm$^3$ | Na$^+$ mg/dm$^3$ | K$^+$ mg/dm$^3$ |
| TECHNIQUE | ICP-OES | ICP-OES | ICP-OES | ICP-OES | ICP-OES | ICP-OES |
| Comp. FL (i) | 678 | 900 | 2,713 | 2,606 | 57,205 | 6,756 |

| UNIT | DETERMINATION | | | | | |
|---|---|---|---|---|---|---|
| | Ba$^{++}$ mg/dm$^3$ | Sr$^{++}$ mg/dm$^3$ | Fe$^{+++}$ mg/dm$^3$ | Mn mg/dm$^3$ | Cl$^-$ mg/dm$^3$ | PO$_4^{3-}$ mg/dm$^3$ |
| TECHNIQUE | ICP-OES | ICP-OES | ICP-OES | ICP-OES | Argentometry | Colorimetric |
| Comp. FL (i) | <0.2 | 19 | 6 | <1 | 98,901 | <20 |

| UNIT | DETERMINATION | | | | | |
|---|---|---|---|---|---|---|
| | SO$_4^=$ mg/dm$^3$ | Alkalinity mg/dm$^3$ | CO$_3^{\#}$ mg/dm$^3$ | HCO$_3^-$ mg/dm$^3$ | pH UpH | Density kg/dm$^3$ |
| TECHNIQUE | Gravimetry | Volumetry | Volumetry | Volumetry | Potentiometry | Pycnometry |
| Comp. FL (i) | 8,219 | 2,038 | N.D. | 1,814 | 6 | 1.125 |

| Ionic balance | Charges+ | 2,976 | | |
|---|---|---|---|---|
| | Charges− | 3,020 | Deviation | 0.007 |

Substage I.1

The brine (FL (I)) arranged in the three ponds is exposed to the solar evaporation process at 4,050 msnm for 10 days. On day 19 the precipitated crystals are separated from the liquid phase, and the following is obtained:

FL (I.1) which is arranged in two ponds to continue the solar evaporation process

| V FL(I.1)= | 328 | dm$^3$ |
|---|---|---|
| A FL(I.1)= | 1.84 | m$^2$ |
| h FL(I.1)= | 17.8 | cm |
| STD FL(I.1)= | 273 | g/dm$^3$ |

Liquid phase chemistry (FL (I.1)):

| UNIT | DETERMINATION | | | | | |
|---|---|---|---|---|---|---|
| | Li$^+$ mg/dm$^3$ | Ca$^{++}$ mg/dm$^3$ | Mg$^{++}$ mg/dm$^3$ | B$_4$O$_7^-$ mg/dm$^3$ | Na$^+$ mg/dm$^3$ | K$^+$ mg/dm$^3$ |
| TECHNIQUE | ICP-OES | ICP-OES | ICP-OES | ICP-OES | ICP-OES | ICP-OES |
| Comp. FL (I.1) | 1,087 | 639 | 3,911 | 3,987 | 86,400 | 11,104 |

| UNIT | DETERMINATION | | | | | |
|---|---|---|---|---|---|---|
| | $Ba^{++}$ mg/dm$^3$ | $Sr^{++}$ mg/dm$^3$ | $Fe^{+++}$ mg/dm$^3$ | Mn mg/dm$^3$ | $Cl^-$ mg/dm$^3$ | $PO_4^{3-}$ mg/dm$^3$ |
| TECHNIQUE Comp. FL (I.1) | ICP-OES 0.275 | ICP-OES 19 | ICP-OES <0.2 | ICP-OES <1 | Argentometry 151,109 | Colorimetric <20 |

| UNIT | DETERMINATION | | | | | |
|---|---|---|---|---|---|---|
| | $SO_4^=$ mg/dm$^3$ | Alkalinity mg/dm$^3$ | $CO_3^-$ mg/dm$^3$ | $HCO_3^-$ mg/dm$^3$ | pH UpH | Density mg/dm$^3$ |
| TECHNIQUE Comp. FL (I.1) | Gravimetry 13,124 | Volumetry 1,488 | Volumetry N.D. | Volumetry 1,815 | Potentiometry 6.00 | Pycnometry 1.192 |

| Ionic balance | Charges+ | 4,551 | Deviation | 0.007 |
|---|---|---|---|---|
| | Charges− | 4,611 | | |

B.1) Precipitated Solids (SP I.1))
  Total evaporated water at 105° C.=19.48%
  $^2$M SP (1.1)=10.855 kg; $^3$H=19.48%
  $^2$M SP: Precipitated solid mass
  $^3$H: Humidity
Precipitated Solid Chemistry by Passing from FL(i) to FL (I.1) (SP (I.1)):

| UNIT | DETERMINATION | | | | | |
|---|---|---|---|---|---|---|
| | $Li^+$ ppm | $Ca^{++}$ ppm | $Mg^{++}$ ppm | B ppm | $Na^+$ % (w/w) | $K^+$ ppm |
| TECHNIQUE Comp. SP (I.1) | ICP-OES 309 | ICP-OES 1,415 | ICP-OES 1,210 | ICP-OES 370 | ICP-OES 37.27 | ICP-OES 4,174 |

| DETERMINATION | $Cl^-$ | $SO_4^=$ | Humidity | Insolubles |
|---|---|---|---|---|
| UNIT | % (w/w) | ppm | % (w/w) | % (w/w) |
| TECHNIQUE | Argentometry | Gravimetry | Gravimetry | Gravimetry |
| Comp. SP (I.1) | 57.01 | 5029 | 19.48 | 1.911 |

Theoretical Calculation of the Precipitated Solid Mass SP(I.1):

| | Mass in FL (i) | Mass in FL (I.1) | Precipitated mass | Precipitated moles | |
|---|---|---|---|---|---|
| Unit | g | g | g | moles | g |
| $Na^+$ | 30,999 | 28,537 | 2,462 | 107 | |
| $K^+$ | 3,661 | 3,668 | — | — | |
| $Ca^{++}$ | 488 | 211 | 277 | 7 | |
| $Cl^-$ | 53,595 | 49,910 | 3,685 | 104 | |
| $SO_4^=$ | 4,454 | 4,335 | 119 | 1.2 | |
| $HCO_3^-$ | 983 | 599 | 384 | 6 | |
| $B_4O_7^=$ | 1,412 | 1,317 | 95 | 0.6 | |
| | | | 7,022 | | |

| | | |
|---|---|---|
| STD (i) | 97,443 | g |
| STD (I.1) | 90,234 | g |
| SP (I.1) | 7,209 | g |

Deviation 0.01
Total precipitated 7,349.9 g
Calculation of the Moisturizing Solution Volume (Vsm (I.1)):

| | |
|---|---|
| Vsm (I.1) | 2.3 dm$^3$ |
| Moisturizing solution mass | 2.7 kg |
| Insoluble mass in precipitate | 0.1 kg |

Precipitated salts 105 moles of NaCl
Theoretical precipitated 10,041 g Deviation −0.039 mass
Harvested crystal mass 10,855 g
  The specific quantity of good quality pond salt that can be obtained at this Substage is 5.5 t/t of CLE, wherein: CLE: equivalent lithium carbonate
Calculation of the Apparent Evaporation Rate (Tasa De Evaporación Aparente, TEA):

| | |
|---|---|
| Initial brine mass | 609.6 kg |
| Final brine mass | 391.1 kg |
| SP mass | 10.9 kg |

| | |
|---|---|
| Evaporation water mass | 207.7 kg |
| Period | 19 days |
| Evaporation area | 2.7648 m$^2$ |

TEA=3.95 dm$^3$/(m$^2$ day)
Substage I.2
  The brine FL (I.1) arranged in the two ponds is exposed to continue the solar evaporation process at 4,050 msnm during 23 days. On day 23 the precipitated crystals are separated from the liquid phase, and the following is obtained:
  FL (I.2) that is transported to the laboratory is weighed, density is measured, volume is calculated and analyzed.

| | |
|---|---|
| Mass FL I.(2) | 86.32 kg |
| ρ (FL (I.2)) | 1.265 kg/dm³ |
| V (FL (I.2)) | 68.24 dm³ |
| STD (FL(I.2)) | 396 g/dm³ |

FL (I.2) Chemistry:

| | DETERMINATION | | | | | |
|---|---|---|---|---|---|---|
| UNIT | $Li^+$ mg/dm³ | $Ca^{++}$ mg/dm³ | $Mg^{++}$ mg/dm³ | $B_4O_7^-$ mg/dm³ | $Na^+$ mg/dm³ | $K^+$ mg/dm³ |
| TECHNIQUE | ICP-OES | ICP-OES | ICP-OES | ICP-OES | ICP-OES | ICP-OES |
| Comp. FL (I.2) | 4,741 | 170 | 17,063 | 18,237 | 75,454 | 44,258 |

| | DETERMINATION | | | | | |
|---|---|---|---|---|---|---|
| UNIT | $Ba^{++}$ mg/dm³ | $Sr^{++}$ mg/dm³ | $Fe^{+++}$ mg/dm³ | Mn mg/dm³ | $Cl^-$ mg/dm³ | $PO_4^{3-}$ mg/dm³ |
| TECHNIQUE | ICP-OES | ICP-OES | ICP-OES | ICP-OES | Argentometry | Colorimetric |
| Comp. FL (I.2) | 1.330 | — | — | — | 189,397 | <20 |

| | DETERMINATION | | | | | |
|---|---|---|---|---|---|---|
| UNIT | $SO_4^-$ mg/dm³ | Alkalinity mg/dm³ | $CO_3^-$ mg/dm³ | $HCO_3^-$ mg/dm³ | pH UpH | Density mg/dm³ |
| TECHNIQUE | Gravimetry | Volumetry | Volumetry | Volumetry | Potentiometry | Pycnometry |
| Comp. FL (I.2) | 46,318 | — | N.D. | — | 6.00 | 1.260 |

| Ionic balance | Charges + | 6,508 |
|---|---|---|
| | Charges − | 6,535 |

Deviation 0.002

B.2) Precipitated Solids (SP I.2))

Total evaporated W at 105° C.=19.48%

Total mass SP (1.2)=78.834 kg; H=19.48%

Precipitated Solid Chemistry (SP (I.2)):

| | DETERMINATION | | | | | |
|---|---|---|---|---|---|---|
| | $Li^+$ | $Ca^{++}$ | $Mg^{++}$ | B | $Na^+$ | $K^+$ |
| UNIT | % (w/w) | % (w/w) | % (w/w) | ppm | % (w/w) | % (w/w) |
| TECHNIQUE | ICP-OES | ICP-OES | ICP-OES | ICP-OES | ICP-OES | ICP-OES |
| Comp. SP (I.2) | 0.019 | — | 0.1959 | — | 38.84 | 1.14 |

| DETERMINATION | $Cl^-$ | $SO_4^-$ | Humidity | Insolubles |
|---|---|---|---|---|
| UNIT | % (w/w) | % (w/w) | % (w/w) | % (w/w) |
| TECHNIQUE | Argentometry | Gravimetry | Gravimetry | Gravimetry |
| Comp. SP (1.2) | 56.01 | 2.06 | 8.20 | 7.4 |

Theoretical calculation of the precipitated solid mass SP (I.2) (it does not include the solids contained in the moisturizing solution volume).

| Mass in FL Precipitated | | | | |
|---|---|---|---|---|
| | Mass in FL (I.1) | Mass in FL (I.2) | Precipitated mass | Precipitated moles |
| Unit | g | g | g | moles g |
| $Na^+$ | 28,347 | 5,752 | 22,595 | 982 |
| $K^+$ | 3,643 | 3,374 | 269 | 7 |
| $Ca^{++}$ | 210 | 13 | 197 | 4.9 |
| $Cl^-$ | 49,577 | 14,439 | 35,138 | 990 |
| $SO_4^-$ | 4,335 | 3,531 | 804 | 8.4 |
| $HCO_3^-$ | 595 | — | — | — |
| $B_4O_7^-$ | 1,308 | 1,390 | — | — |
| | | | 59,002 | |

| | |
|---|---|
| STD (I.1) | 89,633 |
| STD (I.2) | 30,162 |
| SP (I.2) | 59,470 |

Deviation 0.0040 g

Total precipitated: 64,222.6 g

Calculation of the Moisturizing Solution Volume (Vsm (1-2)):

| Precipitated salts: | |
|---|---|
| 982 moles | NaCl |
| 7 moles | KCl |
| 5 moles | $CaSO_4 \cdot 2H_2O$ |

| | |
|---|---|
| Vsm (I.2)= | 8.0 dm³ |
| SM mass | 10.1 kg |
| Insoluble mass in SP (I.2) | 4.8 kg |

| | |
|---|---|
| Theoretical precipitated mass | 74.304 kg |
| Harvested crystal mass | 78.83 kg |

Deviation −0.030

Calculation of the Apparent Evaporation Rate (TEA):

| | |
|---|---|
| Initial brine mass | 391.1 kg |
| Final brine mass | 86.3 kg |
| SP mass | 78.8 kg |
| Evaporation water mass | 225.9 kg |
| Period | 23 days |
| Evaporation area | 1.8432 m² |

TEA=5.33 dm³/(m² day)

Precipitated solids SP (I.1) and SP (I.2) contain more than 90% NaCl, then solar evaporation processes (I.1) and (I.2) could be included in a single substage of the initial pre-concentration stage

| | |
|---|---|
| Process recovery (I.1) | 97.1% |
| Process recovery (I.2) | 91% |
| Ratio (SO₄⁼/Li) in FL (i) | 12.12 |
| Ratio (SO₄⁼/Li) in FL (I.1) | 12.07 |
| Ratio (SO₄⁼/Li) in FL (I.2) | 9.77 |

STAGE II: Cooling

On day 25, the pre-concentrated brine FL (I.2) is cooled at −7° C. in a freezer located at 2,000 msnm, for a period of 3 days, and the following is obtained.

¹FL (II) that is transported to the laboratory is weighed, density is measured, volume is calculated and analyzed.

During the separation process of the liquid phase FL (II) from the precipitated solids SP (II) 3.1 dm³ of the FL (II) was discarded to remove the sedimented clay at the bottom of the container during the cooling process.

¹FL (II): Liquid Phase of Stage II

Liquid Phase FL (II):

| | |
|---|---|
| Mass FL (II) | 75.25 kg |
| ρ (FL (II)) | 1.22 kg/dm³ |
| V (FL (II)) | 61.68 dm³ |
| STD (FL(II)) | 349 g/dm³ |

FL (II) Chemistry:

| DETERMINATION | Li⁺ | Ca⁺⁺ | Mg⁺⁺ | B₄O₇⁼ | Na⁺ | K⁺ |
|---|---|---|---|---|---|---|
| UNIT | mg/dm³ | mg/dm³ | mg/dm³ | mg/dm³ | mg/dm³ | mg/dm³ |
| TECHNIQUE | ICP-OES | ICP-OES | ICP-OES | ICP-OES | ICP-OES | ICP-OES |
| Comp. FL (II) | 5,064 | 130 | 17,733 | 19,314 | 68,589 | 30,546 |

| DETERMINATION | Cl⁻ | SO₄⁼ | pH | Density |
|---|---|---|---|---|
| UNIT | mg/dm³ | mg/dm³ | UpH | kg/dm³ |
| TECHNIQUE | Argentometry | Gravimetry | Potentiometry | Pycnometry |
| Comp. FL (II) | 189,852 | 17,781 | 6.00 | 1.215 |

| Ionic balance | Charges + | 5,959 | Deviation | 0.001 |
|---|---|---|---|---|
| | Charges − | 5,967 | | |

Precipitated Solids (SP (II)):

Total mass SP (II)=6.100 kg; H==25.7%:

| | DETERMINATION | | | | | |
|---|---|---|---|---|---|---|
| | Li⁺ | Ca⁺⁺ | Mg⁺⁺ | B₄O₇⁼ | Na⁺ | K⁺ |
| UNIT | % (w/w) | % (w/w) | % (w/w) | % (w/w) | % (w/w) | % (w/w) |
| TECHNIQUE | ICP-OES | ICP-OES | ICP-OES | ICP-OES | ICP-OES | ICP-OES |
| Comp. SP (II) | 0.28 | 0.25 | 0.12 | — | 17.57 | 21.42 |

| DETERMINATION | Cl⁻ | SO₄⁼ | Humidity | Insolubles |
|---|---|---|---|---|
| UNIT | % (w/w) | % (w/w) | % (w/w) | % (w/w) |
| TECHNIQUE | Argentometry | Gravimetry | Gravimetry | Gravimetry |
| Comp. SP (II) | 18.87 | 41.74 | 25.70 | 1.5 |

Theoretical calculation of the precipitated solid mass SP (II) (it does not include the solids contained in the moisturizing solution volume):

| | Mass in FL (I.2) | Mass in FL (II) | Precipitated mass | Precipitated moles |
|---|---|---|---|---|
| Unit | g | g | g | moles g |
| Na⁺ | 5,149 | 4,567 | 582 | 25 |
| K⁺ | 3,020 | 2,034 | 986 | 25 |
| Ca⁺⁺ | 12 | 9 | 3 | 0 |
| Cl⁻ | 12,924 | 12,640 | 284 | 8 |
| SO₄⁼ | 3,161 | 1,184 | 1,977 | 21 |
| HCO3⁻ | — | — | — | |
| B₄O₇⁼ | 1,244 | 1,286 | — | |
| | | | 3,832 | |

| | |
|---|---|
| STD (I.2) | 26,997.30 |
| STD (II) | 23,237.13 |

Deviation −0.01
Precipitated Salts:

| | |
|---|---|
| Glaserite | 11 moles |
| NaCl | 7 moles |
| Total precipitated | 3,817.43 |

Calculation of the Moisturizing Solution Volume (Vsm (II)):

| | |
|---|---|
| Vsm (II)= | 1.8 dm$^3$ |
| SM mass | 2.2 kg |
| insoluble mass in SP (II) | 0.1 kg |

| | |
|---|---|
| theoretical precipitate mass | 5.979 kg |
| harvested crystal mass | 6.100 kg |

Deviation −0.010

The specific quantity of potassium salts (chloride and sulfate) that can be obtained at this stage is greater than 3.5 t/t of Lithium Carbonate (CL). Evolution of ion ratios until this stage:

| | $SO_4^=/Li^+$ | $Mg^{++}/Li^+$ | $K^+/Li^+$ |
|---|---|---|---|
| FL (i) | 12.12 | 4.00 | 9.96 |
| FL (I.1) | 12.07 | 3.60 | 10.22 |
| FL (I.2) | 9.77 | 3.60 | 9.34 |
| FL (II) | 3.51 | 3.50 | 6.03 |

STAGE III: Pre-Treatment 1,171 g of $CaCl_2 \cdot 2H_2O$ (s) is added to the total cooled solution calculated as the stoichiometric quantity (plus 10%) to precipitate 11.781 g/dm$^3$ of $SO_4^=$ After adding and stirring, it is verified that sulfate content in the brine is equal to 7.290 g/dm$^3$. Without separating the solid phase ($CaSO_4 \cdot 2H_2O$) 1,284 g of $BaCl_2 \cdot 2H_2O$ (s) is added by calculating the stoichiometric quantity (plus 10%) necessary to precipitate the remaining 7.290 g/dm$^3$ of sulfate in the liquid phase. After adding the reagent, 3.5 dm$^3$ of water, stirring and separating the phases, it is verified that the sulfate content in the brine is stabilized at 2.768 g/dm$^3$. It is clear that some of the precipitated calcium sulfate passed to barium sulfate, before phase separation, increasing the calcium ion content in the liquid phase.

Finally, 790 g of $BaCl_2 \cdot 2H_2O$ dissolved at 1.5 dm$^3$ of water is added to the liquid phase. After adding the reagent, it is stirred, allowed to stand for 24 hours and then the Phases are separated, and the following is obtained:

Liquid phase FL (III) that is weighed, density is measured, volume is calculated and analyzed:

| | |
|---|---|
| Mass FL (III) | 77.43 kg |
| ρ (FL (III)) | 1.22 kg/dm$^3$ |
| V (FL (III)) | 63.47 dm$^3$ |
| STD (FL(III)) | 324 g/dm$^3$ |

FL (III) Chemistry:

| | DETERMINATION | | | | | |
|---|---|---|---|---|---|---|
| | $Li^+$ | $Ca^{++}$ | $Mg^{++}$ | $B_4O_7^=$ | $Na^+$ | $K^+$ |
| | | | | UNIT | | |
| | mg/dm$^3$ | mg/dm$^3$ | mg/dm$^3$ | mg/dm$^3$ | mg/dm$^3$ | mg/dm$^3$ |
| TECHNIQUE | ICP-OES | ICP-OES | ICP-OES | ICP-OES | ICP-OES | ICP-OES |
| Comp. FL (III) | 4,680 | 3,792 | 17,335 | 16,586 | 59,747 | 28,238 |

| DETERMINATION | $Cl^-$ | $SO_4^=$ | pH | Density | $Ba^{++}$ |
|---|---|---|---|---|---|
| UNIT | mg/dm$^3$ | mg/dm$^3$ | UpH | kg/dm$^3$ | mg/dm$^3$ |
| TECHNIQUE | Argentometry | Gravimetry | Potentiometry | Pycnometry | ICP |
| Comp. FL (III) | 192,765 | 50 | 6.00 | 1.220 | 330 |

| | | | | |
|---|---|---|---|---|
| Ionic balance | Charges + | 5,615 | | |
| | Charges − | 5,645 | Deviation | 0.003 |

Precipitated Solids in Pre-Treatment (SP (III)):
Total mass SP (III)=4.900 kg; H=19.8%
Separate post-treatment solids contain:
57% $BaSO_4 \cdot 2H_2O$
5% glaserite
4.5% $CaSO_4 \cdot 2H_2O$
5% calcium borate
27% NaCl
1.5% KCl If the solid phase after pre-treatment with calcium chloride is separated, the solid obtained after adding barium chloride, it is barium sulfate mixed with less than 10% of water-soluble substances. Barium sulfate is obtained as a by-product from SP (III).

Reagent Requirement in Pre-Treatment

Assuming that the lithium recovery referring to the content in FL(III) and until obtaining Lithium Carbonate is 82%, the specific requirement of each reagent used is:

| | | | |
|---|---|---|---|
| $CaCl_2 \cdot 2H_2O$ | 0.903 | t $CaCl_2 \cdot 2H_2O$/t [1]CLE | |
| $BaCl_2 \cdot 2H_2O$ | 1.600 | t $BaCl_2 \cdot 2H_2O$/t CLE | |

Solid Effluent Generation in Pre-Treatment

Assuming that the lithium recovery referring to the content in FL(III) and until obtaining lithium carbonate is 82%, the solid effluent generation per final product unit is:

| | |
|---|---|
| 3.604 | t of solid effluent/t CLE |

Specific quantity of possible by-products to be obtained from the t-generated equivalent lithium carbonate (CLE) solid effluent:

| | |
|---|---|
| t $BaSO_4 \cdot 2H_2O$/t [1]CLE | 1.849 |
| t $CaSO_4 \cdot 2H_2O$/t CLE | 0.146 |

STAGE IV: Final Pre-Concentration

Substage IV.1

FL (III) is transported to the Diablillos Salt flat on day 66 and at noon two plastic boxes of area equal to 0.33 cm×0.52 cm each are charged, to continue with the natural evaporation and fractional crystallization process.

During the transport of FL (III) to the Salt flat and then in the transport of FL (IV.1) to the laboratory the equivalent value to 1 $dm^3$ of FL (IV.1) is lost.

On day 87 the precipitated crystals are separated from the liquid phase and the following is obtained.

FL (IV.1) that is transported to the laboratory is weighed, density is measured, volume is calculated and analyzed:

| | |
|---|---|
| Mass FL (IV.1) | 60 kg |
| ρ (FL (IV.1) | 1.23 kg/$dm^3$ |
| V (FL (IV.1)) | 47.81 $dm^3$ |
| STD (FL(IV.1)) | 354 g/$dm^3$ |

FL (IV.1) chemistry

| | DETERMINATION | | | | | |
|---|---|---|---|---|---|---|
| | $Li^+$ | $Ca^{++}$ | $Mg^{++}$ | $B_4O_7^=$ | $Na^+$ | $K^+$ |
| UNIT | mg/$dm^3$ | mg/$dm^3$ | mg/$dm^3$ | mg/$dm^3$ | mg/$dm^3$ | mg/$dm^3$ |
| TECHNIQUE | ICP-OES | ICP-OES | ICP-OES | ICP-OES | ICP-OES | ICP-OES |
| Comp. FL (IV.1) | 5,845 | 3,768 | 23,499 | 19,745 | 53,517 | 35,172 |

| DETERMINATION | $Cl^-$ | $SO_4^=$ | pH | Density | Ba |
|---|---|---|---|---|---|
| UNIT | mg/$dm^3$ | mg/$dm^3$ | UpH | kg/$dm^3$ | mg/$dm^3$ |
| TECHNIQUE | Argentometry | Gravimetry | Potentiometry | Pycnometry | ICP |
| Comp. FL (IV.1) | 212,062 | 250 | 4.00-5.00 | 1.230 | 366 |

| | | | | |
|---|---|---|---|---|
| Ionic balance | Charges + | 6,195 | | |
| | Charges − | 6,233 | Deviation | 0.003 |

Pre-Washed Precipitated Solids (SP (IV.1))

Total mass SP (IV.1)=4.360 kg; H=20.79%

Precipitated Solid Chemistry (SP (IV.1)):

| | DETERMINATION | | | | | |
|---|---|---|---|---|---|---|
| | $Li^+$ | $Ca^{++}$ | $Mg^{++}$ | $B_4O_7^=$ | $Na^+$ | $K^+$ |
| UNIT | % (w/w) | % (w/w) | % (w/w) | % (w/w) | % (w/w) | % (w/w) |
| TECHNIQUE | ICP-OES | ICP-OES | ICP-OES | ICP-OES | ICP-OES | ICP-OES |
| Comp. SP (IV.1) | 0.21 | 0.28 | 0.99 | 1.4180 | 32.84 | 1.47 |

| DETERMINATION | $Cl^-$ | $SO_4^-$ | Humidity | Insolubles |
|---|---|---|---|---|
| UNIT | % (w/w) | % (w/w) | % (w/w) | % (w/w) |
| TECHNIQUE | Argentometry | Gravimetry | Gravimetry | Gravimetry |
| Comp. SP (IV.1) | 53.91 | 0.00 | 20.79 | 1.5 |

Theoretical calculation of the precipitated solid mass SP (IVA) (it does not include the solids contained in the moisturizing solution volume).

| | Mass in FL (III) | Mass in FL (IV.1) | Precipitated mass | Precipitated moles |
|---|---|---|---|---|
| Unit | g | g | g | moles |
| $Na^+$ | 3,792 | 2618 | 1,174 | 51 |
| $K^+$ | 1,792 | 1720 | 72 | 2 |
| $Ca^{++}$ | 241 | 184 | 56 | 1.4 |
| $Cl^-$ | 12,234 | 10372 | 1,862 | 53 |
| $SO_4^=$ | 3 | 12 | — | — |
| $HCO_3^-$ | — | — | — | — |
| $B_4O_7^=$ | 1,053 | 966 | 87 | 21.6 |
| | | | 3,252 | |
| | | | 3,292 | |

| | |
|---|---|
| STD (III) | 20,533 g |
| STD (IV.1) | 17,325 g |
| SP (IV.1) | 3,208 g |

Deviation: −0.007
Total precipitated: 3,256.9 g
Calculation of the Moisturizing Solution Volume (Vsm (IV.1)):

| | |
|---|---|
| Vsm (IV.1) | 1.092 dm³ |
| SM mass | 1.34 kg |
| Insoluble mass in SP (IV.1) | 0.05 kg |

| | |
|---|---|
| Theoretical precipitated mass | 4.600 kg |
| Harvested crystal mass | 4.360 kg |

Deviation 0.027

The obtained solids are washed with a water volume approximately equal to half of the volume that have post-filtering. Wash water is concentrated until the same lithium concentration of FL (IV.1) is reached. The resulting volume of FL (IV.1) is:

| | |
|---|---|
| Volume FL(IV.1) | 48.8 dm³ |

Post-Washed Precipitated Solids (SP (IV.1)):
  Total mass SP (IV.1)=4.150 kg; H=19%
The solid phase SP (IV.1) contains 96% NaCl and 3% KCl.

Substage IV.2

On day 92 brine FL (IVA) arranged in two containers is exposed to continue the natural evaporation process in the laboratory. On day 102 the precipitated crystals are separated from the liquid phase, and the following is obtained: The Liquid Phase FL (IV.2) that is Weighed, Density is Measured, Volume is Calculated and Analyzed:

| | |
|---|---|
| Mass FL (IV.2) | 42.185 kg |
| ρ (FL (IV.2)) | 1.24 kg/dm³ |
| V (FL (IV.2)) | 34.02 dm³ (measured) |
| STD (FL(IV.2)) | 376 g/dm³ |

FL (IV.2) Chemistry:

| | DETERMINATION | | | | | |
|---|---|---|---|---|---|---|
| | Li⁺ | Ca⁺⁺ | Mg⁺⁺ | B₄O₇= | Na⁺ | K⁺ |
| UNIT | mg/dm³ | mg/dm³ | mg/dm³ | mg/dm³ | mg/dm³ | mg/dm³ |
| TECHNIQUE | ICP-OES | ICP-OES | ICP-OES | ICP-OES | ICP-OES | ICP-OES |
| Comp. FL (IV.2) | 7,875 | 5,170 | 29,449 | 24,700 | 38,002 | 38,679 |

| DETERMINATION | Cl⁻ | SO₄⁻ | pH | Density | Ba |
|---|---|---|---|---|---|
| UNIT | mg/dm³ | mg/dm³ | UpH | kg/dm³ | mg/dm³ |
| TECHNIQUE | Argentometry | Gravimetry | Potentiometry | Pycnometry | ICP |
| Comp. FL (IV.2) | 231,298 | 75 | 5.70 | 1.240 | 428 |

| | | | | | |
|---|---|---|---|---|---|
| Ionic balance | Charges + | 6,464 | | | |
| | Charges − | 6,835 | Deviation | 0.028 | |

Pre-Washed Precipitated Solids (SP (IV.2))
  Total mass SP (IV.2)=5.327 kg; H=14.76%
Precipitated Solid Chemistry (SP (IV.2)):

| | DETERMINATION | | | | | |
|---|---|---|---|---|---|---|
| | Li⁺ | Ca⁺⁺ | Mg⁺⁺ | B₄O₇= | Na⁺ | K⁺ |
| UNIT | % (w/w) | % (w/w) | % (w/w) | % (w/w) | % (w/w) | % (w/w) |
| TECHNIQUE | ICP-OES | ICP-OES | ICP-OES | ICP-OES | ICP-OES | ICP-OES |
| Comp. SP (IV.2) | 0.17 | 0.22 | 0.65 | 1.08 | 28.86 | 18.29 |

| DETERMINATION | Cl⁻ | SO₄⁻ | Humidity | Insolubles |
|---|---|---|---|---|
| UNIT | % (w/w) | % (w/w) | % (w/w) | % (w/w) |
| TECHNIQUE | Argentometry | Gravimetry | Gravimetry | Gravimetry |
| Comp. SP (IV.2) | 53.65 | 0.14 | 14.76 | 1.0 |

Theoretical calculation of the precipitated solid mass SP (IV.2) (it does not include the solids contained in the moisturizing solution volume):

|  | Mass in FL (IV.1) | Mass in FL (IV.2) | Precipitated mass | Precipitated moles |
|---|---|---|---|---|
| Unit | g | g | g | moles |
| $Na^+$ | 2,612 | 1,293 | 1,319 | 57 |
| $K^+$ | 1,716 | 1,316 | 401 | 10 |
| $Ca^{++}$ | 184 | 176 | 8 | 0.2 |
| $Cl^-$ | 10,349 | 7,869 | 2,480 | 70 |
| $SO_4^-$ | 12 | 3 | 10 | 0 |
| $HCO_3^-$ | — | — | — | — |
| $B_4O_7^=$ | 964 | 840 | 123 |  |
|  |  |  | 4,389 |  |

| STD (IV.1) | 17,286 g |
| STD (IV.2) | 12,781 g |
| SP (IV.2) | 4,506 g |

Deviation 0.013
Total precipitated: 4,551.1 g
Calculation of the pre-washed moisturizing solution volume (Vsm (IV.2)):

| Vsm (IV.2)= | 0.986 dm³ |
| Mass of SM (IV.2) | 1.22 kg |
| Insoluble mass in SP (IV.2) | 0.05 kg |

| Theoretical precipitated mass | 5.774 kg | Deviation | 0.0402 |
| harvested crystal mass | 5.327 kg |  |  |

The obtained solids are washed with a water mass approximately equal to half of the mass that have post-filtering. Wash water is concentrated until the same lithium concentration of FL (IV.2) is reached.
The resulting volume of FL (IV.2) is: 35.32 dm³
Post-Washed Precipitated Solids (SP (IV.2)):
Total mass SP (IV.2)=5,190 kg; H=18.5%
The precipitated solids contain 12% potassium chloride and 76% sodium chloride and 12% carnalite.
Substage IV.3
On day 103 the brine FL (IV.2) is poured into two trays and is exposed to continue the natural evaporation process in the laboratory. On day 108 the precipitated crystals are separated from the liquid phase, and the following is obtained:

The Liquid Phase FL (IV.3) that is Weighed, Density is Measured, Volume is Calculated and Analyzed:

| Mass FL (IV.3) | 9.222 kg |
| ρ (FL (IV.3)) | 1.280 kg/dm³ |
| V (FL (IV.3)) | 7.205 dm³ |
| STD (FL(IV.3)) | 492 g/dm³ |

FL (IV.3) Chemistry:

| | DETERMINATION | | | | | |
|---|---|---|---|---|---|---|
| | $Li^+$ | $Ca^{++}$ | $Mg^{++}$ | $B_4O_7^=$ | $Na^+$ | $K^+$ |
| UNIT | mg/dm³ | mg/dm³ | mg/dm³ | mg/dm³ | mg/dm³ | mg/dm³ |
| TECHNIQUE | ICP-OES | ICP-OES | ICP-OES | ICP-OES | ICP-OES | ICP-OES |
| Comp. FL (IV.3) | 25,345 | 16,856 | 53,056 | 66,605 | 6,524 | 13,812 |

| DETERMINATION | $Cl^-$ | $SO_4^-$ | pH | Density | Ba |
|---|---|---|---|---|---|
| UNIT | mg/dm³ | mg/dm³ | UpH | kg/dm³ | mg/dm³ |
| TECHNIQUE | Argentometry | Gravimetry | Potentiometry | Pycnometry | ICP |
| Comp. FL (IV.3) | 308,550 | 240 | 4.50 | 1.280 | 789 |

| Ionic balance | Charges + | 9,507 | | |
| | Charges − | 9,555 | Deviation | 0.003 |

Pre-Washed Precipitated Solids (SP (IV.3))
Total mass SP (IV.3)=14.507 kg; H=17%
Precipitated Solid Chemistry (SP (IV.3)):

| | DETERMINATION | | | | | |
|---|---|---|---|---|---|---|
| | $Li^+$ | $Ca^{++}$ | $Mg^{++}$ | $B_4O_7^=$ | $Na^+$ | $K^+$ |
| UNIT | % (w/w) | % (w/w) | % (w/w) | % (w/w) | % (w/w) | % (w/w) |
| TECHNIQUE | ICP-OES | ICP-OES | ICP-OES | ICP-OES | ICP-OES | ICP-OES |
| Comp. SP (IV.3) | 0.68 | 0.54 | 6.21 | 0.4300 | 10.97 | 10.66 |

| DETERMINATION | $Cl^-$ | $SO_4^-$ | Humidity | Insolubles |
|---|---|---|---|---|
| UNIT | % (w/w) | % (w/w) | % (w/w) | % (w/w) |
| TECHNIQUE | Argentometry | Gravimetry | Gravimetry | Gravimetry |
| Comp. SP (IV.3) | 43.85 | 0.04 | 17.00 | 0.4 |

Theoretical calculation of the pre-washed precipitated solid mass SP (IV.3) (it does not include the solids contained in the moisturizing solution volume):

|  | Mass in FL (IV.2) | Mass in FL (IV.3) | Precipitated mass | Precipitated moles |
|---|---|---|---|---|
| Unit | g | g | g | moles |
| $Na^+$ | 1,342 | 47 | 1,295 | 56 |
| $K^+$ | 1,366 | 100 | 1,267 | 32 |
| $Ca^{++}$ | 183 | 121 | 61 | 1.5 |
| $Cl^-$ | 8,169 | 2,223 | 5,946 | 168 |
| $SO_4^=$ | 3 | 2 | 1 | 0 |
| $HCO_3^-$ | — | — | — | — |
| $B_4O_7^=$ | 872 | 480 | 393 | 2.5 |
| $Mg^{++}$ | 1,040 | 382 | 658 | 27 |
| $Ba^{++}$ | 15 | 6 | 9 |  |
|  |  |  | 9,630 |  |

| STD (IV.2) | 13,269 g |
|---|---|
| STD (IV.3) | 3,543 g |
| SP (IV.3) | 9,726 g |
| Total precipitated | 9,764.8 g |

-continued

Precipitated salts:

| Carnalite | 28 moles |
|---|---|
| NaCl | 56 moles |
| KCl | 5 moles |

Deviation 0.005
Crystallization water carnalite: 3,024 g
Calculation of the Moisturizing Solution Volume (Vsm (IV.3)):

| Vsm (IV.3) = | 2.909 dm$^3$ |
|---|---|
| SM mass | 3.72 kg |
| Insoluble mass in SP (IV.3) | 0.04 kg |

| Theoretical precipitated mass | 13.489 kg | Deviation | −0.036 |
|---|---|---|---|
| Harvested crystal mass | 14.507 kg |  |  |

The obtained solids are washed with a water mass approximately equal to half of the mass that have post-filtering. Wash water is concentrated until the same lithium concentration of FL (IV.3) is reached. The resulting volume of FL(IV.3) is:
V (FL(IV.3))=10.7 dm$^3$
Post-Washed Precipitated Solids (SP (IV.3)):
Total mass SP (IV.3)=13.850 kg; H=18%
Substage IV.4
On day 109 the brine FL (IV.3) is poured into a tray and is exposed to continue the natural evaporation process in the laboratory. On day 114 the precipitated crystals are separated from the liquid phase, and the following is obtained:

The liquid phase FL (IV.4) that is weighed, density is measured, volume is calculated and analyzed:

| Mass FL (IV.4) | 8.282 kg |
|---|---|
| ρ (FL (IV.4)) | 1.26 kg/dm$^3$ |
| V (FL (IV.4)) | 6.573 dm$^3$ |
| STD (FL(IV.4)) | 506 g/dm$^3$ |

FL (IV.4) Chemistry:

| | DETERMINATION | | | | | |
|---|---|---|---|---|---|---|
| | Li$^+$ | Ca$^{++}$ | Mg$^{++}$ | B$_4$O$_7^=$ | Na$^+$ | K$^+$ |
| | UNIT | | | | | |
| | mg/dm$^3$ | mg/dm$^3$ | mg/dm$^3$ | mg/dm$^3$ | mg/dm$^3$ | mg/dm$^3$ |
| TECHNIQUE | ICP-OES | ICP-OES | ICP-OES | ICP-OES | ICP-OES | ICP-OES |
| Comp. FL (IV.4) | 34,882 | 17,565 | 46,055 | 58,696 | 3,022 | 3,317 |

| DETERMINATION | Cl$^-$ | SO$_4^=$ | pH | Density | Ba$^{++}$ |
|---|---|---|---|---|---|
| UNIT | mg/dm$^3$ | mg/dm$^3$ | UpH | kg/dm$^3$ | mg/dm$^3$ |
| TECHNIQUE | Argentometry | Gravimetry | Potentiometry | Pycnometry | ICP |
| Comp. FL (IV.4) | 341,773 | 438 | 4.50 | 1.260 | 665 |

| Ionic balance | Charges + | 9,918 | | |
|---|---|---|---|---|
| | Charges − | 10,393 | Deviation | 0.023 |

Precipitated Solids (SP (IV.4))
Total mass SP (IV.4)=4,320 kg; H=26%
Precipitated Solid Chemistry (SP (IV.4)):

| | DETERMINATION | | | | | |
|---|---|---|---|---|---|---|
| | Li$^+$ | Ca$^{++}$ | Mg$^{++}$ | B$_4$O$_7^=$ | Na$^+$ | K$^+$ |
| | UNIT | | | | | |
| | % (w/w) | % (w/w) | % (w/w) | % (w/w) | % (w/w) | % (w/w) |
| TECHNIQUE | ICP-OES | ICP-OES | ICP-OES | ICP-OES | ICP-OES | ICP-OES |
| Comp. SP (IV.4) | 2.19 | 1.86 | 6.43 | 7.70 | 3.14 | 6.60 |

| DETERMINATION | Cl$^-$ | SO$_4^=$ | Humidity | Insolubles |
|---|---|---|---|---|
| UNIT | % (w/w) | % (w/w) | % (w/w) | % (w/w) |
| TECHNIQUE | Argentometry | Gravimetry | Gravimetry | Gravimetry |
| Comp. SP (IV.4) | 72.30 | 0.04 | 23.00 | 0.8 |

Theoretical calculation of the precipitated solid mass SP (IV.4) (it does not include the solids contained in the moisturizing solution volume):

|  | Mass in FL (IV.3) | Mass in FL (IV.4) | Precipitated mass | Precipitated moles |
|---|---|---|---|---|
| Unit | g | g | g | moles |
| $Na^+$ | 70 | 20 | 50 | 2 |
| $K^+$ | 148 | 22 | 126 | 3 |
| $Ca^{++}$ | 180 | 115 | 65 | 2 |
| $Cl^-$ | 3,301 | 2,246 | 1,055 | 30 |
| $SO_4^=$ | 3 | 3 | 0 | 0 |
| $HCO_3^-$ | — | — | — | — |
| $B_4O_7^=$ | 713 | 386 | 327 | 2 |
| $Mg^{++}$ | 568 | 303 | 265 | 11 |
|  |  |  | 1,887 | g |

| STD (IV.3) | 5,262 g |
|---|---|
| STD (IV.4) | 3,329 g |
| SP (IV.4) | 1,933 g |

| Total precipitated | 1,948.9 g |
|---|---|
| Precipitated salts: |  |
| Carnalite | 3 moles |
| NaCl | 5 moles |
| Bischofite | 8 moles |

Deviation 0.012
Crystallization water: 1,188 g
Calculation of the moisturizing solution volume (Vsm (IV.4)):

| Vsm (IV.4)= | 0.967 $dm^3$ |
|---|---|
| SM mass | 1.22 kg |
| Insoluble mass in SP (IV.4) | 0.02 kg |

| Theoretical precipitated mass | 4.355 kg |
|---|---|
| Harvested crystal mass | 4.320 kg |

Deviation 0.004

The obtained solids are washed with a water volume approximately equal to 60% of the volume that have post-filtering. Wash water is concentrated until the same lithium concentration of FL (IV.4) is reached. The resulting volume of FL(IV.4) is:

V(FL(IV.4))=7.536 $dm^3$

Post-Washed Precipitated Solids (SP (IV.4)):
Total post-washed mass SP (IV.4)=4.096 kg; H=19%

STAGE V: Treatment
Substage V.1

Brine FL (IV.4) undergoes a treatment to reduce magnesium, calcium and boron content.

7.536 $dm^3$ obtained (FL (IV.4)) is placed in a plastic container with a capacity of 30 $dm^3$. Firstly, brine is diluted with fresh water up to 31-32 $g/dm^3$ of lithium. Then, stirring manually with a plastic shovel, a prepared calcium hydroxide suspension is added by suspending 1.058 kg in 2.650 $dm^3$ of fresh water. Immediately afterwards, and continuing with stirring, a prepared aqueous solution is added by dissolving 2.028 kg of anhydrous sodium sulfate in 5.5 $dm^3$ of fresh water at 35° C. Finally, 754 $cm^3$ of a sodium hydroxide solution 4 N is added, ensuring a pH value greater than 11.3.

The obtained post-treatment heterogeneous mixture is separated by centrifugation and the following is obtained.

The Liquid Phase FL (V.1) that is Weighed, Density is Measured, Volume is Calculated and Analyzed:

| Mass FL (V.1) | 22.332 kg |
|---|---|
| ρ (FL (V.1)) | 1.138 $kg/dm^3$ |
| V (FL (V.1)) | 19.624 $dm^3$ |
| STD (FL(V.1)) | 171 $g/dm^3$ |

FL (V.1) Chemistry:

| | DETERMINATION | | | | | |
|---|---|---|---|---|---|---|
| | $Li^+$ | $Ca^{++}$ | $Mg^{++}$ | $B_4O_7^=$ | $Na^+$ | $K^+$ |
| | | | UNIT | | | |
| | $mg/dm^3$ | $mg/dm^3$ | $mg/dm^3$ | $mg/dm^3$ | $mg/dm^3$ | $mg/dm^3$ |
| TECHNIQUE | ICP-OES | ICP-OES | ICP-OES | ICP-OES | ICP-OES | ICP-OES |
| Comp. FL (V.1) | 11,150 | 1,330 | 0.50 | 1,802 | 36,200 | 1,104 |

| DETERMINATION | $Cl^-$ | $SO_4^=$ | pH | Density | $Ba^{++}$ |
|---|---|---|---|---|---|
| UNIT | $mg/dm^3$ | $mg/dm^3$ | UpH | $kg/dm^3$ | $mg/dm^3$ |
| TECHNIQUE | Argentometry | Gravimetry | Potentiometry | Pycnometry | ICP-OES |
| Comp. FL (V.1) | 113,370 | 5,930 | 11.30 | 1.138 | 5 |

| Ionic balance | Charges + | 3,275 | | |
|---|---|---|---|---|
| | Charges − | 3,340 | Deviation | 0.010 |

Pre-Washed Precipitated Solids (SP (IV.1)):
Total pre-washed mass SP (V.1)=6.950 kg; H=38%
Pre-Washed Precipitated Solid chemistry SP (V.1):

| | DETERMINATION | | | | | |
|---|---|---|---|---|---|---|
| | $Li^+$ | $Ca^{++}$ | $Mg^{++}$ | $B_4O_7^=$ | $Na^+$ | $K^+$ |
| | | | UNIT | | | |
| | % (w/w) | % (w/w) | % (w/w) | % (w/w) | % (w/w) | % (w/w) |
| TECHNIQUE | ICP-OES | ICP-OES | ICP-OES | ICP-OES | ICP-OES | ICP-OES |
| Comp. SP (V.1) | 0.79 | 17.17 | 9.01 | 14.55 | 2.50 | 0.08 |

| DETERMINATION | Cl$^-$ | SO$_4^=$ | Humidity | Insolubles |
|---|---|---|---|---|
| UNIT | % (w/w) | % (w/w) | % (w/w) | % (w/w) |
| TECHNIQUE | Argentometry | Gravimetry | Gravimetry | Gravimetry |
| Comp. SP (V.1) | 7.83 | 32.61 | 41.00 | 0.8 |

Theoretical calculation of the precipitated solid mass SP (V.1) (it does not include the solids contained in the moisturizing solution volume):

| | Mass in FL (IV.4) | Mass in FL (V.1) | Added mass | Precipitated mass | Precipitated moles |
|---|---|---|---|---|---|
| Unit | g | g | g | g | moles |
| Na$^+$ | 23 | 710 | 726 | 38 | 2 |
| K$^+$ | 25 | 22 | 0 | 3 | 0 |
| Ca$^{++}$ | 132 | 26 | 572 | 678.7 | 16.9 |
| Cl$^-$ | 2,576 | 2225 | 0 | 351 | 10 |
| SO$_4^=$ | 3 | 116 | 1,371 | 1,258 | 13 |
| HCO$_3^-$ | — | — | — | — | — |
| B$_4$O$_7^=$ | 442 | 35 | 0 | 407.0 | 3 |
| Mg$^{++}$ | 347 | 0 | 0 | 347 | 14.3 |
| OH$^-$ | — | — | 486 | 486 | 28.6 |
| Ba$^{++}$ | 5 | 0 | 0 | 5 | 0.0 |
| | | | 3,155 | 3,574 | |

| STD (IV.4) | 3816 g |
|---|---|
| STD (V.1) | 3353 g |
| SP (V.1) | 3669 g |

Total precipitated 3698.5 g
Deviation 0.013

| Precipitated salts: | |
|---|---|
| CaSO$_4$•2H$_2$O | 14 moles |
| Mg(OH)$_2$ | 14.3 moles |

Calculation of the pre-washed moisturizing solution volume (Vsm (V.1)):

| Vsm (V.1)= | 3.030 dm$^3$ |
|---|---|
| SM mass= | 3.45 kg |
| Insoluble mass in SP (IV.1)= | 0.03 kg |

Deviation 0.091
Obtained solids are centrifuged, washed by suspending them at 9.5 dm$^3$ of fresh water and centrifuged again. Wash water is concentrated until the same lithium concentration of FL (V.1) is reached. The resulting volume of FL(V.1) is:
V(FL(V.1))=22.514 dm$^3$
Post-Washed Precipitated Solids (SP (V.1)):
Total post-washed mass SP (V.1)=5.844 kg; H=39%

Solid effluents SP (V.1) contain 62% dihydrated calcium sulfate and 24% magnesium hydroxide. Leaching these solid effluents with sulfuric acid and separating the phases it is possible to obtain the following per ton of equivalent lithium carbonate:

1.7 t of agricultural gypsum
2.1 t of magnesium sulfate

Reduction in the Cost of Reagents at Stage V.1

The quantity of sulfate moles required for stage V.1 can be added in whole or in part as potassium sulfate and sodium sulfate obtained at stage II of cooling. For brine from the Diablillos salt flat, at the cooling stage 17 sulfate moles are obtained, and at the treatment stage it is necessary to add 14.3 sulfate moles which means that it is not necessary to incorporate sodium sulfate as a reagent.

Substage V.2

22.514 dm$^3$ obtained (FL (V.1)) is placed in a plastic container with a capacity of 30 dm$^3$. Stirring manually with a plastic shovel, a prepared aqueous solution is added dissolving 306 g of dihydrated barium chloride in 1.4 dm$^3$ of fresh water. The heterogeneous mixture obtained is separated by filtration and wash, and the following is obtained.

Liquid phase FL (V.2) (it includes wash water) that is weighed, density is measured, volume is calculated and analyzed:

| Mass FL (V.2) | 25.781 kg |
|---|---|
| ρ (FL (V.2)) | 1.131 kg/dm$^3$ |
| V (FL (V.2)) | 22.795 dm$^3$ |
| STD (FL(V.2)) | 159 g/dm$^3$ |

FL (V.2) Chemistry:

| | DETERMINATION | | | | | |
|---|---|---|---|---|---|---|
| | Li$^+$ | Ca$^{++}$ | Mg$^{++}$ | B$_4$O$_7^=$ | Na$^+$ | K$^+$ |
| | | | UNIT | | | |
| | mg/dm$^3$ | mg/dm$^3$ | mg/dm$^3$ | mg/dm$^3$ | mg/dm$^3$ | mg/dm$^3$ |
| TECHNIQUE | ICP-OES | ICP-OES | ICP-OES | ICP-OES | ICP-OES | ICP-OES |
| Comp. FL (V.2) | 10679 | 1154 | 0.50 | 1996 | 33279 | 973 |

| DETERMINATION | Cl$^-$ | SO$_4^=$ | pH | Density | Ba$^{++}$ |
|---|---|---|---|---|---|
| UNIT | mg/dm$^3$ | mg/dm$^3$ | UpH | kg/dm$^3$ | mg/dm$^3$ |
| TECHNIQUE | Argentometry | Gravimetry | Potentiometry | Pycnometry | ICP |
| Comp. FL (V.2) | 110,102 | 351 | 11.30 | 1.131 | 6 |

| Theoretical precipitated mass | 7.146 kg |
|---|---|
| Harvested crystal mass | 5.950 kg |

| Ionic balance | Charges+ | 3,068 | Deviation | 0.011 |
|---|---|---|---|---|
| | Charges− | 3,134 | | |

Precipitated Solids (SP (V.2)):
Solids precipitated by the addition of barium chloride are washed with 100 cm 3 of water. Wash water is concentrated until the lithium concentration in FL (V.2) is reached and mixed with the same.
Total post-washed mass SP (V.2)=0.420 kg; H=17%
Precipitated solids SP (V.2) contain more than 95% barium sulfate dihydrate.

STAGE VI: Post-Treatment Concentration

On day 116 brine FL (V.2) is poured into a plastic tray and exposed to restart the evaporation process in the laboratory, using forced ventilation. On day 119 precipitated crystals of the liquid phase are separated, and the following is obtained. Liquid Phase FL (VI) that is Weighed, Density is Measured, Volume is Calculated and Analyzed:

| Mass FL (VI) | 8.413 | kg |
|---|---|---|
| $\rho$ (FL (VI)) | 1.25 | $kg/dm^3$ |
| V (FL (VI)) | 6.73 | $dm^3$ |
| STD (FL(VI)) | 302 | $g/dm^3$ |

FL (VI) Chemistry:

| | DETERMINATION | | | | | |
|---|---|---|---|---|---|---|
| | $Li^+$ | $Ca^{++}$ | $Mg^{++}$ | $B_4O_7^-$ | $Na^+$ | $K^+$ |
| UNIT | $mg/dm^3$ | $mg/dm^3$ | $mg/dm^3$ | $mg/dm^3$ | $mg/dm^3$ | $mg/dm^3$ |
| TECHNIQUE | ICP-OES | ICP-OES | ICP-OES | ICP-OES | ICP-OES | ICP-OES |
| Comp. FL (VI) | 34,234 | 2,328 | 1.0 | 5,385 | 31,749 | 2,966 |

| DETERMINATION | $Cl^-$ | $SO_4^-$ | pH | Density | $Ba^{++}$ |
|---|---|---|---|---|---|
| UNIT | $mg/dm^3$ | $mg/dm^3$ | UpH | $kg/dm^3$ | $mg/dm^3$ |
| TECHNIQUE | Argentometry | Gravimetry | Potentiometry | Pycnometry | ICP |
| Comp. FL (VI) | 224,432 | 1,065 | 9.97 | 1.250 | 2.8 |

| Ionic | Charges+ | 6,505 | | |
|---|---|---|---|---|
| balance | Charges− | 6,414 | Deviation | −0.007 |

Precipitated Solids (SP (VI)):

Total mass SP (VI)=1.690 kg; H=8.13%

Theoretical calculation of the precipitated solid mass SP (VI) (it does not include the solids contained in the moisturizing solution volume):

| | Mass in FL (V.2) | Mass in FL (VI) | Precipitated mass | Precipitated moles |
|---|---|---|---|---|
| Unit | g | g | g | |
| $Na^+$ | 759 | 218 | 540 | 23 |
| $K^+$ | 22 | 20 | 2 | 0 |
| $Ca^{++}$ | 26 | 16 | 10 | 0.3 |
| $Cl^-$ | 2,510 | 1,544 | 966 | 27 |
| $SO_4^-$ | 8 | 7 | 1 | 0 |
| $HCO_3^-$ | — | — | — | — |
| $B_4O_7^-$ | 45 | 37 | 8 | 0.1 |
| $Mg^{++}$ | 0 | 0 | 0 | 0 |
| | | | 1,527 | |

| STD (V.2) | 3614 | g |
|---|---|---|
| STD (VI) | 2088 | g |
| SP (VI) | 1526 | g |

Total precipitated 1538.1 g
Deviation −0.0003

Calculation of the Moisturizing Solution Volume (Vsm (VI)):

| Vsm (VI)= | 0.146 | $dm^3$ |
|---|---|---|
| SM mass | 0.18 | kg |
| Insoluble mass in SP (VI) | 0.01 | kg |

Precipitated solids are washed with 400 cm 3 of water. Wash water is concentrated until the lithium concentration in FL (VII) is reached and mixed with the same. The resulting volume of FL(VI) is:

V (FL(VI))=7.02 $dm^3$

Post-Washed Precipitated Solids (SP (VI)):

Total post-washed mass SP (VI)=1.656 kg; H=9%

Solids SP (VI) contain more than 98% sodium chloride.

STAGE VII: Final Concentration

FL (VI) is exposed to ventilation with forced convection in the laboratory, to continue the evaporation process. On day 126 precipitated crystals of the liquid phase are separated, and the following is obtained.

Liquid Phase FL (VII) that is weighed, density is measured, volume is calculated and analyzed:

| Mass FV (VII) | 3.455 | kg |
|---|---|---|
| $\rho$ (FL (VII)) | 1.252 | $kg/dm^3$ |
| V (FL (VII)) | 2.410 | $dm^3$ |
| STD (FL(VII)) | 525 | $g/dm^3$ |

FL (VII) Chemistry:

| UNIT | DETERMINATION | | | | | |
|---|---|---|---|---|---|---|
| | $Li^+$ mg/dm$^3$ | $Ca^{++}$ mg/dm$^3$ | $Mg^{++}$ mg/dm$^3$ | $B_4O_7^-$ mg/dm$^3$ | $Na^+$ mg/dm$^3$ | $K^+$ mg/dm$^3$ |
| TECHNIQUE | ICP-OES | ICP-OES | ICP-OES | ICP-OES | ICP-OES | ICP-OES |
| Comp. FL (VII) | 83,501 | 2296 | 1.0 | 7,018 | 1,123 | 7,461 |

| DETERMINATION UNIT TECHNIQUE | $Cl^-$ mg/dm$^3$ Argentometry | $SO_4^-$ mg/dm$^3$ Gravimetry | pH UpH Potentiometry | Density kg/dm$^3$ Pycnometry | $Ba^{++}$ mg/dm$^3$ ICP-OES |
|---|---|---|---|---|---|
| Comp. FL (VII) | 422,107 | 1,242 | 7.30 | 1.252 | 18 |

| Ionic balance | Charges+ | 12,384 | | |
|---|---|---|---|---|
| | Charges− | 12,023 | Deviation | −0.015 |

Pre-Washed Precipitated Solids (SP (VII)):

Total mass SP (VII)=1.710 kg; H=29.27%

Theoretical calculation of the precipitated solid mass SP (VII) (it does not include the solids contained in the moisturizing solution volume):

| | Mass in FL (VI) | Mass in FL (VII) | Precipitated mass | Precipitated mass | moles |
|---|---|---|---|---|---|
| Unit | g | g | g | more STD in SM | |
| $Na^+$ | 223 | 3 | 220 | 393 | 17 |
| $K^+$ | 21 | 18 | 3 | 5 | 0.13 |
| $Ca^{++}$ | 16 | 6 | 11 | 0.0 | 0.0 |
| $Cl^-$ | 1,576 | 1,017 | 558 | 638 | 18 |
| $SO_4^-$ | 7 | 3 | 4 | 3 | 0 |
| $HCO_3^-$ | — | — | — | — | — |
| $B_4O_7^-$ | 38 | 17 | 21 | 0.0 | — |
| $Mg^{++}$ | 0 | 0 | 0 | 0 | 0.0 |
| | | | 817 | | |

| STD (VI) | 2,121 | g |
|---|---|---|
| STD (VII) | 1,265 | g |
| SP (VII) | 857 | g |

Deviation −0.023

Total precipitated 866.5 g

Calculation of the Moisturizing Solution Volume (Vsm (VII)):

| Vsm (VII) | 0.703 | dm$^3$ |
|---|---|---|
| SM mass | 0.88 | kg |
| Insoluble mass in SP (VII) | 0.01 | kg |

| Theoretical precipitated mass | 1.747 | kg |
|---|---|---|
| Harvested crystal mass | 1.710 | kg |

Deviation 0.011

Precipitated solids are washed with 500 cm 3 of water. Wash water is concentrated until the lithium concentration in FL (VII) is reached and mixed with the same. The resulting volume of FL (VII) is:

V FL(VII)=2.87 dm$^3$

Post-Washed Precipitated Solids (SP (10-11)):

Total post-washed mass SP (VII)=1.225 kg; H=28%

Solids SP (VII) contain more than 98% sodium chloride.

Calculation of Operating Variables

The calculation of the operating variables for an annual production of 10,000 tons of equivalent lithium carbonate was carried out using brine from the Diablillos Salt flat, when the cooling process at stage II is carried out with a mechanical cooling crystallization equipment and stages VI and VII are carried out in solar evaporation ponds.

Stage I: Initial Pre-Concentration Ponds

First Unharvested Period:

| | Substage I.1 | Substage I.2 |
|---|---|---|
| Incoming volume (m$^3$/year) | 4,574,000 | 2,824,000 |
| Lithium concentration in the incoming brine (kg/m$^3$) | 0.678 | 1.087 |
| Outcoming volume (m$^3$/year) | 2,824,000 | 440,000 |
| Lithium concentration in the outcoming brine (kg/m$^3$) | 1.087 | 4.741 |
| SP (t/year) | 44,460 | 515,000 |
| Pumping water (m$^3$/year) | 22,900 (brackish) | 28,240 (brackish) |
| Default SL height (cm) | 12 | 12 |
| precipitated salt h every two years (cm) | 27 | 73 |
| Pond area (m$^2$) | 1,170,000 | 1,575,000 |
| Charging time (days) | 19 | 155 |

Stage I: Initial Pre-Concentration Ponds

Next Unharvested Periods:

| | Substage I.1 | Substage I.2 |
|---|---|---|
| Incoming volume (m$^3$/year) | 4,574,000 | 2,824,000 |
| Lithium concentration in the incoming brine (kg/m$^3$) | 0.678 | 1.087 |
| Outcoming volume (m$^3$/year) | 2,824,000 | 603158 |
| Lithium concentration in the outcoming brine (kg/m$^3$) | 1.087 | 4.741 |
| SP (t/year) | 44,460 | 515,000 |
| Pumping water (m$^3$/year) | 36,370 (brackish) | 28,240 (brackish) |
| Wash water (m$^3$/year) | 0 | 90,000 (brackish) |
| Default SL height (cm) | 12 | 12 |
| precipitated salt h (cm every 2 years) | 29 | 73 |
| Pond area (m$^2$) | 1,350,000 | 1,710,000 |

Brackish water: water with density less than 1,100 g/dm³.
Auxiliary pond for stage I: 390,000 m²

Stage II: Cooling

This stage is performed in a mechanical cooling crystallization equipment and is detailed for the highest brine flow, i.e. the one corresponding to the post-harvest period for the pond system operation.

Brine to be Cooled
    Flow: 76 m³/h
    Density: 1.265 kg/dm³
    Average temperature: 16° C.
    Total dissolved solid content: 0.396 kg/dm³

Chemical composition of the liquid phase entering into the cooling equipment:

| | DETERMINATION | | | | | |
|---|---|---|---|---|---|---|
| UNIT | $Li^+$ mg/dm³ | $Ca^{++}$ mg/dm³ | $Mg^{++}$ mg/dm³ | $B_4O_7^-$ mg/dm³ | $Na^+$ mg/dm³ | $K^+$ mg/dm³ |
| TECHNIQUE Comp. FL | ICP-OES 4,741 | ICP-OES 170 | ICP-OES 17,063 | ICP-OES 18,237 | ICP-OES 75,454 | ICP-OES 44,258 |

| | DETERMINATION | | | | | |
|---|---|---|---|---|---|---|
| UNIT | $Ba^{++}$ mg/dm³ | $Sr^{++}$ mg/dm³ | $Fe^{+++}$ mg/dm³ | Mn mg/dm³ | $Cl^-$ mg/dm³ | $PO_4^{3-}$ mg/dm³ |
| TECHNIQUE Comp. FL (2) | ICP-OES 1.330 | ICP-OES — | ICP-OES — | ICP-OES — | Argentometry 189,397 | Colorimetric <20 |

| | DETERMINATION | | | | | |
|---|---|---|---|---|---|---|
| UNIT | $SO_4^-$ mg/dm³ | Alkalinity mg/dm³ | $CO_3^-$ mg/dm³ | $HCO_3^-$ mg/dm³ | pH UpH | Density kg/dm³ |
| TECHNIQUE Comp. FL (2) | Gravimetry 46,318 | Volumetry — | Volumetry N.D. | Volumetry — | Potentiometry 6.00 | Pycnometry 1.260 |

Specific heat: 0.85 kcal/kg ° C.
Salts that crystallize during cooling:
    Glaserite [$K_{2.25}Na_{1.75}(SO_4)_2$]: 2.77 t/t CLE
    Sodium chloride (NaCl): 0.322 t/t CLE
CLE: Equivalent Lithium Carbonate The cooling is executed with a pre-cooling stage, in which the cooled liquid phase with low sulfate anion content, which comes out of the cooling equipment at −7° C., interacts in a heat exchanger, with brine to be cooled that has an initial temperature of 16° C. As a result of this pre-cooling, brine to be cooled enters into the crystallization equipment by cooling at 0° C.

Under these conditions, it is easy to demonstrate that, for a performance coefficient of 60% of the ideal performance coefficient (Carnot), mechanical energy required per ton of lithium carbonate produced is less than 0.12 Mwh.

Liquid Phase Obtained after Cooling
    Flow: 68.7 m³/h
    Density: 1.22 kg/dm³
    Average temperature: 11° C.
    Total dissolved solid content: 0.349 kg/dm³

Chemical composition of the liquid phase coming out of the cooling equipment:

| | DETERMINATION | | | | | |
|---|---|---|---|---|---|---|
| UNIT | $Li^+$ mg/dm³ | $Ca^{++}$ mg/dm³ | $Mg^{++}$ mg/dm³ | $B_4O_7^-$ mg/dm³ | $Na^+$ mg/dm³ | $K^+$ mg/dm³ |
| TECHNIQUE Comp. FL | ICP-OES 5,064 | ICP-OES 130 | ICP-OES 17,733 | ICP-OES 19,314 | ICP-OES 68,589 | ICP-OES 30,546 |

| DETERMINATION | $Cl^-$ | $SO_4^-$ | pH | Density |
|---|---|---|---|---|
| UNIT | mg/dm³ | mg/dm³ | UpH | kg/dm³ |
| TECHNIQUE Comp. FL (2) | Argentometry 189,852 | Gravimetry 17,781 | Potentiometry 6.00 | Pycnometry 1.215 |

Fresh water for crystal wash: 7,000 m$^3$
Stage III: Pre-Treatment
Quantity of Reagents and Water Used Per Ton of Equivalent Lithium Carbonate
  Calcium chloride dihydrate: 0.920 t
  Barium chloride dihydrate: 1.6 t
  Fresh water: 5.12 m$^3$
Liquid Phase after Pre-Treatment:
  Volume (next unharvested periods): 585,000 m$^3$
  Lithium concentration: 4.680 g/dm$^3$
  Density: 1,220 g/dm$^3$
  Total dissolved solids: 324 g/dm$^3$
Quantity of Solid Effluents Generated in Pre-Treatment Per Ton of Equivalent Lithium Carbonate: 3.604 t
Approximate Quantity of Products to be Obtained by Processing Solid Effluent (Per Ton of Equivalent Lithium Carbonate):
  Agricultural gypsum: 0.146 t
  Barium sulfate: 1.849 t
Stage IV: Final Pre-Concentration Ponds
First Unharvested Period

|  | Substages IV.1 and IV.2 | Substage IV.3 | Substage IV.4 |
| --- | --- | --- | --- |
| Incoming volume (m$^3$/year) | 427,000 | 227,000 | 40,700 |
| Lithium concentration in the incoming brine (kg/m$^3$) | 4.68 | 7.875 | 25.345 |
| Outcoming volume (m$^3$/year) | 227,000 | 40,700 | 24,080 |
| Lithium concentration in the outcoming brine (kg/m$^3$) | 7.875 | 25.345 | 34.882 |
| SP (t/year) | 48,500 | 45,620 | 5,060 |
| Pumping water (m$^3$/year) | 4,300 | 2,300 | 410 |
| Default SL height (cm) | 12 | 12 | 12 |
| precipitated salt h (cm every 2 years) | 84 | 71 | 91 |
| Pond area (m$^2$) | 189,000 | 202,500 | 225,000 |
| Charging time (days) | 33 | 198 | 37 |

Stage IV: Final Pre-Concentration Ponds
Next Unharvested Periods

|  | Substages IV.1 and IV.2 | Substage IV. 2 | Substage IV.3 |
| --- | --- | --- | --- |
| Incoming volume (m$^3$/year) | 585,100 | 340,000 | 95,602 |
| Lithium concentration in the incoming brine (kg/m$^3$) | 4.68 | 7.875 | 25.345 |
| Outcoming volume (m$^3$/year) | 340,000 | 95,604 | 66,516 |
| Lithium concentration in the outcoming brine (kg/m$^3$) | 7.875 | 25.345 | 34.882 |
| SP (t/year) | 66,746 | 63,316 | 11,888 |
| Pumping water (m$^3$/year) | 5,850 | 3,400 | 960 |
| Wash water (m$^3$/year) | 8,100 | 27,000 | 4,500 |
| Default SL height (cm) | 12 | 12 | 12 |
| precipitated salt h (cm) every 2 years | 107 | 89 | 103 |
| Pond area (m$^2$) | 252,000 | 292500 | 45,000 |

Stage V: Treatment
Substage V.1
Quantity of Reagents and Water Used Per Ton of Equivalent Lithium Carbonate
  Hydrated lime: 0.85 t
  Sodium sulfate (anhydrous base): 1.62 t
    0 t if separate salts are used
    at stage II
  Sodium hydroxide (dry base): 0.096 t
  Fresh water: 15 m$^3$
Liquid Phase after Substage V.1:
  Volume (next unharvested periods): 210,198 m$^3$
  Lithium concentration: 11.150 g/dm$^3$
  Density: 1,138 g/dm$^3$
  Total dissolved solids: 171 g/dm$^3$
Quantity of Solid Effluents Generated at Substage V.1 Per Ton of Equivalent Lithium Carbonate: 4.68 t
Approximate Quantity of Products to be Obtained by Processing the Generated Solid Effluent (Expressed Per Ton of Equivalent Lithium Carbonate):
  Agricultural gypsum: 1.7 t
  Magnesium sulfate: 2.1 t
Substage V.2
Quantity of Reagents and Water Used Per Ton of Equivalent Lithium Carbonate
  Barium chloride dihydrate: 0.24 t
  Fresh water: 1.36 m$^3$
Liquid Phase after Substage V.2:
  Volume: 215,510 m$^3$
  Lithium concentration: 10.679 g/dm$^3$
  Density: 1,131 g/dm$^3$
  Total dissolved solids: 159 g/dm$^3$
Quantity of Solid Effluents Generated at Substage V.2, Expressed Per Ton of Equivalent Lithium Carbonate: 0.336 t
Approximate Quantity of Products to be Obtained by Processing the Generated Solid Effluent (Expressed Per Ton of Equivalent Lithium Carbonate):
  Barium sulfate: 0.25 t
Ponds of Stages VI and VII
First Unharvested Period

|  | Stage VI | Stage VII |
| --- | --- | --- |
| Incoming volume (m$^3$/year) | 78,016 | 22360 |
| Lithium concentration in the incoming brine (kg/m$^3$) | 10.679 | 34.324 |
| Outcoming volume (m$^3$/year) | 22,360 | 6,654 |
| Lithium concentration in the outcoming brine (kg/m$^3$) | 34.324 | 83.501 |
| SP (t/year) | 5,055 | 1,811 |
| Pumping water (m$^3$/year) | 780 | 224 |
| Default SL height (cm) | 12 | 12 |
| precipitated salt h (cm every 2 years) | 36 | 58 |
| Pond area (m$^2$) | 54,000 | 18,000 |
| Charging time (days) | 120 | 135 |

Ponds of Stages VI and VII
Next Unharvested Periods

|  | Stage VI | Stage VII |
|---|---|---|
| Incoming volume (m$^3$/year) | 215,510 | 66,133 |
| Lithium concentration in the incoming brine (kg/m$^3$) | 10.679 | 34.234 |
| Outcoming volume (m$^3$/year) | 66,133 | 25,627 |
| Lithium concentration in the outcoming brine (kg/m$^3$) | 34.234 | 83.501 |
| SP (t/year) | 14,000 | 5,360 |
| Pumping water (m$^3$/year) | 2,160 | 660 |
| Wash water (m$^3$/year) | 8,100 | 5,400 |
| Default SL height (cm) | 12 | 12 |
| precipitated salt h (cm every 2 years) | 38 | 50 |
| Pond area (m$^2$) | 135,000 | 67,500 |

Auxiliary Pond Area for Stages IV, VI and VII: 75,000 m$^2$
Specific Water and Reagent Consumption of the Procedure Calculated Per Ton of Equivalent Lithium Carbonate
   Brackish water: 13 m$^3$
   Fresh water: 26 m$^3$
   Calcium chloride: 0.903 t
   Barium chloride: 1.84 t
   Calcium hydroxide: 0.85 t
   Sodium sulfate (anhydrous base): 1.62 t
      0 t if separate salts are used
      at stage II
   Sodium hydroxide (dry base): 0.096 t
Solid Effluent Generation at the Ore-Treatment and Treatment Stages, Calculated Per Ton of Equivalent Lithium Carbonate
   Pre-treatment stage: 3.604 t
   Treatment stage: 5.01 t

Conclusions

In this example, natural brine is not saturated and, consequently, the quantity of crystallized and precipitated solids at stage I is low. This has the following advantages: i) in the first unharvested period the recovery is greater than in the case of saturated brines, due to the lower quantity of trapped brine and ii) The cost of harvesting crystals per ton of equivalent lithium carbonate is lower. On the other hand, while in this example the lithium concentration reached at the initial pre-concentration stage is 4.7 g/dm$^3$, it was subsequently verified that with this brine it is possible to reach values of 8 g/dm$^3$. This substantially reduces the volume by reducing costs and facilitating the operation of stages II and III. It is also important to clarify that, although in this example the alternative of obtaining concentrated brine at the location of the pond system is chosen, with the lithium concentration reached at the final pre-concentration stage, it is convenient to transport the liquid phase that delivers stage IV to some site with an industrial infrastructure where stages V, VI and VII are performed.

Example 2: Natural Brine from the Pozuelos Salt Flat

This Salt flat is a salt deposit located in the Region of Argentine Puna at more than 3800 msnm.
Field and Laboratory Test
   The lithium content in the natural brine with which ECL is performed is g/dm$^3$ and the defined volume to start the test is 842 dm$^3$.
   On day 1 890 dm$^3$ of natural brine is extracted by pumping from the Pozuelos Salt flat. This brine identified as FL(i) is transported to the experimental outdoor center located in the area of Tres Morros, Jujuy province, Argentina, and on the following day it is charged in three similar ponds with an area of about 1.5 m$^2$. The average height of FL(i) in the ponds is approximately equal to 0.197 m.
Natural brine (FL(i)):

| Mass FL (i) | 1,022 | kg |
|---|---|---|
| $^1\rho$ (FL (i)) | 1.19 | kg/dm$^3$ |
| $^2$V (FL (i)) | 890 | dm$^3$ |
| $^3$STD (FL(i)) | 319 | g/dm$^3$ |

$^1\rho$ (FL (i)): density or the Liquid Phase at stage I
$^2$V (FL (i)): Volume of the Liquid Phase at stage I
$^3$STD (FL(i)): Total dissolved solids of the Liquid Phase at the stage
FL (i) Chemistry:

|  | DETERMINATION | | | | | |
|---|---|---|---|---|---|---|
| UNIT | Li$^+$ mg/dm$^3$ | Ca$^{++}$ mg/dm$^3$ | Mg$^{++}$ mg/dm$^3$ | B$_4$O$_7^-$ mg/dm$^3$ | Na$^+$ mg/dm$^3$ | K$^+$ mg/dm$^3$ |
| TECHNIQUE | ICP-OES | ICP-OES | ICP-OES | ICP-OES | ICP-OES | ICP-OES |
| Comp. FL (i) | 378 | 1,287 | 4,082 | 1,467 | 113,001 | 3,668 |

|  | DETERMINATION | | | | | |
|---|---|---|---|---|---|---|
| UNIT | Ba$^{++}$ mg/dm$^3$ | Sr$^{++}$ mg/dm$^3$ | Fe$^{+++}$ mg/dm$^3$ | Cl$^-$ mg/dm$^3$ | SO$_4^-$ mg/dm$^3$ | CO$_3^-$ mg/dm$^3$ |
| TECHNIQUE | ICP-OES | ICP-OES | ICP-OES | Argentometry | Gravimetry | Volumetry |
| Comp. FL (i) | — | 37 | 1.82 | 189505 | 5507 | N.D. |

| DETERMINATION | HCO$_3^-$ | pH | Density |
|---|---|---|---|
| UNIT | mg/dm$^3$ | UpH | kg/dm$^3$ |
| TECHNIQUE | Volumetry | Potentiometry | Pycnometry |
| Comp. FL (i) | 517 | 7.41 | 1.220 |
| Ionic balance | Charges+ | 5,541 | |
|  | Charges− | 5,488 | Deviation −0.005 |

STAGE I: Initial Pre-Concentration

Substage I.1

The brine FL(i) is exposed to the solar evaporation process until day 50. That same day the crystals of the Liquid phase are separated, and the following is obtained:

Liquid phase FL (I.1):

| | | |
|---|---|---|
| Mass FL (I.1) | 244 | kg |
| ρ (FL (I.1)) | 1.22 | kg/dm$^3$ |
| Vt (FL (I.1)) | 200 | dm$^3$ |
| STD (FL(I.1)) | 357 | g/dm$^3$ |

FL (I.1) Chemistry:

| | DETERMINATION | | | | | |
|---|---|---|---|---|---|---|
| UNIT | Li$^+$ mg/dm$^3$ | Ca$^{++}$ mg/dm$^3$ | Mg$^{++}$ mg/dm$^3$ | B$_4$O$_7^=$ mg/dm$^3$ | Na$^+$ mg/dm$^3$ | K$^+$ mg/dm$^3$ |
| TECHNIQUE | ICP-OES | ICP-OES | ICP-OES | ICP-OES | ICP-OES | ICP-OES |
| Comp. FL (1.1) | 1,679 | 1,168 | 14,120 | 5,805 | 98,453 | 14,854 |

| | DETERMINATION | | | | | |
|---|---|---|---|---|---|---|
| UNIT | Ba$^{++}$ mg/dm$^3$ | Sr$^{++}$ mg/dm$^3$ | Fe$^{+++}$ mg/dm$^3$ | Cl$^-$ mg/dm$^3$ | SO$_4^=$ mg/dm$^3$ | CO$_3^=$ mg/dm$^3$ |
| TECHNIQUE | ICP-OES | ICP-OES | ICP-OES | Argentometry | Gravimetry | Volumetry |
| Comp. FL (I.1) | — | 42 | 6 | 209,000 | 10,306 | N.D. |

| DETERMINATION | HCO$_3^-$ | pH | Density | |
|---|---|---|---|---|
| UNIT | mg/dm$^3$ | UpH | kg/dm$^3$ | |
| TECHNIQUE | Volumetry | Potentiometry | Pycnometry | |
| Comp. FL (I.1) | 1510 | 7.02 | 1.235 | |
| Ionic balance | Charges+ | 6,225 | | |
| | Charges− | 6,210 | Deviation | −0.001 |

Precipitated Solids at Substage I.1 (SP (I.1)):

| | | |
|---|---|---|
| Total mass $^1$SP (I.1)= | 265.63 | kg |
| $^2$Total evaporated w at 105° C.= | 13.83 | % |
| $^3$H= | 11.5 | % |

$^1$SP (I.1) = Precipitated solids at stage I.1
$^2$Total evaporated w at 105° C. = Total evaporated water at 105° C.
$^3$H=Humidity Chemistry of Solids SP (I.1):

| | DETERMINATION | | | | | |
|---|---|---|---|---|---|---|
| UNIT | Li$^+$ % (w/w) | Ca$^{++}$ % (w/w) | Mg$^{++}$ % (w/w) | B % (w/w) | Na$^+$ % (w/w) | K$^+$ % (w/w) |
| TECHNIQUE | ICP-OES | ICP-OES | ICP-OES | ICP-OES | ICP-OES | ICP-OES |
| Comp. SP (I.1) | 0.024 | 0.43 | 0.2159 | 0.027 | 37.10 | 0.314 |

| DETERMINATION | Cl$^-$ | SO$_4^=$ | Humidity | Insolubles |
|---|---|---|---|---|
| UNIT | % (w/w) | % (w/w) | % (w/w) | % (w/w) |
| TECHNIQUE | Argentometry | Gravimetry | Gravimetry | Gravimetry |
| Comp. SP (I.1) | 53.09 | 1.087 | 9.40 | 1.2 |

Theoretical Calculation of the Precipitated Solid Mass SP (I.1):

| | Mass in FL (i) | Mass in FL (I.1) | Precipitated mass | Precipitated moles |
|---|---|---|---|---|
| Unit | g | g | g | moles g |
| Na$^+$ | 100,571 | 19,727 | 80,844 | 3,515 |
| K$^+$ | 3,265 | 2,976 | 288 | 7 |
| Ca$^{++}$ | 1,145 | 234 | 911 | 22.7 |
| Mg$^{++}$ | 3,633 | 2,789 | 844 | 34.7 |
| Cl$^-$ | 168,659 | 41,877 | 126,782 | 3,571 |
| SO$_4^=$ | 4,901 | 2,065 | 2836 | 29.5 |
| HCO$_3^-$ | 460 | 303 | 158 | 2.6 |
| B$_4$O$_7^=$ | 1,306 | 1,163 | 142 | 0.9 |
| | | | 212,806 | g |

-continued

| | Mass in FL (i) | Mass in FL (I.1) | Precipitated mass | Precipitated moles |
|---|---|---|---|---|
| $^1$Cryst. W NE | | | 776 | g |
| | | | 213,582 | g |

$^1$Cryst. w NE: non-evaporated crystallization water

| | | |
|---|---|---|
| STD (i) | 284,311 | g |
| STD (I.1) | 71,520 | g |
| $^1$SP (I.1) | 212,791 | g |

Deviation 0.0000

Total precipitated 216,943 g $^1$SP (I.1): Precipitated solids

Calculation of SM Volume (Vsm (I.1))

| | | |
|---|---|---|
| $^1$Vsm (I.1) = | 30.44 | dm$^3$ |
| Moisturizing solution mass | 37.14 | kg |
| Insoluble mass in SP (I.1) | 2.58 | kg |
| $^2$E crystallization w | 5.07 | kg |

-continued

| Theoretical precipitated mass | 259.15 | kg |
| Harvested crystal mass | 265.63 | kg |

| Precipitated salts: | |
|---|---|
| 3496 moles | NaCl |
| 27 moles | $MgCl_2 \cdot 6H_2O$ |
| 22 moles | $CaSO_4 \cdot 2H_2O$ |
| 7.7 moles | $Na_2SO_4 \cdot 10H_2O$ |
| 7 moles | $MgCl_2 \cdot KCl \cdot 6H_2O$ |
| 2.6 moles | $NaHCO_3$ |

Deviation: −0.012

[1] Vsm (I.1)=Moisturizing solution volume
[2] E crystallization w=evaporated crystallization water
Harvested crystals are washed with 144 kg of fresh water. This water mass is approximately equal to half of the harvested crystal mass. Wash water is concentrated until the same lithium concentration that has FL (I.1) is reached. Effective volume delivered by substage I.1:

| V(FL I.1)= | 197.5 | $dm^3$ |

Substage I.2

Brine FL (I.1) is charged into a pond and exposed to continue the solar evaporation process until day 78. That day the solids of the liquid phase are separated, and the following is obtained.

Liquid Phase FL (I.2):

| Mass FL (I.2) | 55 | kg |
| ρ (FL (I.2)) | 1.223 | $kg/dm^3$ |
| Vt (FL (I.2)) | 45 | $dm^3$ |
| STD (FL(I.2)) | 409 | $g/dm^3$ |

FL (I.2) Chemistry:

| | DETERMINATION | | | | | |
|---|---|---|---|---|---|---|
| UNIT | $Li^+$ $mg/dm^3$ | $Ca^{++}$ $mg/dm^3$ | $Mg^{++}$ $mg/dm^3$ | $B_4O_7^-$ $mg/dm^3$ | $Na^+$ $mg/dm^3$ | $K^+$ $mg/dm^3$ |
| TECHNIQUE | ICP-OES | ICP-OES | ICP-OES | ICP-OES | ICP-OES | ICP-OES |
| Comp. FL (I.2) | 7,366 | 148 | 61,167 | 25,698 | 16,391 | 28,257 |

| | DETERMINATION | | | | | |
|---|---|---|---|---|---|---|
| UNIT | $Ba^{++}$ $mg/dm^3$ | $Sr^{++}$ $mg/dm^3$ | $Fe^{+++}$ $mg/dm^3$ | $Cl^-$ $mg/dm^3$ | $SO_4^-$ $mg/dm^3$ | $CO_3^-$ $mg/dm^3$ |
| TECHNIQUE | ICP-OES | ICP-OES | ICP-OES | Argentometry | Gravimetry | Volumetry |
| Comp. FL (I.2) | — | 34 | 3 | 226,753 | 42,896 | N.D. |

| DETERMINATION | $HCO_3^-$ | pH | Density |
|---|---|---|---|
| UNIT | $mg/dm^3$ | UpH | $kg/dm^3$ |
| TECHNIQUE | Volumetry | Potentiometry | Pycnometry |
| Comp. FL (I.2) | ND | 4.88 | 1.283 |

| Ionic balance | Charges+ | 7,614 | | |
| | Charges− | 7,621 | Deviation | 0.0005 |

Precipitated Solids at Substage I.2 (SP (I.2)):
Total mass SP (1.2)=53.1 kg; H=1.79%
Chemistry of Solids SP (I.2):

| | DETERMINATION | | | | | |
|---|---|---|---|---|---|---|
| UNIT | $Li^+$ % (w/w) | $Ca^{++}$ % (w/w) | $Mg^{++}$ % (w/w) | B % (w/w) | $Na^+$ % (w/w) | $K^+$ % (w/w) |
| TECHNIQUE | ICP-OES | ICP-OES | ICP-OES | ICP-OES | ICP-OES | ICP-OES |
| Comp. SP (I.2) | 0.020 | 0.27 | 0.1760 | 0.025 | 35.54 | 2.79 |

| DETERMINATION UNIT TECHNIQUE | Cl⁻ % (w/w) Argentometry | SO₄⁻ % (w/w) Gravimetry | Humidity % (w/w) Gravimetry | Insolubles % (w/w) Gravimetry |
|---|---|---|---|---|
| Comp. SP (I.2) | 53.00 | 0.91 | 1.79 | 1.2 |

Theoretical calculation of the precipitated solid mass SP(I.2):

|  | Mass in FL (I.1) | Mass in FL (I.2) | Precipitated mass | Precipitated moles |
|---|---|---|---|---|
| Unit | g | g | g | moles g |
| $Na^+$ | 19,727 | 738 | 18,989 | 826 |
| $K^+$ | 2,976 | 1,272 | 1,704 | 44 |
| $Ca^{++}$ | 234 | 7 | 227 | 5.7 |
| $Mg^{++}$ | 2,789 | 2,754 | 35 | 1.4 |
| $Cl^-$ | 41,877 | 10,208 | 31,669 | 892 |
| $SO_4^-$ | 2,065 | 1,931 | 134 | 1.4 |
| $HCO_3^-$ | 0 | — | 228 | 6 |
| $B_4O_7^-$ | 1,163 | 1,157 | 6 | 0.04 |
|  |  |  | 52,993 |  |
|  |  | Crystallization water |  | 69.3 |
|  |  |  | 53,062 |  |

| STD (I.1) | 70,496 | g |
| STD (I.2) | 18,399 | g |
| SP (I.2) | 52,097 | g |

Deviation −0.0085
Total precipitated 52730 g
Calculation of the Moisturizing Solution Volume (Vsm (I.2))

| Vsm (I.2)= | 1.3 | dm³ |
|---|---|---|
| Moisturizing solution mass | 1.6 | kg |
| Insoluble mass in SP (I.2) | 0.6 | kg |

| Theoretical precipitated mass | 54.376 | kg |
|---|---|---|
| Harvested crystal mass | 53.100 | kg |

Deviation 0.012
Effective volume delivered by the substage (1.2)=44.41 dm³
Harvested crystals are washed with 30 kg of fresh water. This water mass is approximately equal to half of the harvested crystal mass. Wash water is concentrated until the same lithium concentration that has FL (I.2) is reached.

STAGE II: Cooling

On day 85 FL (I.2) is transported to a laboratory where it is cooled at minus seven degrees Celsius (−7° C.) in a freezer for a period of 18 days, and the following is obtained.

Liquid Phase FL(II)

| Mass FL (II) | 53 | kg |
|---|---|---|
| ρ (FL (II)) | 1.258 | kg/dm³ |
| Vt (FL (II)) | 42 | dm³ |
| STD (FL(II)) | 368 | g/dm³ |

FL (II) Chemistry:

| UNIT | DETERMINATION | | | | | |
|---|---|---|---|---|---|---|
|  | $Li^+$ mg/dm³ | $Ca^{++}$ mg/dm³ | $Mg^{++}$ mg/dm³ | $B_4O_7^-$ mg/dm³ | $Na^+$ mg/dm³ | $K^+$ mg/dm³ |
| TECHNIQUE | ICP-OES | ICP-OES | ICP-OES | ICP-OES | ICP-OES | ICP-OES |
| Comp. FL (II) | 7,745 | 131 | 60,358 | 23,416 | 13,268 | 15,986 |

| UNIT | DETERMINATION | | | | | |
|---|---|---|---|---|---|---|
|  | $Ba^{++}$ mg/dm³ | $Sr^{++}$ mg/dm³ | $Fe^{+++}$ mg/dm³ | $Cl^-$ mg/dm³ | $SO_4^-$ mg/dm³ | $CO_3^-$ mg/dm³ |
| TECHNIQUE | ICP-OES | ICP-OES | ICP-OES | Argentometry | Gravimetry | Volumetry |
| Comp. FL (II) | — | 5 | 3.74 | 218,160 | 29,150 | N.D. |

| DETERMINATION UNIT TECHNIQUE | $HCO_3^-$ mg/dm³ Volumetry | pH UpH Potentiometry | Density kg/dm³ Pycnometry |
|---|---|---|---|
| Comp. FL (II) | N/D | 5.00 | 1.258 |

| Ionic balance | Charges+ | 7,097 | Deviation | −0.002 |
|---|---|---|---|---|
|  | Charges− | 7,063 |  |  |

Precipitated Solids at Stage II (SP (II)):

| Total mass SP (II)= | 3.22 | kg |
|---|---|---|
| ¹Total evaporated water. AT 105° C.= | 30.45 | % |
| H is assumed= | 11 | % |

Chemistry of Solids SP (II):

| UNIT | DETERMINATION | | | | | |
|---|---|---|---|---|---|---|
| | $Li^+$ % (w/w) | $Ca^{++}$ % (w/w) | $Mg^{++}$ % (w/w) | B ppm | $Na^+$ % (w/w) | $K^+$ % (w/w) |
| TECHNIQUE | ICP-OES | ICP-OES | ICP-OES | ICP-OES | ICP-OES | ICP-OES |
| Comp. SP (II) | 0.058 | 0.052 | 7.217 | 1.577 | 6.01 | 19.64 |

| DETERMINATION UNIT TECHNIQUE Comp. SP (II) | $Cl^-$ % (w/w) Argentometry 27.90 | $SO_4^=$ % (w/w) Gravimetry 4.15 | Humidity % (w/w) Gravimetry 11.00 | Insolubles % (w/w) Gravimetry 1.2 |
|---|---|---|---|---|

Theoretical Calculation of the Precipitated Solid Mass SP (II):

| | Mass in FL (I.2) | Mass in FL (II) | Precipitated mass | Precipitated moles |
|---|---|---|---|---|
| Unit | g | g | g | moles g |
| $Na^+$ | 728 | 560 | 168 | 7 |
| $K^+$ | 1,255 | 675 | 580 | 15 |
| $Ca^{++}$ | 7 | 6 | 1 | 0.0 |
| $Mg^{++}$ | 2,716 | 2,549 | 167 | 6.9 |
| $Cl^-$ | 10,070 | 9,214 | 856 | 24 |
| $SO_4^=$ | 1,905 | 1,231 | 674 | 7.0 |
| $HCO_3^-$ | — | — | — | — |
| $B_4O_7^=$ | 1,141 | 989 | 152 | 1.0 |
| Cryst. w NE | | | 221 | |
| | | | 2,818 | |

| STD (I.2) | 18,151 | g |
|---|---|---|
| STD (II) | 15,552 | g |
| SP (II) | 2,599 | g |
| ¹Cryst. W NE | 221 | g |
| | 2,820 | g |

Deviation 0.0003
Total precipitated 2851 g
Precipitated Salts:

| Carnalite | $MgCl_2 \cdot KCl \cdot 6H_2O$ | 713 | g |
|---|---|---|---|
| Glaserite | $K_{2.24}Na_{1.75}(SO_4)_2$ | 0 | g |
| Kainite | $MgSO_4 \cdot KCL_2 \cdot 2.75H_2O$ | 55 | g |
| | Crystallization water | 769 | g |

| Vsm (II) = | 0.5 | $dm^3$ | | |
|---|---|---|---|---|
| Moisturizing solution mass | 0.6 | kg | | |
| Insoluble mass in SP (II) | 0.03 | kg | | |
| Theoretical precipitated mass | 3.452 | kg | Deviation | 0.035 |
| Harvested crystal mass | 3.220 | kg | | |

Deviation 0.035

Harvested crystals are washed with 1.5 kg of fresh water. This water mass is approximately equal to half of the harvested crystal mass. Wash water is concentrated until the same lithium concentration that has FL (II) is reached Effective volume delivered by Stage II=44.41 $dm^3$ STAGE III: Pre-Treatment 1.875 kg of $CaCl_2 \cdot 2H_2O$ suspended at 2 $dm^3$ of fresh water is added to total of FL (II). It is stirred for an hour and phases are separated, and the following is obtained:

Liquid Phase FL(III)

| Mass FL (III) | 53 | kg |
|---|---|---|
| ρ (FL (III)) | 1.258 | $kg/dm^3$ |
| Vt (FL (III)) | 44 | $dm^3$ |
| STD (FL(III)) | 380 | $g/dm^3$ |

FL (III) Chemistry:

| | DETERMINATION | | | | | |
|---|---|---|---|---|---|---|
| | $Li^+$ | $Ca^{++}$ | $Mg^{++}$ | $B_4O_7^=$ | $Na^+$ | $K^+$ |
| UNIT | $mg/dm^3$ | $mg/dm^3$ | $mg/dm^3$ | $mg/dm^3$ | $mg/dm^3$ | $mg/dm^3$ |
| TECHNIQUE | ICP-OES | ICP-OES | ICP-OES | ICP-OES | ICP-OES | ICP-OES |
| Comp. FL (III) | 7,186 | 1,620 | 61,014 | 19,996 | 14,411 | 15,963 |

| | DETERMINATION | | | | | |
|---|---|---|---|---|---|---|
| | $Ba^{++}$ | $Sr^{++}$ | $Fe^{+++}$ | $Cl^-$ | $SO_4^-$ | $CO_3^-$ |
| UNIT | $mg/dm^3$ | $mg/dm^3$ | $mg/dm^3$ | $mg/dm^3$ | $mg/dm^3$ | $mg/dm^3$ |
| TECHNIQUE | ICP-OES | ICP-OES | ICP-OES | Argentometry | Gravimetry | Volumetry |
| Comp. FL (III) | — | 6 | 7 | 242,651 | 2,432 | N.D. |

| DETERMINATION UNIT TECHNIQUE Comp. FL (III) | $HCO_3^-$ $mg/dm^3$ Volumetry N/D | pH UpH Potentiometry 5.03 | Density $kg/dm^3$ Pycnometry 1.245 |
|---|---|---|---|

| Ionic balance | Charges+ Charges− | 7,205 7,153 | Deviation | −0.004 |
|---|---|---|---|---|

Precipitated Solids at Stage III (SP (III)):

| Total mass SP (III)= | 1.95 | kg |
|---|---|---|
| Total evaporated w at 105° C.= | 32.36 | % |
| H is assumed= | 5 | % |

Chemistry of Solids SP (III):

| | DETERMINATION | | | | |
|---|---|---|---|---|---|
| | $Li^+$ | $Ca^{++}$ | $Mg^{++}$ | B | $Na^+$ | $K^+$ |
| UNIT | % (w/w) | % (w/w) | % (w/w) | ppm | % (w/w) | % (w/w) |
| TECHNIQUE | ICP-OES | ICP-OES | ICP-OES | ICP-OES | ICP-OES | ICP-OES |
| Comp. SP (III) | 0.219 | 15.28 | 2.665 | — | 0.51 | 0.52 |

| DETERMINATION | $Cl^-$ | $SO_4^-$ | Humidity | Insolubles |
|---|---|---|---|---|
| UNIT | % (w/w) | % (w/W) | % (w/w) | % (w/w) |
| TECHNIQUE | Argentometry | Gravimetry | Gravimetry | Gravimetry |
| Comp. SP (III) | 6.86 | 57.13 | 5.00 | 1.1 |

Theoretical Calculation of the Precipitated Solid Mass SP (II)):

| | Mass in FL(II) plus addition | Mass in FL (III) | Precipitated mass | Precipitated moles |
|---|---|---|---|---|
| Unit | g | g | g | moles g |
| $Na^+$ | 560 | 627 | | 0 |
| $K^+$ | 675 | 695 | | 0 |
| $Ca^{++}$ | 518 | 71 | 447 | 11.2 |
| $Mg^{++}$ | 2,549 | 2,655 | | 0.0 |
| $Cl^-$ | 10,119 | 10,561 | | 0 |
| $SO_4^-$ | 1,231 | 106 | 1,125 | 11.7 |
| $HCO_3^-$ | — | — | — | — |
| Dry Solid | | | 1,572 | |
| Cryst. w NE | | | 313 | |
| Subtotal precipitated | | | 1,885 | |

This does not include:
  Moisturizing solution
  Insolubles
Total precipitated=1,906 g This does not include: moisturizing solution
Precipitated Salts:

| 11.5 moles of: | $CaSO_4 \cdot 2H_2O$ |
|---|---|
| Crystallization water (g) | 828 |

Calculation of the Moisturizing Solution Volume (Vsm (III)):

| Vsm (III)= | 0.1 | $dm^3$ |
|---|---|---|
| SM mass | 0.2 | kg |
| Insoluble mass in SP (III) | 0.02 | kg |

| Theoretical precipitated mass | 2.073 | kg | Deviation | 0.031 |
|---|---|---|---|---|
| Harvested crystal mass | 1.950 | kg | | |

Harvested crystals are washed with 1 kg of fresh water. This water mass is approximately equal to half of the harvested crystal mass. Wash water is concentrated until the same lithium concentration that has FL (III) is reached. Effective volume delivered by stage III (L)=42.4 $dm^3$ STAGE IV: Final Pre-Concentration On day 107 FL (III) is transported to the Experimental outdoor center located in the area of Tres Morros, Jujuy province, Argentina, and is exposed to solar evaporation.

Substage IV.1

On day 124 a sample of the liquid phase is taken. The lithium concentration in FL (IVA) is determined, and the value 16.856 $g/dm^3$ is obtained. It is decided to continue the concentration process by solar evaporation.

Substage IV.2

The concentration process is continued by solar evaporation, and on day 129 the phases are separated, and the following is obtained:

Liquid Phase FL (IV.2):

| Mass FL (IV.2) | 17.87 | kg |
|---|---|---|
| ρ (FL (IV.2)) | 1.314 | $kg/dm^3$ |
| Vt (FL (IV.2)) | 13.6 | $dm^3$ |
| STD (FL (IV.2)) | 495 | $g/dm^3$ |

FL (IV.2) Chemistry:

| | DETERMINATION | | | | | |
|---|---|---|---|---|---|---|
| | $Li^+$ | $Ca^{++}$ | $Mg^{++}$ | $B_4O_7^=$ | $Na^+$ | $K^+$ |
| UNIT | $mg/dm^3$ | $mg/dm^3$ | $mg/dm^3$ | $mg/dm^3$ | $mg/dm^3$ | $mg/dm^3$ |
| TECHNIQUE | ICP-OES | ICP-OES | ICP-OES | ICP-OES | ICP-OES | ICP-OES |
| Comp. FL (IV.2) | 2,1453 | 2,170 | 84,338 | 55,455 | 954 | 758 |

| | DETERMINATION | | | | | |
|---|---|---|---|---|---|---|
| | $Ba^{++}$ | $Sr^{++}$ | $Fe^{+++}$ | $Cl^-$ | $SO_4^-$ | $CO_3^-$ |
| UNIT | $mg/dm^3$ | $mg/dm^3$ | $mg/dm^3$ | $mg/dm^3$ | $mg/dm^3$ | $mg/dm^3$ |
| TECHNIQUE | ICP-OES | ICP-OES | ICP-OES | Argentometry | Gravimetry | Volumetry |
| Comp. FL (IV.2) | — | 8 | 9 | 329,402 | 519 | N.D. |

| DETERMINATION | $HCO_3^-$ | pH | Density |
|---|---|---|---|
| UNIT | $mg/dm^3$ | UpH | $kg/dm^3$ |
| TECHNIQUE | Volumetry | Potentiometry | Pycnometry |
| Comp. FL (IV.2) | N/D | 3.00 | 1.314 |

| Ionic balance | Charges + | 10,243 | | |
|---|---|---|---|---|
| | Charges − | 10,017 | Deviation | −0.011 |

Precipitated Solids at Stage IV.2 (SP (IV.2)):

| Total mass SP (IV.2)= | 16.128 | kg |
|---|---|---|
| Total evapor. w at 105° C.= | 37.64 | % |
| H is assumed= | 5 | % |

Chemistry of Solids SP (IV.2):

| | DETERMINATION | | | | | |
|---|---|---|---|---|---|---|
| | $Li^+$ | $Ca^{++}$ | $Mg^{++}$ | B | $Na^+$ | $K^+$ |
| UNIT | % (w/w) | % (w/w) | % (w/w) | ppm | % (w/w) | % (w/w) |
| TECHNIQUE | ICP-OES | ICP-OES | ICP-OES | ICP-OES | ICP-OES | ICP-OES |
| Comp. SP (IV.2) | 0.201 | 0.592 | 15.284 | 0.596 | 5.93 | 6.25 |

| DETERMINATION | $Cl^-$ | $SO_4^-$ | Humidity | Insolubles |
|---|---|---|---|---|
| UNIT | % (w/w) | % (w/w) | % (w/w) | % (w/w) |
| TECHNIQUE | Argentometry | Gravimetry | Gravimetry | Gravimetry |
| Comp. SP (IV.2) | 61.25 | 1.05 | 5.00 | 1.3 |

Theoretical Calculation of the Precipitated Solid Mass SP (IV.2):

| | Mass in FL (III) | Mass in FL (IV.2) | Precipitated mass | Precipitated moles |
|---|---|---|---|---|
| Unit | g | g | g | moles g |
| $Li^+$ | 305 | 292 | 13 | 1.9 |
| $Na^+$ | 611 | 13 | 598 | 26 |
| $K^+$ | 677 | 10 | 667 | 17 |
| $Ca^{++}$ | 71 | 30 | 41 | 1.0 |
| $Mg^{++}$ | 2,587 | 1,147 | 1,440 | 59.2 |
| $Cl^-$ | 10,288 | 4,480 | 5,809 | 164 |
| $SO_4^-$ | 103 | 7 | 96 | 1.0 |
| $HCO_3^-$ | — | — | — | — |
| $B_4O_7^-$ | 848 | 754 | 94 | 0.6 |
| Cryst. w NE | | | 2,305 | |
| | | | 11,049 | |

| STD (III) | 16,099 | g |
|---|---|---|
| STD (IV.2) | 6,733 | g |
| SP (IV.2) | 9,366 | g |
| Cryst. w NE | 2,305 | g |
| | 11,671 | g |

Deviation 0.0274
Total precipitated 11,795 g

| Bischofite | $MgCl_2 \cdot 6H_2O$ | 4,644 | g |
|---|---|---|---|
| Carnalite | $MgCl_2 \cdot KCl \cdot 6H_2O$ | 612 | g |
| Gypsum | $CaSO_4 \cdot 2H_2O$ | 36 | g |
| | Crystallization water | 5,292 | g |

Calculation of the Moisturizing Solution Volume (Vsm (IV.2)):

| Vsm (IV.2) = | 1.0 | $dm^3$ |
|---|---|---|
| Moisturizing solution mass | 1.3 | kg |
| Insoluble mass in SP (IV.2) | 0.12 | kg |

| Dry precipitated mass t. + moisturizing solution | 13.091 | kg |
|---|---|---|
| ¹E cryst w | 3.494 | kg |
| Total wet mass | 16.585 | kg |
| Harvested crystal mass | 16.128 | kg |

Deviation 0.014

¹E cryst w: evaporated crystallization water

Harvested crystals are washed with 8 kg of fresh water. This water mass is approximately equal to half of the harvested crystal mass. Wash water is concentrated until the same lithium concentration that has FL (IV.2) is reached.

Effective volume delivered by stage IV.2 (L)=13.2 $dm^3$

Substage IV.2'

While during the evolution of stage IV.2 lithium-containing salts did not crystallize in their chemical formula, as evidenced by the low lithium content in the SP salts (IV.2), in the laboratory it was verified that when evaporating about 200 cm 3 of water, the lithium concentration in the liquid phase decreased by indicating the crystallization of lithium-carnalite, and the Mg/Li ratio also decreased, indicating the simultaneous bischofite crystallization. This occurs because of the low potassium concentration and the high magnesium concentration. It is then decided to add a prepared aqueous solution dissolving 1.169 kg of KCl at 4.136 $dm^3$ of fresh water to FL (IV.2), and the following is obtained:

Liquid Phase FL (IV.2')

FL (IV.2') Chemistry:

| Mass FL (IV.2') | 23.24 | kg |
|---|---|---|
| ρ (FL (IV.2')) | 1.305 | $kg/dm^3$ |
| Vt (FL (IV.2')) | 17.810 | $dm^3$ |
| STD (FL(IV.2')) | 395 | $g/dm^3$ |

| | DETERMINATION | | | | | |
|---|---|---|---|---|---|---|
| | $Li^+$ | $Ca^{++}$ | $Mg^{++}$ | $B_4O_7^-$ | $Na^+$ | $K^+$ |
| UNIT | $mg/dm^3$ | $mg/dm^3$ | $mg/dm^3$ | $mg/dm^3$ | $mg/dm^3$ | $mg/dm^3$ |
| TECHNIQUE | ICP-OES | ICP-OES | ICP-OES | ICP-OES | ICP-OES | ICP-OES |
| Comp. FL (IV.2') | 16,430 | 1,663 | 57,277 | 42,490 | 731 | 19,223 |

| | DETERMINATION | | | | | |
|---|---|---|---|---|---|---|
| | Ba | Sr | Fe | $Cl^-$ | $SO_4-$ | $CO_3-$ |
| UNIT | $mg/dm^3$ | $mg/dm^3$ | $mg/dm^3$ | $mg/dm^3$ | $mg/dm^3$ | $mg/dm^3$ |
| TECHNIQUE | ICP-OES | ICP-OES | ICP-OES | Argentometry | Gravimetry | Volumetry |
| Comp. FL (IV.2') | — | 6 | 7 | 257,775 | 398 | N.D. |

| DETERMINATION | $HCO_3^-$ | pH | Density |
|---|---|---|---|
| UNIT | $mg/dm^3$ | UpH | $kg/dm^3$ |
| TECHNIQUE | Volumetry | Potentiometry | Pycnometry |
| Comp. FL (IV.2') | N/D | 3.00 | 1.314 |

| Ionic balance | Charges + | 7,660 | | |
|---|---|---|---|---|
| | Charges − | 7,827 | Deviation | 0.011 |

Theoretical Calculation of the Precipitated Solid Mass SP (IV.2):

Mass in FL Mass in FL Precipitated

|  | Mass in FL (IV.2) | Mass in FL (IV.2') | Precipitated mass | Precipitated moles |
|---|---|---|---|---|
| Unit | g | g | g | moles g |
| $Li^+$ | 292 | 293 | −1 | −0.1 |
| $Na^+$ | 13 | 13 | 0 | 0 |
| $K^+$ | 642 | 323 | 318 | 8.1 |
| $Ca^{++}$ | 30 | 30 | 0 | 0.0 |
| $Mg^{++}$ | 1,147 | 1,020 | 127 | 5.2 |
| $Cl^-$ | 5,053 | 4591 | 462 | 13.0 |
| $SO_4^-$ | 7 | 7 | 0 | 0.0 |
| $HCO_3^-$ | — | — | — | — |
| $B_4O_7^-$ | 754 | 757 | −3 | 0.0 |
| Cryst. w NE |  |  | 907 290 1,197 |  |
| STD (IV.2) | 7,937 | g |  |  |
| STD (IV.2') | 7,034 | g | Deviation | 0.0020 |
| SP (IV.2') | 903 | g |  |  |
| Cryst. w NE | 290 1,193 | g g |  |  |

Crystallized Salts:

| Bischofite | $MgCl_2 \cdot 6H_2O$ (5 moles) | 540 g |
|---|---|---|
|  | KCl (3 moles) | 0 |
|  | Crystallization water | 540 g |

The heterogeneous mixture of FL (IV.2') with the precipitated solids are exposed to solar evaporation on day 136.

On day 143 the solid and liquid phases are separated, and the following is obtained.

Liquid Phase FL (IV.3):

| Mass FL (IV.3) | 10.69 | kg |
| ρ (FL (IV.3)) | 1.314 | $kg/dm^3$ |
| Vt (FL (IV.3)) | 8.1 | $dm^3$ |
| STD (FL(IV.3)) | 511 | $g/dm^3$ |

FL (IV.3) Chemistry:

| DETERMINATION | | | | | | |
|---|---|---|---|---|---|---|
|  | $Li^+$ | $Ca^{++}$ | $Mg^{++}$ | $B_4O_7^-$ | $Na^+$ | $K^+$ |
| UNIT | $mg/dm^3$ | $mg/dm^3$ | $mg/dm^3$ | $mg/dm^3$ | $mg/dm^3$ | $mg/dm^3$ |
| TECHNIQUE | ICP-OES | ICP-OES | ICP-OES | ICP-OES | ICP-OES | ICP-OES |
| Comp. FL (IV.3) | 35364 | 3177 | 62469 | 44523 | 780 | 722 |

| DETERMINATION | | | | | |
|---|---|---|---|---|---|
|  | $Ba^{++}$ | $Sr^{++}$ | $Fe^{+++}$ | $Cl^-$ | $SO_4^-$ | $CO_3^-$ |
| UNIT | $mg/dm^3$ | $mg/dm^3$ | $mg/dm^3$ | $mg/dm^3$ | $mg/dm^3$ | $mg/dm^3$ |
| TECHNIQUE | ICP-OES | ICP-OES | ICP-OES | Argentometry | Gravimetry | Volumetry |
| Comp. FL (IV.3) | — | 8 | 9 | 359,077 | 4311 | N.D. |

| DETERMINATION | $HCO_3^-$ | pH | Density |
|---|---|---|---|
| UNIT | $mg/dm^3$ | UpH | $kg/dm^3$ |
| TECHNIQUE | Volumetry | Potentiometry | Pycnometry |
| Comp. FL (IV.3) | N/D | 3.00 | 1.314 |

| Ionic balance | Charges+ | 10,243 | | |
|---|---|---|---|---|
|  | Charges− | 10,017 | Deviation | −0.011 |

Precipitated Solids at Stage IV.3 (SP (IV.3)):

| Total mass SP (IV.3)= | 9.74 kg |
|---|---|
| Total evaporated w at 105° C. | 49.84% |
| H is assumed= | 26% |

Chemistry of Solids SP (IV.3):

| DETERMINATION | | | | | | |
|---|---|---|---|---|---|---|
|  | $Li^+$ | $Ca^{++}$ | $Mg^{++}$ | B | $Na^+$ | $K^+$ |
| UNIT | % (w/w) | % (w/w) | % (w/w) | ppm | % (w/w) | % (w/w) |
| TECHNIQUE | ICP-OES | ICP-OES | ICP-OES | ICP-OES | ICP-OES | ICP-OES |
| Comp. SP (IV.3) | 0.899 | 0.126 | 28.066 | 2.050 | 0.22 | 12.71 |

| DETERMINATION | | | |
|---|---|---|---|
|  | $Cl^-$ | $SO_4^-$ | Humidity | Insolubles |
| UNIT | % (w/w) | % (w/w) | % (w/w) | % (w/w) |
| TECHNIQUE | Argentometry | Gravimetry | Gravimetry | Gravimetry |
| Comp. SP (IV.3) | 49.25 | 0.92 | 26.00 | 1.3 |

Theoretical Calculation of the Precipitated Solid Mass SP (IV.3):

|  | Mass in FL (IV.2') | Mass in FL (IV.3) | Precipitated mass | Precipitated moles |
|---|---|---|---|---|
| Unit | g | g | g | moles g |
| $Li^+$ | 293 | 293 | 0 | 0.0 |
| $Na^+$ | 13 | 6 | 7 | 0 |
| $K^+$ | 323 | 6 | 318 | 8 |
| $Ca^{++}$ | 30 | 26 | 41 | 1.0 |
| $Mg^{++}$ | 1,020 | 508 | 512 | 21.1 |
| $Cl^-$ | 4,591 | 2,922 | 1,669 | 47 |
| $SO_4^-$ | 7 | 35 | — | — |
| $HCO_3^-$ | — | — | — | — |
| $B_4O_7^-$ | 757 | 362 | 394 | 2.5 |
| Cryst. w NE |  |  | 1,170 |  |
|  |  |  | 4,111 |  |

| STD (III) | 7,034 g |
|---|---|
| STD (IV.2) | 4,158 g |

-continued

|  |  |  |
|---|---|---|
| SP (IV.2) |  | 2,876 g |
| Cryst. w NE |  | 1,170 g |
|  |  | 4,046 g |

Deviation −0.0080
Total precipitated 4.084 kg
Precipitated Salts:

|  |  |  |
|---|---|---|
| Bischofite | $MgCl_2 \cdot 6H_2O$ | 1,404 g |
| Carnalite | $MgCl_2 \cdot KCl \cdot 6H_2O$ | 756 g |
|  | Crystallization water | 2,160 g |

Calculation of the Moisturizing Solution Volume (Vsm (IV.2)):

|  |  |
|---|---|
| Vsm (IV.2)= | 3.5 dm$^3$ |
| Moisturizing solution mass | 4.6 kg |
| Insoluble mass in SP (IV.2) | 0.04 kg |

|  |  |
|---|---|
| Dry precipitated mass t. + SM | 8.721 kg |
| Evaporated crystal w | 0.990 kg |
| Total wet mass | 9.711 kg |
| Harvested crystal mass | 9.740 kg |

Deviation 0.001

Harvested crystals are washed with 4.6 kg of fresh water. This water mass is approximately equal to half of the harvested crystal mass. Wash water is concentrated until the same lithium concentration that has FL (IV.2) is reached.

Effective volume delivered by stage IV.2 (L)=13.2 dm$^3$

STAGE V

Treatment at Substage V.1

7.95 dm$^3$ obtained (FL (IV.3)) is placed in a plastic container with a capacity of 30 dm$^3$. Stirring manually with a plastic shovel, a prepared calcium hydroxide suspension is added by suspending 1.665 kg at 3.100 dm$^3$ of fresh water. Immediately afterwards, and continuing with stirring, a prepared aqueous solution is added by dissolving 3.169 kg of anhydrous sodium sulfate at 6.3 dm$^3$ of fresh water at 35° C. The heterogeneous mixture obtained after treatment is separated by centrifugation, and the following is obtained:

Liquid Phase FL (V.I):

|  |  |
|---|---|
| Mass FL (V.1) | 17.68 kg |
| ρ (FL (V.1)) | 1.14 kg/dm$^3$ |
| Vt (FL (V.1)) | 15.5 dm$^3$ |
| STD (FL (V.1)) | 271 g/dm$^3$ |

FL (V.1) Chemistry:

| | DETERMINATION | | | | | |
|---|---|---|---|---|---|---|
| | $Li^+$ | $Ca^{++}$ | $Mg^{++}$ | $B_4O_7^-$ | $Na^+$ | $K^+$ |
| UNIT | mg/dm$^3$ | mg/dm$^3$ | mg/dm$^3$ | mg/dm$^3$ | mg/dm$^3$ | mg/dm$^3$ |
| TECHNIQUE | ICP-OES | ICP-OES | ICP-OES | ICP-OES | ICP-OES | ICP-OES |
| Comp. FL (V.1) | 17,699 | 1,350 | 12 | 6,401 | 62,218 | 722 |

| | DETERMINATION | | | | | |
|---|---|---|---|---|---|---|
| | $Ba^{++}$ | $Sr^{++}$ | $Fe^{+++}$ | $Cl^-$ | $SO_4^=$ | $CO_3^=$ |
| UNIT | mg/dm$^3$ | mg/dm$^3$ | mg/dm$^3$ | mg/dm$^3$ | mg/dm$^3$ | mg/dm$^3$ |
| TECHNIQUE | ICP-OES | ICP-OES | ICP-OES | Argentometry | Gravimetry | Volumetry |
| Comp. FL (V.1) | — | 2 | 5 | 177,241 | 5,650 | N.D. |

| | DETERMINATION | | |
|---|---|---|---|
| | $HCO_3^-$ | pH | Density |
| UNIT | mg/dm$^3$ | UpH | kg/dm$^3$ |
| TECHNIQUE | Volumetry | Potentiometry | Pycnometry |
| Comp. FL (V.1) | N/D | 10.60 | 1.140 |

| Ionic balance | Charges+ | 5,361 | | |
|---|---|---|---|---|
|  | Charges− | 5,233 | Deviation | −0.012 |

Precipitated Solids at Stage V.1 (SP V.1):

|  |  |
|---|---|
| Total mass SP (V.1)= | 9.35 kg |
| Total evaporated w at 105° C. | 43% |
| H is assumed= | 33% |

Chemistry of Solids SP (V.1):

| | DETERMINATION | | | | | |
|---|---|---|---|---|---|---|
| | $Li^+$ | $Ca^{++}$ | $Mg^{++}$ | B | $Na^+$ | $K^+$ |
| UNIT | % (w/w) | % (w/w) | % (w/w) | ppm | % (w/w) | % (w/w) |
| TECHNIQUE | ICP-OES | ICP-OES | ICP-OES | ICP-OES | ICP-OES | ICP-OES |
| Comp. SP (V.1) | 0.210 | 17.30 | 9.82 | 1.650 | <0.03 | <0.03 |

| | DETERMINATION | | | |
|---|---|---|---|---|
| | $Cl^-$ | $SO_4^=$ | Humidity | Insolubles |
| UNIT | % (w/w) | % (w/w) | % (w/w) | % (w/w) |
| TECHNIQUE | Argentometry | Gravimetry | Gravimetry | Gravimetry |
| Comp. SP (V.1) | <0.04 | 39.90 | 33.00 | 1.8 |

Theoretical Calculation of the Precipitated Solid Mass SP (V.1):

|  | Mass in FL (IV.3) plus addition | Mass in FL (V.1) | Precipitated mass | Precipitated moles |
|---|---|---|---|---|
| Unit | g | g | g | moles g |
| $Li^+$ | 286 | 274 | 11 | 1.6 |
| $Na^+$ | 1,026 | 965 | 0 | 0 |
| $K^+$ | 6 | 11 | — | — |
| $Ca^{++}$ | 926 | 21 | 905 | 22.6 |
| $Mg^{++}$ | 497 | 0 | 496 | 20.4 |
| $Cl^-$ | 2,855 | 2749 | 106 | 3 |
| $SO_4^=$ | 2,176 | 88 | 2,089 | 21.8 |
| $OH^-$ | 764 | 8 | 756 | 44.5 |
| $HCO_3^-$ | — | — | — | — |
| $B_4O_7^=$ | 354 | 99 | 255 | 1.6 |
|  |  |  | 4,619 | g |
| Cryst. w NE |  |  | 260 | g |
|  |  |  | 4,879 | g |

| STD (IV.2) | 8,897 g |
|---|---|
| STD (V.1) | 4,207 g |
| SP (V.1) | 4,689 g |
| Cryst. w NE | 260 g |
|  | 4,949 g |

Total precipitated=5,035 g
Deviation 0.0136 Calculation of the moisturizing solution volume (Vsm (V.1)):

| Vsm (V.1)= | 3.7 $dm^3$ |
|---|---|
| SM mass | 4.2 kg |
| Insoluble mass in SP (V.1) | 0.09 kg |

| 21 moles | $CaSO_4 \cdot 2H_2O$ | 756 |
|---|---|---|
| 21 moles | $Mg(OH)_2$ |  |
| Crystal water. (g) |  | 756 |

| Precipitated mass t. Dry + SM | 9.203 kg |
|---|---|
| Evaporated crystal w | 0.497 kg |
| Total wet mass | 9.700 kg |
| Harvested crystal mass | 9.350 kg |

Deviation 0.018
Substage V.2

15.5 $dm^3$ obtained (FL (V.1)) is placed in a plastic container with a capacity of 30 $dm^3$. Stirring manually with a plastic shovel, 82 cm 3 of a 4 N solution (160 g/$dm^3$) of sodium hydroxide is added, verifying that pH reaches 11.2. Immediately afterwards, and continuing with stirring, a prepared aqueous solution is added by dissolving 55 g of sodium carbonate at 190 cm 3 of fresh water. Then, and without suspending stirring, a prepared aqueous solution is added by dissolving 223 g of barium chloride dihydrate at 700 cm 3 of fresh water. The heterogeneous mixture is allowed to stand and then the precipitated solids are separated by vacuum filtration, and the following is obtained:

Liquid Phase FL (V.2):

| Mass FL (V.2) | 18.01 kg |
|---|---|
| ρ (FL (V.2)) | 1.13 kg/$dm^3$ |
| Vt (FL (V.2)) | 15.93 $dm^3$ |
| STD (FL(V.2)) | 266 g/$dm^3$ |

FL (V.2) Chemistry:

|  | DETERMINATION | | | | | |
|---|---|---|---|---|---|---|
|  | $Li^+$ | $Ca^{++}$ | $Mg^{++}$ | $B_4O_7^=$ | $Na^+$ | $K^+$ |
| UNIT | mg/$dm^3$ | mg/$dm^3$ | mg/$dm^3$ | mg/$dm^3$ | mg/$dm^3$ | mg/$dm^3$ |
| TECHNIQUE | ICP-OES | ICP-OES | ICP-OES | ICP-OES | ICP-OES | ICP-OES |
| Comp. FL (V.2) | 16,881 | 10 | 0.60 | 6,175 | 63,982 | 461 |

|  | DETERMINATION | | | | |
|---|---|---|---|---|---|
|  | $Ba^{++}$ | $Sr^{++}$ | $Fe^{+++}$ | $Cl^-$ | $SO_4^=$ |
|  | | | UNIT | | |
|  | mg/$dm^3$ | mg/$dm^3$ | mg/$dm^3$ | mg/$dm^3$ | mg/$dm^3$ |
| TECHNIQUE | ICP-OES | ICP-OES | ICP-OES | Argentometry | Gravimetry |
| Comp. FL (V.2) | 34 | 2 | 5 | 177970 | 50 |

|  | DETERMINATION | | |
|---|---|---|---|
|  | $HCO_3^-$ | pH | Density |
|  | | UNIT | |
|  | mg/$dm^3$ | UpH | kg/$dm^3$ |
| TECHNIQUE | Volumetry | Potentiometry | Pycnometry |
| Comp. FL (V.2) | 6 | 11.20 | 1.130 |

| Ionic balance | Charges+ | 5,245 | | |
|---|---|---|---|---|
|  | Charges− | 5,162 | Deviation | −0.008 |

Precipitated Solids at Stage V.2 (SP V.2):

| Total mass SP (V.2)= | 0.295 kg |
|---|---|
| Total evaporated W at 105° C. | 8% |
| H is assumed= | 8% |

Chemistry of Solids SP (V.2):

|  | DETERMINATION | | | | | |
|---|---|---|---|---|---|---|
|  | $Li^+$ | $Ca^{++}$ | $Mg^{++}$ | B | $Na^+$ | $K^+$ |
|  | | | UNIT | | | |
|  | % (w/w) | % (w/w) | % (w/w) | ppm | % (w/w) | % (w/w) |
| TECHNIQUE | ICP-OES | ICP-OES | ICP-OES | ICP-OES | ICP-OES | ICP-OES |
| Comp. SP (V.2) | 0.012 | 16.40 | 10.00 | 1.750 | <0.03 | <0.03 |

| | | DETERMINATION | | | |
|---|---|---|---|---|---|
| $Cl^-$ | $SO_4^=$ | Humidity | Insolubles | $Ba^{++}$ | $CO_3^=$ |
| | | UNIT | | | |
| % (w/w) | % (w/w) | % (w/w) | % (w/w) | % (w/w) | % (w/w) |
| TECHNIQUE | | | | | |
| Argentometry | Gravimetry | Gravimetry | Gravimetry | ICP-OES | Titration |
| Comp. SP (V.2) | | | | | |
| <0.04 | 38.90 | 8.00 | 1.8 | 45.70 | 11.30 |

Theoretical Calculation of the Precipitated Solid Mass SP (V.1):

| | Mass in FL (V.1) plus addition | Mass in FL (V.2) | Precipitated mass | Precipitated moles |
|---|---|---|---|---|
| Unit | g | g | g | moles |
| $Li^+$ | 274 | 269 | 5 | 0.8 |
| $Na^+$ | 1,003 | 1,020 | −17 | −1 |
| $K^+$ | 11 | 7 | 4 | 0 |
| $Ca^{++}$ | 21 | 0 | 21 | 0.5 |
| $Mg^{++}$ | 0 | 0 | 0 | 0.0 |
| $Ba^{++}$ | 123 | — | 123 | 0.9 |
| $Cl^-$ | 2,843 | 2,836 | 0 | 0 |
| $SO_4^=$ | 88 | 1 | 87 | 0.9 |
| $OH^-$ | — | — | — | 0.0 |
| $CO_3^=$ | 30 | 0.1 | 30 | 0.5 |
| $B_4O_7^=$ | 99 | 98 | 1 | 0.0 |
| | | | 254 | g |
| Cryst. w NE | | | 0 | |
| | | | 254 | g |

| STD (V.1) | 4,485 g |
|---|---|
| STD (V.2) | 4,232 g |
| SP (V.2) | 253 g |
| Cryst. w NE | 0 g |
| | 253 g |

Deviation −0.0045
Total precipitated 258 g
Calculation of the Moisturizing Solution Volume (Vsm (IV.2)):

| Vsm (IV.2)= | 0.03 | $dm^3$ | | |
|---|---|---|---|---|
| SM mass | 0.0 | kg | 0.5 moles | $CaCO_3$ |
| Insoluble mass in SP (IV.2) | 0.00 | kg | 0.9 moles | $BaSO_4$ |

| Precipitated mass t. Dry + SM | 0.289 kg |
|---|---|
| Evaporated crystal w | 0 |
| Total wet mass | 0.289 kg |
| Harvested crystal mass | 0.295 kg |

Deviation −0.010

STAGE VI: Post-Treatment Concentration

FL (V.2) is exposed to solar evaporation until a lithium concentration of 37 $g/dm^3$ (3%) is reached, and the following is obtained:

Liquid Phase FL (VI):

| Mass FL (VI) | 9.04 kg |
|---|---|
| ρ (FL (VI)) | 1.26 $kg/dm^3$ |
| Vt (FL (V.I)) | 7.17 $dm^3$ |
| STD (FL(VI)) | 326 $g/dm^3$ |

FL (VI) Chemistry:

| | DETERMINATION | | | | | |
|---|---|---|---|---|---|---|
| | $Li^+$ | $Ca^{++}$ | $Mg^{++}$ | $B_4O_7^=$ | $Na^+$ | $K^+$ |
| UNIT | $mg/dm^3$ | $mg/dm^3$ | $mg/dm^3$ | $mg/dm^3$ | $mg/dm^3$ | $mg/dm^3$ |
| TECHNIQUE | ICP-OES | ICP-OES | ICP-OES | ICP-OES | ICP-OES | ICP-OES |
| Comp. FL (VI) | 37,500 | 33 | 8.00 | 12,860 | 33,780 | 1,350 |

| | DETERMINATION | | | | | |
|---|---|---|---|---|---|---|
| | $Ba^{++}$ | $Sr^{++}$ | $Fe^{+++}$ | $Cl^-$ | $SO_4^=$ | $CO_3^=$ |
| UNIT | $mg/dm^3$ | $mg/dm^3$ | $mg/dm^3$ | $mg/dm^3$ | $mg/dm^3$ | $mg/dm^3$ |
| TECHNIQUE | ICP-OES | ICP-OES | ICP-OES | Argentometry | Gravimetry | Volumetry |
| Comp. FL (VI) | 34 | 5 | 8 | 241,850 | 110 | N.D. |

| | DETERMINATION | | |
|---|---|---|---|
| | $HCO_3^-$ | pH | Density |
| UNIT | $mg/dm^3$ | UpH | $kg/dm^3$ |
| TECHNIQUE | Volumetry | Potentiometry | Pycnometry |
| Comp. FL (VI) | 6 | 8.60 | 1.260 |

| Ionic balance | Charges+ | 6,898 | | |
|---|---|---|---|---|
| | Charges− | 7,050 | Deviation | 0.011 |

Precipitated Solids at Stage V.2 (SP VI):

| Total mass SP (VI)= | 2.29 kg |
|---|---|
| Total evaporated w at 105° C. | 8% |
| H is assumed= | 8% |

Chemistry of Solids SP (VI):

| | DETERMINATION | | | | | |
|---|---|---|---|---|---|---|
| | $Li^+$ | $Ca^{++}$ | $Mg^{++}$ | B | $Na^+$ | $K^+$ |
| UNIT | % (w/w) | % (w/w) | % (w/w) | ppm | % (w/w) | % (w/w) |
| TECHNIQUE | ICP-OES | ICP-OES | ICP-OES | ICP-OES | ICP-OES | ICP-OES |
| Comp. SP (VI) | 0.094 | <0.01 | <0.01 | 0.023 | 38.53 | <0.03 |

81

DETERMINATION

| | Cl⁻ | SO₄⁻ | Humidity | Insolubles |
|---|---|---|---|---|
| UNIT | % (w/w) | % (w/w) | % (w/w) | % (w/w) |
| TECHNIQUE | Argentometry | Gravimetry | Gravimetry | Gravimetry |
| Comp. SP (VI) | 61.10 | <0.01 | 8.00 | 1.1 |

Theoretical calculation of precipitated salt mass:

| | Mass in FL (V.2) | Mass in FL (VI) | Precipitated mass | Precipitated moles |
|---|---|---|---|---|
| Unit | g | g | g | moles |
| $Li^+$ | 269 | 269 | 0 | 0.0 |
| $Na^+$ | 1,020 | 235 | 784 | 34 |
| $K^+$ | 7 | 10 | −2.3 | 0 |
| $Ca^{++}$ | 0.2 | 0.2 | −0.1 | 0.0 |
| $Mg^{++}$ | 0 | 0 | 0 | 0.0 |
| $Cl^-$ | 2,836 | 1735 | 1,101 | 31 |
| $SO_4^-$ | 0 | 0 | 0 | 0.0 |
| $OH^-$ | — | 0 | 0 | 0.0 |
| $B_4O_7^-$ | 98 | 92 | 6 | 0.04 |
| | | | 1,889 | g |
| Cryst. w NE | | | 0 | |
| | | | 1,889 | g |

| | |
|---|---|
| STD (V.2) | 4,232 g |
| STD (VI) | 2,342 g |
| SP (VI) | 1,891 g |
| Cryst. w NE | 0 |
| | 1,891 g |

Deviation 0.0010
Total precipitated=1912 g
Calculation of the Moisturizing Solution Volume (Vsm (VI)):

| | | | |
|---|---|---|---|
| Vsm (VI)= | 0.20 dm³ | 82 moles | NaCl |
| SM mass | 0.3 kg | | |
| Insoluble mass in SP (VI) | 0.02 kg | | |

| | |
|---|---|
| Precipitated mass t. Dry + SM | 2.169 kg |
| Evaporated crystal w | 0 |
| Total wet mass | 2.169 kg |
| Harvested crystal mass | 2.169 kg |

Deviation −0.027

Harvested crystals are washed with 1.1 kg of fresh water. This water mass is approximately equal to half of the harvested crystal mass. Wash water is concentrated until the same lithium concentration that has FL (VI) is reached. Effective volume delivered by Stage VI: 7.05 dm³

STAGE VII: Final Concentration

FL (VI) is exposed to solar evaporation to reach a lithium concentration between 75 g/dm³ and 85 g/dm³. At this final concentration, phases are separated, and the following is obtained:

82

Liquid Phase FL (VII):

| | |
|---|---|
| Mass FL (VII) | 4.24 kg |
| ρ (FL (VII)) | 1.26 kg/dm³ |
| Vt (FL (VII)) | 3.37 dm³ |
| STD (FL(VII)) | 509 g/dm³ |

FL (VII) Chemistry:

DETERMINATION

| | $Li^+$ | $Ca^{++}$ | $Mg^{++}$ | $B_4O_7^-$ | $Na^+$ | $K^+$ |
|---|---|---|---|---|---|---|
| UNIT | mg/dm³ | mg/dm³ | mg/dm³ | mg/dm³ | mg/dm³ | mg/dm³ |
| TECHNIQUE | ICP-OES | ICP-OES | ICP-OES | ICP-OES | ICP-OES | ICP-OES |
| Comp. FL (VII) | 78,530 | 43 | 3.50 | 25,335 | 2,230 | 1,990 |

DETERMINATION

| | $Ba^{++}$ | $Sr^{++}$ | $Fe^{+++}$ | $Cl^-$ | $SO_4^-$ | $CO_3^-$ |
|---|---|---|---|---|---|---|
| UNIT | mg/dm³ | mg/dm³ | mg/dm³ | mg/dm³ | mg/dm³ | mg/dm³ |
| TECHNIQUE | ICP-OES | ICP-OES | ICP-OES | Argentometry | Gravimetry | Volumetry |
| Comp. FL (VII) | 31 | 5 | 8 | 410,520 | 80 | N.D. |

DETERMINATION

| | $HCO_3^-$ | pH | Density |
|---|---|---|---|
| UNIT | mg/dm³ | UpH | kg/dm³ |
| TECHNIQUE | Volumetry | Potentiometry | Pycnometry |
| Comp. FL (VII) | ND | 8.40 | 1.260 |

| | | | | |
|---|---|---|---|---|
| Ionic balance | Charges+ | 11453 | | |
| | Charges− | 11715 | Deviation | 0.011 |

Precipitated Solids at Stage VII (SP VII):

| | |
|---|---|
| Total mass SP (VII)= | 0.96 kg |
| Total evaporated w at 105° C. | 18% |
| H= | 18% |

Chemistry of Solids SP (VII):

DETERMINATION

| | $Li^+$ | $Ca^{++}$ | $Mg^{++}$ | B | $Na^+$ | $K^+$ |
|---|---|---|---|---|---|---|
| UNIT | % (w/w) | % (w/w) | % (w/w) | ppm | % (w/w) | % (w/w) |
| TECHNIQUE | ICP-OES | ICP-OES | ICP-OES | ICP-OES | ICP-OES | ICP-OES |

-continued

| | Cl⁻ | SO₄⁻ | Humidity | Insolubles |
|---|---|---|---|---|
| Comp. SP (VII) | 0.094 | <0.01 | <0.01 | 0.023 38.53 <0.03 |

DETERMINATION

| | Cl⁻ | SO₄⁻ | Humidity UNIT | Insolubles |
|---|---|---|---|---|
| | % (w/w) | % (w/w) | % (w/w) | % (w/w) |
| TECHNIQUE | Argentometry | Gravimetry | Gravimetry | Gravimetry |
| Comp. SP (VII) | 61.10 | <0.01 | 8.00 | 1.1 |

Theoretical calculation of the crystallized salt mass at the final concentration stage VII:

| | Mass in FL (VI) | Mass in FL (VII) | Precipitated mass | Precipitated moles |
|---|---|---|---|---|
| Unit | g | g | g | moles g |
| Li⁺ | 269 | 264 | 5 | 0.7 |
| Na⁺ | 235 | 4 | 231 | 10 |
| K⁺ | 10 | 6 | 3.2 | 0 |
| Ca⁺⁺ | 0.2 | 0.1 | 0.1 | 0.0 |
| Mg⁺⁺ | 0 | 0 | 0 | 0.0 |
| Cl⁻ | 1,735 | 1,352 | 383 | 11 |
| SO₄⁻ | 0 | 0 | 0 | 0.0 |
| OH⁻ | — | 0 | 0 | 0.0 |
| B₄O₇⁻ | 92 | 85 | 7 | 0.04 |
| | | | 629 | g |
| Non-evaporated cryst. w | | | 0 | |
| | | | 629 | g |

| | | |
|---|---|---|
| STD (V.2) | 2,342 g | |
| STD (VI) | 1,712 g | |
| SP (VI) | 629 g | |
| Non-evaporated crystal w | 0 g | |
| | 629 g | |

Deviation 0.0007

Total precipitated=636 g

Calculation of the Moisturizing Solution Volume (Vsm (VII)):

| | | | |
|---|---|---|---|
| Vsm (VII)= | 0.29 dm³ | 82 moles | NaCl |
| SM mass | 0.4 kg | | |
| Insoluble mass in SP (VII) | 0.01 kg | | |

| | |
|---|---|
| Precipitated mass t. Dry + SM | 1.004 kg |
| Evaporated crystal w | 0 kg |
| Total wet mass | 1.004 kg |
| Harvested crystal mass | 0.960 kg |

Deviation −0.022

Harvested crystals are washed with 40 cm 3 of fresh water. This water mass is approximately equal to half of the harvested crystal mass. Wash water is concentrated until the same lithium concentration that has FL (VII) is reached.

Effective volume delivered by Stage VII: 3.05 dm³

Calculation of Operating Variables

The calculation of the operating variables for an annual production of 10,000 tons of equivalent lithium carbonate was carried out using brine from the Pozuelos Salt flat, when the cooling process included at stage II is carried out with a mechanical cooling crystallization equipment and pre-concentrated brine and with more than 35 g/dm³ is transported to a site with an industrial infrastructure Stage I: Initial Pre-Concentration Ponds First Unharvested Period:

| | Substage I.1 | Substage I.1' | Substage I.1" | Substage I.2 |
|---|---|---|---|---|
| Incoming volume (m³/year) | 8,203,802 | 2,875,038 | 1,370,272 | 688,984 |
| Lithium concentration in the incoming brine (kg/m³) | 0.378 | 0.9 | 1.679 | 3.0 |
| Outcoming volume (m³/year) | 2,875,038 | 1,370,272 | 688,984 | 222,303 |
| Lithium concentration in the outcoming brine (kg/m³) | 0.9 | 1.679 | 3.0 | 7.366 |
| SP (t/year) | 1,435,492 | 435,694 | 198,236 | 146,624 |
| Pumping water (m³/year) | 41,000 (brackish) | 28,750 (brackish) | 13,703 (brackish) | 6,900 (brackish) |
| Default SL height (cm) | 12 | 12 | 12 | 12 |
| precipitated salt h every two years (cm) | 108 | 100 | 89 | 87 |
| Pond area (m²) | 2,870,000 | 960,000 | 504,000 | 365,000 |
| Charging time (days) | 40 | 28 | 29 | 65 |

Stage I: Initial Ore-Concentration Ponds

Next Unharvested Periods:

| | Substage I.1 | Substage I.1' | Substage I.1" | Substage I.2 |
|---|---|---|---|---|
| Incoming volume (m³/year) | 8,203,802 | 3,338,337 | 1,752,098 | 961,839 |
| Lithium concentration in the incoming brine (kg/m³) | 0.378 | 0.9 | 1.679 | 3.0 |
| Outcoming volume (m³/year) | 3,338,337 | 1,752,098 | 961,839 | 376,439 |
| Lithium concentration in the outcoming brine (kg/m³) | 0.9 | 1.679 | 3.0 | 7.366 |
| SP (t/year) | 1,435,492 | 505,904 | 253,475 | 204,691 |
| Pumping water (m³/year) | 41,000 (brackish) | 33,383 (brackish) | 17,521 (brackish) | 9,620 (brackish) |
| Wash water (m³/year) | 144,505 | 50,703 | 25,395 | 61,723 |
| Default SL height (cm) | 12 | 12 | 12 | 12 |
| precipitated salt h every two years (cm) | 108 | 100 | 89 | 91 |
| Pond area (m²) | 2,870,000 | 1,110,000 | 643,000 | 510,000 |
| Charging time (days) | 40 | 28 | 29 | 65 |

Brackish water: water with a density less than 1,100 g/dm³

Auxiliary pond for stage I: 620,000 m²

Stage II: Cooling

This stage is performed in a mechanical cooling crystallization equipment and is detailed for the highest brine flow, i.e. the one corresponding to the post-harvest period for the pond system operation.

Brine to be Cooled
  Flow: 47 m³/h
  Density: 1.258 kg/dm³
  Average temperature: 16° C.
  Total dissolved solid content: 0.368 kg/dm³
Chemical composition of the liquid phase entering into the cooling equipment:

| | DETERMINATION | | | | | |
|---|---|---|---|---|---|---|
| | $Li^+$ | $Ca^{++}$ | $Mg^{++}$ | $B_4O_7^-$ | $Na^+$ | $K^+$ |
| | UNIT | | | | | |
| | mg/dm³ | mg/dm³ | mg/dm³ | mg/dm³ | mg/dm³ | mg/dm³ |
| TECHNIQUE | ICP-OES | ICP-OES | ICP-OES | ICP-OES | ICP-OES | ICP-OES |
| Comp. FL | 7,366 | 148 | 61,167 | 25,698 | 16,391 | 28,257 |

| | DETERMINATION | | | | | |
|---|---|---|---|---|---|---|
| | $Ba^{++}$ | $Sr^{++}$ | $Fe^{+++}$ | $Cl^-$ | $SO_4^-$ | $CO_3^-$ |
| | UNIT | | | | | |
| | mg/dm³ | mg/dm³ | mg/dm³ | mg/dm³ | mg/dm³ | mg/dm³ |
| TECHNIQUE | ICP-OES | ICP-OES | ICP-OES | ICP-OES | Argentometry | Colorimetric |
| Comp. FL (2) | — | 34 | 3 | 226,753 | 42,896 | N.D. |

| | DETERMINATION | | |
|---|---|---|---|
| | $HCO_3^-$ | pH | Density |
| | UNIT | | |
| | mg/dm³ | UpH | kg/dm³ |
| TECHNIQUE Comp. FL (2) | Volumetry ND | Potentiometry 4.88 | Pycnometry 1.283 |

Specific heat: 0.85 kcal/kg ° C.
Salts that crystallize during cooling:
  Carnalite ($MgCl_2 \cdot KCl \cdot 6H_2O$): 1.5 t/t CLE
  Glaserite [$K_{2.25}Na_{1.75}(SO_4)_2$]: 0.9 t/t CLE
  Cainite ($MgSO_4 \cdot KCl_2 \cdot 2.75H_2O$): 0.27 t/t CLE
CLE: Equivalent Lithium Carbonate The cooling is executed with a pre-cooling stage, in which the cooled liquid phase with low sulfate anion content, which comes out of the cooling equipment at −7° C., interacts in a heat exchanger, with brine to be cooled that has an initial temperature of 16° C. As a result of this pre-cooling, brine to be cooled enters into the crystallization equipment by cooling at 0° C.

Under these conditions, it is easy to demonstrate that, for a performance coefficient of 60% of the ideal performance coefficient (Carnot), the mechanical energy required per ton of lithium carbonate produced is less than 0.09 Mwh.
  Liquid phase obtained after cooling
  Flow: 45 m³/h
  Density: 1.258 kg/dm³
  Average temperature: 11° C.
  Total dissolved solid content: 0.368 kg/dm³
  Chemical composition of the liquid phase coming out of the cooling equipment:

| | DETERMINATION | | | | | |
|---|---|---|---|---|---|---|
| | $Li^+$ | $Ca^{++}$ | $Mg^{++}$ | $B_4O_7^-$ | $Na^+$ | $K^+$ |
| | UNIT | | | | | |
| | mg/dm³ | mg/dm³ | mg/dm³ | mg/dm³ | mg/dm³ | mg/dm³ |
| TECHNIQUE | ICP-OES | ICP-OES | ICP-OES | ICP-OES | ICP-OES | ICP-OES |
| Comp. FL | 7,745 | 131 | 60,358 | 23,416 | 13,268 | 15,986 |

| | DETERMINATION | | | | | |
|---|---|---|---|---|---|---|
| | $Ba^{++}$ | $Sr^{++}$ | $Fe^{+++}$ | $Cl^-$ | $SO_4^-$ | $CO_3^-$ |
| | UNIT | | | | | |
| | mg/dm³ | mg/dm³ | mg/dm³ | mg/dm³ | mg/dm³ | mg/dm³ |
| TECHNIQUE | ICP-OES | ICP-OES | ICP-OES | ICP-OES | Argentometry | Colorimetric |
| Comp. FL (2) | — | 5 | 3.74 | 218,160 | 29,150 | N.D. |

| | DETERMINATION | | |
|---|---|---|---|
| | $HCO_3^-$ | pH | Density |
| | UNIT | | |
| | mg/dm³ | UpH | kg/dm³ |
| TECHNIQUE Comp. FL (2) | Volumetry N/D | Potentiometry 5.00 | Pycnometry 1.258 |

Fresh water for crystal wash: 4,000 m³
Stage III: Pre-Treatment
Quantity of Reagents and Water Used Per Ton of Equivalent Lithium Carbonate
  Calcium chloride dihydrate: 1.47 t
  Fresh water: 1.57 m³
Liquid Phase after Pre-Treatment:
  Volume (next unharvested periods): 365,901 m³
  Lithium concentration: 7.186 g/dm³
  Density: 1,258 g/dm³
  Total dissolved solids: 380 g/dm³
Quantity of Solid Effluents Generated in Pre-Treatment Per Ton of Equivalent Lithium Carbonate: 1.49 t
Approximate Quantity of Products to be Obtained by Processing the Solid Effluent (Per Ton of Equivalent Lithium Carbonate:
  Agricultural gypsum: 1.2 t
Stage IV: Final Pre-Concentration Ponds
First Unharvested Period:

| | Substages IV.1 | Substage IV.2 | Substage IV.3 |
|---|---|---|---|
| Incoming volume (m³/year) | 216,080 | 74,399 | 74,900 |
| Lithium concentration in the incoming brine (kg/m³) | 7.186 | 16.856 | 16.430 |
| Outcoming volume (m³/year) | 74,399 | 57,363 | 28,340 |
| Lithium concentration in the outcoming brine (kg/m³) | 16.856 | 21.453 | 35.964 |

|  | Substages IV.1 | Substage IV.2 | Substage IV.3 |
|---|---|---|---|
| SP (t/year) | 43,421 | 2,311 | 12,100 |
| Pumping water (m³/year) | 2,161 | 744 | 574 |
| Default SL height (cm) | 12 | 12 | 12 |
| precipitated salt h (cm every 2 years) | 77 | 40 | 57 |
| Pond area (m²) | 135,000 | 22,000 | 63,000 |
| Charging time (days) | 72 | 15 | 88 |

Stage IV: Final Pre-Concentration Ponds
Next Unharvested Periods:

|  | Substages IV.1 | Substage IV.2 | Substage IV.3 |
|---|---|---|---|
| Incoming volume (m³/year) | 365,901 | 150,399 | 153,772 |
| Lithium concentration in the incoming brine (kg/m³) | 7.186 | 16.856 | 16.430 |
| Outcoming volume (m³/year) | 150,399 | 117,768 | 68,056 |
| Lithium concentration in the outcoming brine (kg/m³) | 16.856 | 21.453 | 35.364 |
| SP (t/year) | 73,527 | 4,673 | 24,842 |
| Pumping water (m³/year) | 3,659 | 1,504 | 1,178 |
| Wash water (m³/year) | 21,810 | 1,575 | 7,685 |
| Default SL height (cm) | 12 | 12 | 12 |
| precipitated salt h (cm every 2 years) | 77 | 39 | 57 |
| Pond area (m²) | 230,000 | 47,000 | 129,000 |
| Charging time (days) | 72 | 16 | 88 |

At the beginning of substage IV.3, 0.92 t of calcium chloride (KCl) is added per ton of equivalent lithium carbonate.

Brine with initial pre-concentration and with a lithium concentration equal to 35.364 g/dm³ is transported to a site with an industrial infrastructure where stages V, VI and VII are performed.

Making the same calculation as that indicated in the item detailed description of the invention when this pre-concentrated brine is transported to a site with an industrial infrastructure, in this case 0.430 t less material between the salt flat and the chosen site is transported (base transport of solids).

Stage V: Treatment
Substage V.1
Quantity of Reagents and Water Used Per Ton of Equivalent Lithium Carbonate
    Hydrated lime: 1.31 t
    Sodium sulfate (anhydrous base): 2.49 t
    Fresh water: 7.4 m³
Liquid Phase after Substage V.1:
    Volume (next unharvested periods): 132,757 m³
    Lithium concentration: 17.699 g/dm³
    Density: 1.14 g/dm³
    Total dissolved solids: 271 g/dm³
Quantity of Solid Effluents Generated at Substage V.1 Per Ton of Equivalent Lithium Carbonate: 3.95 t
Approximate Quantity of Products to be Obtained by Processing the Generated Solid Effluent (Expressed Per Ton of Equivalent Lithium Carbonate):
    Agricultural gypsum: 2.3 t
    Magnesium sulfate: 0.9 t Substage V.2
Quantity of Reagents and Water Used Per Ton of Equivalent Lithium Carbonate
    Sodium hydroxide (dry base): 0.01 t
    Sodium carbonate (dry base): 0.043 t
    Barium chloride dihydrate: 0.17 t
    Fresh water: 0.76 m³
Liquid Phase after Substage V.2:
    Volume: 142,541 m³
    Lithium concentration: 16.881 g/dm³
    Density: 1.13 g/dm³
    Total dissolved solids: 266 g/dm³
Quantity of Solid Effluents Generated at Substage V.2, Expressed Per Ton of Equivalent Lithium Carbonate: 0.2 t
Approximate Quantity of Products to be Obtained by Processing the Generated Solid Effluent (Expressed Per Ton of Equivalent Lithium Carbonate):
    Barium sulfate: 0.16 t
Stages VI and VII When transporting pre-concentrated brine to a site with a commercial infrastructure, it is convenient to execute stages VI and VII in thermally assisted evaporative crystallizers.

As the specific quantity of water to be evaporated at stages VI and VII is 8,622 kg per ton of equivalent lithium carbonate, using crystallization equipment with evaporation in multiple stages, the specific thermal energy requirement expressed in normal m³ of gas per ton of equivalent lithium carbonate is less than 280. The cost of this energy, coming from any primary source used, is fully offset by the operational advantages, the increased lithium recovery at stages VI and VII, and obtaining by-products such as 400 kg of high-purity sodium chloride per ton of equivalent lithium carbonate and 8,620 dm³ of distilled water per ton of equivalent lithium carbonate.

Specific Water and Reagent Consumption of the Procedure Calculated Per Ton of Equivalent Lithium Carbonate
    Brackish water: 10 m³
    Fresh water: 42.62 m³
    Calcium chloride: 1.47 t
    Barium chloride: 0.17 t
    Potassium chloride: 0.92 t
    Calcium hydroxide: 1.31 t
    Sodium sulfate (anhydrous base): 2.49 t (the one obtained at stage II can be used.
    Sodium hydroxide (dry base): 0.01 t
    Sodium carbonate (dry base): 0.043 t
Solid Effluent Generation at the Pre-Treatment and Treatment Stages, Calculated Per Ton of Equivalent Lithium Carbonate
    Pre-treatment stage: 1.49 t
    Treatment stage: 4.15 t
Conclusions In this example it is shown how the addition of potassium chloride at the last substage of stage IV allows reaching a higher lithium concentration in the liquid phase that delivers this stage. This not only reduces the reagent consumption at the treatment stage, but it also allows the transport of pre-concentrated brine to a site with an industrial infrastructure to perform stages V, VI and VII. In this example, transport up to a site with an industrial infrastructure, and it is showed that due to the quantity of water that is needed to evaporate at stages VI and VII it is feasible to use thermally assisted crystallization equipment with evaporation in multiple stages.

Example 3: Natural Brine from Rio Grande Salt Flat

This Salt flat is a salt deposit located in the Region of Argentine Puna at more than 3,800 msnm.

Field and Laboratory Test

Lithium content in natural brine with which ECL is performed is 0.340 g/dm³ and the volume defined to start the test is 835 dm³. On day 1 840 dm³ of natural brine is extracted by pumping from an existing well in Rio Grande Salt flat. The well has an approximate depth of 30 m and the coordinates that define its location are:

Latitude: 25° 5' 27.2"-Length: 68° 8' 23.6"

This natural Brine identified as FL(i) is transported to the experimental outdoor center located in the area of Tres Morros, Jujuy province, Argentina, and on the following day it is charged in three similar ponds of about 1.5 m² each. The average height in the ponds is approximately 0.186 m.

Natural Brine (FL(i))

| | |
|---|---|
| Mass FL (i) | 1,022 kg |
| $^1\rho$ (FL (i)) | 1.209 kg/dm³ |
| $^2$V (FL (i)) | 835 dm³ |
| $^3$STD (FL(i)) | 340 g/dm³ |

$^1\rho$ (FL (i)): density of liquid phase at stage I
$^2$V (FL (i)): volume of liquid phase at stage I
$^3$STD (FL(i)): Total dissolved solids of liquid phase at stage I FL (i) Chemistry:

| | DETERMINATION | | | | | |
|---|---|---|---|---|---|---|
| | $Li^+$ | $Ca^{++}$ | $Mg^{++}$ | $B_4O_7^-$ | $Na^+$ | $K^+$ |
| UNIT | mg/dm³ | mg/dm³ | mg/dm³ | mg/dm³ | mg/dm³ | mg/dm³ |
| TECHNIQUE | ICP-OES | ICP-OES | ICP-OES | ICP-OES | ICP-OES | ICP-OES |
| Comp. FL (i) | 382 | 245 | 4,759 | 1,393 | 115,400 | 6,856 |

| | DETERMINATION | | | | | |
|---|---|---|---|---|---|---|
| | $Ba^{++}$ | $Sr^{++}$ | $Fe^{+++}$ | $Cl^-$ | $SO_4^-$ | $CO_3^-$ |
| UNIT | mg/dm³ | mg/dm³ | mg/dm³ | mg/dm³ | mg/dm³ | mg/dm³ |
| TECHNIQUE | ICP-OES | ICP-OES | ICP-OES | Argentometry | Gravimetry | Volumetry |
| Comp. FL (i) | — | — | — | 178,910 | 32,028 | N.D. |

| | DETERMINATION | | |
|---|---|---|---|
| | $HCO_3^-$ | pH | Density |
| UNIT | mg/dm³ | UpH | kg/dm³ |
| TECHNIQUE | Volumetry | Potentiometry | Pycnometry |
| Comp. FL (i) | 469 | 7.05 | 1.209 |

| Ionic balance | Charges+ | 5652 | | |
|---|---|---|---|---|
| | Charges– | 5740 | Deviation | 0.008 |

STAGE I: Initial Pre-Concentration

Substage I.1

Brine FL(i) is exposed to the solar evaporation process during 43 days. On day 44, crystals of the Liquid Phase are separated, and the following is obtained.

Liquid Phase FL (I.1):

| | |
|---|---|
| Mass FL (I.1) | 421 kg |
| ρ (FL (I.1)) | 1.263 kg/dm³ |
| V (FL (I.1)) | 334 dm³ |
| STD (FL(I.1)) | 384 g/dm³ |

FL (I.1) Chemistry:

| DETERMINATION | $Li^+$ | $Ca^{++}$ | $Mg^{++}$ | $B_4O_7^=$ | $Na^+$ | $K^+$ |
|---|---|---|---|---|---|---|
| UNIT | mg/dm³ | mg/dm³ | mg/dm³ | mg/dm³ | mg/dm³ | mg/dm³ |
| TECHNIQUE | ICP-OES | ICP-OES | ICP-OES | ICP-OES | ICP-OES | ICP-OES |
| Comp. FL (I.1) | 956 | 159 | 11,900 | 3,744 | 106,486 | 17,498 |

| DETERMINATION | $Ba^{++}$ | $Sr^{++}$ | $Fe^{+++}$ | $Cl^-$ | $SO_4^=$ | $CO_3^=$ |
|---|---|---|---|---|---|---|
| UNIT | mg/dm³ | mg/dm³ | mg/dm³ | mg/dm³ | mg/dm³ | mg/dm³ |
| TECHNIQUE | ICP-OES | ICP-OES | ICP-OES | Argentometry | Gravimetry | Volumetry |
| Comp. FL (I.1) | — | — | 6 | 172,745 | 70,304 | N.D. |

| DETERMINATION | $HCO_3^-$ | pH | Density |
|---|---|---|---|
| UNIT | mg/dm³ | UpH | mg/dm³ |
| TECHNIQUE | Volumetry | Potentiometry | Pycnometry |
| Comp. FL (I.1) | — | 6.78 | 1.263 |

| Ionic balance | Charges+ | 6,202 | | |
|---|---|---|---|---|
| | Charges– | 6,386 | Deviation | 0.015 |

Precipitated Solids at Substage I.1 (SP (I.1))

Total mass SP (1.1)=235.15 kg

Tot. $^1$Evaporated w at 105° C.

=21%

Humidity (H)=18

[1] W: water

Chemistry of Solids SP (I.1):

| | DETERMINATION | | | | | |
|---|---|---|---|---|---|---|
| | $Li^+$ | $Ca^{++}$ | $Mg^{++}$ | B | $Na^+$ | $K^+$ |
| | | | UNIT | | | |
| | % (w/w) | % (w/w) | % (w/w) | % (w/w) | % (w/w) | % (w/w) |
| TECHNIQUE | ICP-OES | ICP-OES | ICP-OES | ICP-OES | ICP-OES | ICP-OES |
| Comp. SP (I.1) | 0.024 | 0.43 | 0.2159 | 0.027 | 37.10 | 0.314 |

| | DETERMINATION | | | |
|---|---|---|---|---|
| | $Cl^-$ | $SO_4^-$ | Humidity | Insolubles |
| | | UNIT | | |
| | % (w/w) | % (w/w) | % (w/w) | % (w/w) |
| TECHNIQUE | Argentometry | Gravimetry | Gravimetry | Gravimetry |
| Comp. SP (I.1) | 53.09 | 1.087 | 18.00 | 1.2 |

Theoretical Calculation of the Precipitated Solid Mass SP (I.1):

| | Mass in FL (i) | Mass in FL (I.1) | Precipitated mass | Precipitated moles |
|---|---|---|---|---|
| | | Unit | | |
| | g | g | g | moles |
| $Na^+$ | 96359 | 35,529 | 60,830 | 2,645 |
| $K^+$ | 5,725 | 5,838 | −113 | −3 |
| $Ca^{++}$ | 205 | 53 | 152 | 3.8 |
| $Mg^{++}$ | 3,974 | 3,970 | 3 | 0.1 |
| $Cl^-$ | 149,390 | 57,636 | 91,753 | 2,585 |
| $SO_4^-$ | 26,743 | 23,457 | 3,286 | 34.2 |
| $HCO_3^-$ | 392 | — | — | — |
| $B_4O_7^-$ | 1,163 | 1,249 | — | — |
| | | | 155,911 | g |
| Cryst. w | | | 847 | g |
| NE | | | | |
| | | | 156,758 | g |

| STD (i) | 284269 g |
|---|---|
| STD (I.1) | 128054 g |
| SP (I.1) | 156215 g |

Deviation 0.0010

Total precipitated 159502 g

Calculation of the Moisturizing Solution Volume (Vsm (I.1)):

| Vsm (I.1)= | 55.1 $dm^3$ |
|---|---|
| SM mass | 65.8 kg |
| Insoluble mass in SP (I.1) | 1.9 kg |
| Evaporated cryst. w precipitated | 4.76 kg |
| Theoretical precipitated mass | 230.082 kg |
| Harvested crystal mass | 235.150 kg |

Deviation 0.011

| Precipitated salts: | | Crystallization w |
|---|---|---|
| 2585 moles | NaCl | |
| 3.8 moles | $CaSO_4 \cdot 2H_2O$ | 137 g |
| 30.4 moles | $Na_2SO_4 \cdot 10H_2O$ | 5,472 g |
| Total crystallization water | | 5,607 g |

Harvested crystals are washed with 120 kg of fresh water. This water mass is approximately equal to half of harvested crystal mass. Wash water is concentrated until the same lithium concentration that has FL (I.1) is reached. Effective volume delivered by substage I.1:

V (FL I.1)=328 $dm^3$

Substage I.2

Brine FL (I.1) is charged into a pond and exposed to continue the solar evaporation process until day 58. That day the solids of the liquid phase are separated, and the following is obtained.

Liquid Phase FL (I.2):

| Mass FL (I.2) | 182 kg |
|---|---|
| ρ (FL (I.2)) | 1.294 kg/$dm^3$ |
| V (FL (I.2)) | 141 $dm^3$ |
| STD (FL(I.2)) | 451 g/$dm^3$ |

FL (I.2) Chemistry:

| | DETERMINATION | | | | | |
|---|---|---|---|---|---|---|
| | $Li^+$ | $Ca^{++}$ | $Mg^{++}$ | $B_4O_7^-$ | $Na^+$ | $K^+$ |
| | | | UNIT | | | |
| | mg/$dm^3$ | mg/$dm^3$ | mg/$dm^3$ | mg/$dm^3$ | mg/$dm^3$ | mg/$dm^3$ |
| | | | TECHNIQUE | | | |
| | ICP-OES | ICP-OES | ICP-OES | ICP-OES | ICP-OES | ICP-OES |
| Comp. FL (I.2) | 2,228 | 104 | 27,004 | 8,530 | 86,875 | 35,128 |

| DETERMINATION | | | | | |
|---|---|---|---|---|---|
| $Ba^{++}$ | $Sr^{++}$ | $Fe^{+++}$ | $Cl^-$ | $SO_4^=$ | $CO_3^=$ |
| UNIT | | | | | |
| $mg/dm^3$ | $mg/dm^3$ | $mg/dm^3$ | $mg/dm^3$ | $mg/dm^3$ | $mg/dm^3$ |
| TECHNIQUE | | | | | |
| ICP-OES | ICP-OES | ICP-OES | Argentometry | Gravimetry | Volumetry |
| Comp. FL (I.2) — | — | — | 161,753 | 128,886 | N.D. |

| DETERMINATION | | |
|---|---|---|
| $HCO_3^-$ | pH | Density |
| UNIT | | |
| $mg/dm^3$ | UpH | $kg/dm^3$ |
| TECHNIQUE Volumetry | Potentiometry | Pycnometry |
| Comp. FL (I.2) ND | 6.30 | 1.294 |

| Ionic balance | Charges+ | 7,224 |
|---|---|---|
|  | Charges− | 7,358 |

Deviation=0.0092
Precipitated Solids at Substage I.2 (SP (I.2))
Total mass SP (I.2)=68.2 kg; H=3.27%
Chemistry of Solids SP (I.2):

| DETERMINATION | | | | | |
|---|---|---|---|---|---|
| $Li^+$ | $Ca^{++}$ | $Mg^{++}$ | B | $Na^+$ | $K^+$ |
| UNIT | | | | | |
| % (w/w) | % (w/w) | % (w/w) | % (w/w) | % (w/w) | % (w/w) |
| TECHNIQUE | | | | | |
| ICP-OES | ICP-OES | ICP-OES | ICP-OES | ICP-OES | ICP-OES |
| Comp. SP (I.2) 0.070 | 0.10 | 0.2500 | 0.009 | 35.09 | 5.42 |

| DETERMINATION | | | |
|---|---|---|---|
| $Cl^-$ | $SO_4^=$ | Humidity | Insolubles |
| UNIT | | | |
| % (w/w) | % (w/w) | % (w/w) | % (w/w) |
| TECHNIQUE Argentometry | Gravimetry | Gravimetry | Gravimetry |
| Comp. SP (I.2) 53.74 | 8.14 | 3.27 | 1.2 |

Theoretical Calculation of the Precipitated Solid Mass SP(I.2):

| | Mass in FL (I.1) | Mass in FL (I.2) | Precipitated mass | Precipitated moles |
|---|---|---|---|---|
| Unit | g | g | g | moles |
| $Na^+$ | 35,529 | 12,227 | 23,302 | 1,013 |
| $K^+$ | 5,838 | 4,944 | 894 | 23 |
| $Ca^{++}$ | 53 | 15 | 38 | 1.0 |
| $Mg^{++}$ | 3,903 | 3,801 | 103 | 4.2 |
| $Cl^-$ | 57,636 | 22,765 | 34,871 | 982 |
| $SO_4^=$ | 23,457 | 18,139 | 5,318 | 55.4 |
| $HCO_3^-$ | — | — | — | — |
| $B_4O_7^=$ | 1,249 | 1,201 | 49 | 0.31 |
| | | | 64,575 | |
| $^1$Cryst. W | | | 243 | |
| | | | 64,818 | |

$^1$Cryst. w = crystallization water

| STD (I.1) | 125,886 g |
|---|---|
| STD (I.2) | 63,404 g |
| SP (I.2) | 62,481 g |

Deviation −0.0165
Total precipitated 65,577 g
Calculation of the Moisturizing Solution Volume (Vsm (I.2)):

| Vsm (I.2)= | $3.2 \, dm^3$ |
|---|---|
| Moisturizing solution mass | 4.1 kg |
| Insoluble mass in SP (I.2) | 0.8 kg |

| Precipitated salts: | | $^1$Cryst. w [g] |
|---|---|---|
| $MgSO_4 \cdot KCl \cdot 2.75H_2O$ | 4.2 moles | 207.9 |
| $CaSO_4 \cdot 2H_2O$ | 1 mole | 36 |
| $Na_2SO_4$: | 33 moles | |

-continued

| Precipitated salts: | ¹Cryst. w [g] |
|---|---|
| NaCl | 959 moles |
| $K_{2.25}Na_{1.75}(SO_4)$ | 28.4 moles |
| Total cryst. w | 243.9 |

| | |
|---|---|
| Theoretical precipitated mass | 69.727 kg |
| Harvested crystal mass | 68.200 kg |

Deviation 0.011

Harvested crystals are washed with 35 kg of fresh water. This water mass is approximately equal to half of harvested crystal mass.

Wash water is concentrated until the same lithium concentration that has FL (I.2) is reached.

Effective volume delivered by substage 1.2=139.9 $dm^3$

STAGE II: Cooling

On day 68 FL (I.2) is transported to a laboratory where it is cooled at minus seven degrees Celsius (−7° C.) in a freezer for a period of 5 days, and the following is obtained.

Liquid Phase FL(II):

| | |
|---|---|
| Mass FL (II) | 130 kg |
| ρ (FL (II)) | 1.258 $kg/dm^3$ |
| V (FL (II)) | 103 $dm^3$ |
| STD (FL(II)) | 344 $g/dm^3$ |

FL (II) Chemistry:

| | DETERMINATION | | | | | |
|---|---|---|---|---|---|---|
| | $Li^+$ | $Ca^{++}$ | $Mg^{++}$ | $B_4O_7^-$ | $Na^+$ | $K^+$ |
| | | | UNIT | | | |
| | $mg/dm^3$ | $mg/dm^3$ | $mg/dm^3$ | $mg/dm^3$ | $mg/dm^3$ | $mg/dm^3$ |
| | | | TECHNIQUE | | | |
| | ICP-OES | ICP-OES | ICP-OES | ICP-OES | ICP-OES | ICP-OES |
| Comp. FL (II) | 3,023 | 121 | 35,716 | 10,077 | 48,336 | 24,147 |

| | DETERMINATION | | | | | |
|---|---|---|---|---|---|---|
| | $Ba^{++}$ | $Sr^{++}$ | $Fe^{+++}$ | Cl− | $SO_4^-$ | $CO_3^-$ |
| | | | UNIT | | | |
| | $mg/dm^3$ | $mg/dm^3$ | $mg/dm^3$ | $mg/dm^3$ | $mg/dm^3$ | $mg/dm^3$ |
| | | | TECHNIQUE | | | |
| | ICP-OES | ICP-OES | ICP-OES | Argentometry | Gravimetry | Volumetry |
| Comp. FL (II) | — | — | — | 194,302 | 27,957 | N.D. |

| | DETERMINATION | | |
|---|---|---|---|
| | $HCO_3^-$ | pH | Density |
| | | UNIT | |
| | $mg/dm^3$ | UpH | $kg/dm^3$ |
| TECHNIQUE | Volumetry | Potentiometry | Pycnometry |
| Comp. FL (II) | N/D | 7.00 | 1.258 |

| | | | | |
|---|---|---|---|---|
| Ionic balance | Charges+ | 6,100 | | |
| | Charges− | 6,193 | Deviation | 0.008 |

Precipitated Solids at Stage II (SP (II)):

| | |
|---|---|
| Total mass SP (II)= | 58.71 kg |
| Total evaporated w at 105° C. | 57.82% |
| H is assumed= | 6% |

Chemistry of Solids SP (II):

| | | | DETERMINATION | | | |
|---|---|---|---|---|---|---|
| | $Li^+$ | $Ca^{++}$ | $Mg^{++}$ | B | $Na^+$ | $K^+$ |
| | | | UNIT | | | |
| | % (w/w) | % (w/w) | % (w/w) | % (w/w) | % (w/w) | % (w/w) |
| | | | TECHNIQUE | | | |
| | ICP-OES | ICP-OES | ICP-OES | ICP-OES | ICP-OES | ICP-OES |
| Comp. SP (II) | 0.033 | 0.088 | 0.424 | 0.024 | 25.43 | 5.19 |

| | DETERMINATION | | | |
|---|---|---|---|---|
| | $Cl^-$ | $SO_4^-$ | Humidity | Insolubles |
| | | UNIT | | |
| | % (w/w) | % (w/W) | % (w/w) | % (w/w) |
| TECHNIQUE | Argentometry | Gravimetry | Gravimetry | Gravimetry |
| Comp. SP (II) | 10.61 | 51.37 | 6.00 | 1.1 |

Theoretical Calculation of the Precipitated Solid Mass SP (II):

| | Mass in FL (I.2) | Mass in FL (II) | Precipitated mass | Precipitated moles |
|---|---|---|---|---|
| | | | Unit | |
| | g | g | g | moles g |
| $Na^+$ | 12,154 | 4,984 | 7,170 | 312 |
| $K^+$ | 4,914 | 2,490 | 2,425 | 62 |
| $Ca^{++}$ | 15 | 12 | 2 | 0.1 |
| $Mg^{++}$ | 3,778 | 3,683 | 95 | 3.9 |
| $Cl^-$ | 22,629 | 20,034 | 2,595 | 73 |
| $SO_4^-$ | 18,031 | 2,883 | 15,149 | 157.8 |
| $HCO_3^-$ | — | — | — | — |
| $B_4O_7^-$ | 1,193 | 1,039 | 154 | 1.0 |
| Cryst. W NE | | | 9,487 | |
| | | | 37,077 | |

| | | |
|---|---|---|
| STD (I.2) | 63,026 g | |
| STD (II) | 35,436 g | |
| SP (II) | 27,590 g | |
| ¹Cryst. w NE | 9,487 g | |
| | 37,077 g | |

¹Cryst. w NE = non-evaporated crystallization water

Deviation 0.0000

Total precipitated 37,384 g

¹Cryst. w NE: non-evaporated crystallization water

Calculation of the Moisturizing Solution Volume (Vsm (II)):

| | | |
|---|---|---|
| Vsm (II) = | 3.0 | $dm^3$ |
| Moisturizing solution mass | 3.8 | kg |
| Insoluble mass in SP (II) | 0.31 | kg |

| Precipitated salts: | | (g) |
|---|---|---|
| $Na_2SO_4 \cdot 10H_2O$ | 156 moles | 28,080 |
| $MgCl_2 \cdot KCl \cdot 6H_2O$ | 3.9 moles | 421 |
| KCl | 58 moles | 0 |
| Tot. Crystallization w | | 28,501 |

| | | |
|---|---|---|
| Theoretical precipitated mass | 41.145 | kg |
| Total mass | 60.159 | kg |
| Harvested crystal mass | 58.710 | kg |

Deviation 0.012

Harvested crystals are washed with 25 kg of fresh water. This water mass is approximately equal to half of the harvested crystal mass.

Wash water is concentrated until the same lithium concentration that has FL (II) is reached Effective Volume delivered by Stage II=96.82 $dm^3$ STAGE III: Pre-Treatment 4.144 kg of $CaCl_2 \cdot 2H_2O$ suspended at 4.425 $dm^3$ of fresh water is added to total of FL (II). It is stirred for an hour and phases are separated, and the following is obtained:

Liquid Phase FL(III):

| | | |
|---|---|---|
| Mass FL (III) | 53 | kg |
| ρ (FL (III)) | 1.215 | $kg/dm^3$ |
| V (FL (III)) | 102 | $dm^3$ |
| STD (FL(III)) | 286 | $g/dm^3$ |

FL (III) Chemistry:

| | DETERMINATION | | | | | |
|---|---|---|---|---|---|---|
| | $Li^+$ | $Ca^{++}$ | $Mg^{++}$ | $B_4O_7^-$ | $Na^+$ | $K^+$ |
| UNIT | $mg/dm^3$ | $mg/dm^3$ | $mg/dm^3$ | $mg/dm^3$ | $mg/dm^3$ | $mg/dm^3$ |
| TECHNIQUE | ICP-OES | ICP-OES | ICP-OES | ICP-OES | ICP-OES | ICP-OES |
| Comp. FL (III) | 2,860 | 1,476 | 34,524 | 11,462 | 46,575 | 2,450 |

| | DETERMINATION | | | | | |
|---|---|---|---|---|---|---|
| | $Ba^{++}$ | $Sr^{++}$ | $Fe^{+++}$ | $Cl^-$ | $SO_4^=$ | $CO_3^-$ |
| UNIT | $mg/dm^3$ | $mg/dm^3$ | $mg/dm^3$ | $mg/dm^3$ | $mg/dm^3$ | $mg/dm^3$ |
| TECHNIQUE | ICP-OES | ICP-OES | ICP-OES | Argentometry | Gravimetry | Volumetry |
| Comp. FL (III) | — | — | — | 182,205 | 4,784 | N.D. |

| DETERMINATION | $HCO_3^-$ | pH | Density |
|---|---|---|---|
| UNIT | $mg/dm^3$ | UpH | $kg/dm^3$ |
| TECHNIQUE | Volumetry | Potentiometry | Pycnometry |
| Comp. FL (III) | N/D | 5.03 | 1.245 |

| Ionic balance | Charges+ | 5,414 |
|---|---|---|
| | Charges− | 5,387 |

Deviation=−0.003

Precipitated Solids at Stage III (SP (III)):

| Total mass SP (III) = | 9.240 | kg |
|---|---|---|
| Total evaporated w at 105° C. | 37.47 | % |
| H is assumed = | 11 | % |

Chemistry of Solids SP (III):

| | DETERMINATION | | | | | |
|---|---|---|---|---|---|---|
| | $Li^+$ | $Ca^{++}$ | $Mg^{++}$ | B | $Na^+$ | $K^+$ |
| UNIT | % (w/w) | % (w/w) | % (w/w) | % (w/w) | % (w/w) | % (w/w) |
| TECHNIQUE | ICP-OES | ICP-OES | ICP-OES | ICP-OES | ICP-OES | ICP-OES |
| Comp. SP (III) | 0.173 | 24.732 | 2.025 | 0.012 | 2.95 | 1.37 |

| DETERMINATION | $Cl^-$ | $SO_4^=$ | Humidity | Insolubles |
|---|---|---|---|---|
| UNIT | % (w/w) | % (w/w) | % (w/w) | % (w/w) |
| TECHNIQUE | Argentometry | Gravimetry | Gravimetry | Gravimetry |
| Comp. SP (III) | 10.52 | 65.76 | 11.00 | 1.1 |

Theoretical Calculation of the Precipitated Solid Mass SP (III):

| Unit | Mass in FL (II) plus addition g | Mass in FL (III) g | Precipitated mass g | Precipitated moles moles g |
|---|---|---|---|---|
| $Na^+$ | 4,680 | 4,751 | — | — |
| $K^+$ | 2,338 | 250 | 2,088 | 53 |
| $Ca^{++}$ | 1,142 | 151 | 991 | 24.7 |
| $Mg^{++}$ | 3,458 | 3,521 | — | — |
| $Cl^-$ | 20,812 | 18,585 | 2,227 | 63 |
| $SO_4^=$ | 2,707 | 488 | 2,219 | 23.1 |
| $HCO_3^-$ | — | — | — | — |
| Dry precipitated solid | | | 7,525 | |
| Non-evaporated crystallization water | | | | 45 |

-continued

| Unit | Mass in FL (II) plus addition g | Mass in FL (III) g | Precipitated mass g | Precipitated moles moles g |
|---|---|---|---|---|
| Subtotal precipitated | | | 7,570 | |

This does not include:
Moisturizing solution
Insolubles

| Precipitated salts: | | Cryst. w |
|---|---|---|
| Precipitated salts: | | (g) |
| CaSO$_4$•2H$_2$O: | 25 moles | 900 |
| KCl: | 53 moles | |

Total precipitated: 7,655 g
This does not include: Moisturizing solution.
Calculation of the Moisturizing Solution Volume (Vsm (III)):

| Vsm (III) = | 1.1 | dm$^3$ |
|---|---|---|
| SM mass | 1.4 | kg |
| Insoluble mass in SP (III) | 0.08 | kg |

| Theoretical precipitated mass | 9.904 | kg |
|---|---|---|
| Harvested crystal mass | 9.240 | kg |

Deviation=0.035

Harvested crystals are washed with 4.5 kg of fresh water. This water mass is approximately equal to half of the harvested crystal mass.

Wash water is concentrated until the same lithium concentration that has FL (III) is reached.

Effective volume delivered by stage III (L)=100 dm$^3$

STAGE IV: Final Pre-Concentration

On day 79 FL (III) is transported to the experimental outdoor center located in the area of Tres Morros, Jujuy province, Argentina, and is exposed to solar evaporation. The concentration process is continued by solar evaporation, and on day 98 phases are separated by obtaining:

Liquid Phase FL (IV.1):

| Mass FL (IV.1) | 38.36 | kg |
|---|---|---|
| ρ (FL (IV.1)) | 1.29 | kg/dm$^3$ |
| V (FL (IV.1)) | 29.7 | dm$^3$ |
| STD (FL(IV.1)) | 425 | g/dm$^3$ |

FL (IV.11 Chemistry:

| | Li$^+$ | Ca$^{++}$ | Mg$^{++}$ | B$_4$O$_7^-$ | Na$^+$ | K$^+$ |
|---|---|---|---|---|---|---|
| | | | | DETERMINATION | | |
| | | | | UNIT | | |
| | mg/dm$^3$ | mg/dm$^3$ | mg/dm$^3$ | mg/dm$^3$ | mg/dm$^3$ | mg/dm$^3$ |
| | | | | TECHNIQUE | | |
| | ICP-OES | ICP-OES | ICP-OES | ICP-OES | ICP-OES | ICP-OES |
| Comp. FL (IV.1) | 9,618 | 303 | 80,516 | 37,268 | 5,285 | 6,669 |

| | Ba$^{++}$ | Sr$^{++}$ | Fe$^{+++}$ | Cl– | SO$_4^-$ | CO$_3^-$ |
|---|---|---|---|---|---|---|
| | | | | DETERMINATION | | |
| | | | | UNIT | | |
| | mg/dm$^3$ | mg/dm$^3$ | mg/dm$^3$ | mg/dm$^3$ | mg/dm$^3$ | mg/dm$^3$ |
| | | | | TECHNIQUE | | |
| | ICP-OES | ICP-OES | ICP-OES | Argentometry | Gravimetry | Volumetry |
| Comp. FL (IV.1) | — | — | — | 280,600 | 4,445 | N.D. |

| DETERMINATION | HCO$_3^{--}$ | pH | Density |
|---|---|---|---|
| UNIT | mg/dm$^3$ | UpH | kg/dm$^3$ |
| TECHNIQUE | Volumetry | Potentiometry | Pycnometry |
| Comp. FL (IV.1) | N/D | 6.20 | 1.290 |

| Ionic balance | Charges+ | 8,427 |
| --- | --- | --- |
|  | Charges− | 8,488 |

Deviation=−0.004

Precipitated Solids at Stage IV.1 (SP (IV.1):

| Total mass SP (IV.1)= | 26.29 | kg |
| --- | --- | --- |
| Total evaporated w at 105° C. | 37.47 | % |
| H is assumed= | 12 | % |

Chemistry of Solids SP (IV.1):

| DETERMINATION | | | | | |
| --- | --- | --- | --- | --- | --- |
| $Li^+$ | $Ca^{++}$ | $Mg^{++}$ | B | $Na^+$ | $K^+$ |
| UNIT | | | | | |
| % (w/w) | % (w/w) | % (w/w) | % (w/w) | % (w/w) | % (w/w) |
| TECHNIQUE | | | | | |
| ICP-OES | ICP-OES | ICP-OES | ICP-OES | ICP-OES | ICP-OES |
| Comp. SP (IV.1) 0.045 | 0.749 | 5.314 | 0.038 | 22.14 | 8.66 |

| DETERMINATION | $Cl^-$ | $SO_4^=$ | Humidity | Insolubles |
| --- | --- | --- | --- | --- |
| UNIT | % (w/w) | % (w/w) | % (w/w) | % (w/w) |
| TECHNIQUE | Argentometry | Gravimetry | Gravimetry | Gravimetry |
| Comp. SP (IV.1) |  | 14.45 | 12.0 | 0.5 |

Theoretical Calculation of the Precipitated Solid Mass SP (IV.1):

| Unit | Mass in FL (III) g | Mass in FL (IV.1) g | Precipitated mass g | Precipitated moles moles g |
| --- | --- | --- | --- | --- |
| $Li^+$ | 286 | 286 | 0 | 0.0 |
| $Na^+$ | 4,658 | 157 | 4,500 | 196 |
| $K^+$ | 245 | 198 | 47 | 1 |
| $Ca^{++}$ | 148 | 9 | 139 | 3.5 |
| $Mg^{++}$ | 3,452 | 2,394 | 1,058 | 43.5 |
| $Cl^-$ | 18,221 | 8,344 | 9,877 | 279 |
| $SO_4^=$ | 478 | 132 | 346 | 3.6 |
| $HCO_3^-$ | — | — | — | — |
| $B_4O_7^=$ | 1,146 | 1,108 | 38 | 0.2 |
| Cryst. w NE |  |  | 1,165 |  |
|  |  |  | 17,170 |  |

| STD (III) | 28,634 | g |
| --- | --- | --- |
| STD (IV.2) | 12,629 | g |
| SP (IV.2) | 16,005 | g |
| Cryst. w NE | 1,165 | g |
|  | 17,170 | g |

Deviation=−0.0000

Total precipitated 17250 g

Calculation of the Moisturizing Solution Volume (Vsm (IV.2)):

| Vsm (IV.2)= | 3.5 | $dm^3$ |
| --- | --- | --- |
| Moisturizing solution mass | 4.5 | kg |
| Insoluble mass in SP (IV.2) | 0.08 | kg |

| Precipitated salts: |  | (g) |
| --- | --- | --- |
| $MgCl_2 \cdot 6H_2O$ | 43.5 moles | 4,698 |
| $CaSO_4 \cdot 2H_2O$ | 3.6 moles | 130 |
| NaCL | 190 moles |  |
| Crystallization water |  | 4,828 |

| Precipitated mass plus moisturizing solution | 21.797 | kg |
| --- | --- | --- |
| [1]Evaporated cryst. w | 3.663 | kg |
| Total wet mass | 25.460 | kg |
| Harvested crystal mass | 26.290 | kg |

[1]E cryst w: evaporated crystallization water

Deviation −0.016

Harvested crystals are washed with 14 kg of fresh water. This water mass is approximately equal to half of the harvested crystal mass.

Wash water is concentrated until the same lithium concentration that has FL (IV.1) is reached:

Effective volume delivered by stage IV.1=28.1 $dm^3$

Substage IV.2

On day 99 FL (IVA) is transported to the experimental outdoor center located in the area of Tres Morros, Jujuy province, Argentina, and is exposed to solar evaporation. The concentration process is continued by solar evaporation, and on day 127 phases are separated by obtaining the following.

Liquid Phase FL (IV.2):

| Mass FL (IV.2) | 27.32 | kg |
| --- | --- | --- |
| ρ (FL (IV.2)) | 1.303 | $kg/dm^3$ |
| V (FL (IV.2)) | 21.0 | $dm^3$ |
| STD (FL(IV.2)) | 468 | $g/dm^3$ |

FL (IV.2) Chemistry:

| | DETERMINATION | | | | | |
|---|---|---|---|---|---|---|
| | $Li^+$ | $Ca^{++}$ | $Mg^{++}$ | $B_4O_7^-$ | $Na^+$ | $K^+$ |
| | UNIT | | | | | |
| | $mg/dm^3$ | $mg/dm^3$ | $mg/dm^3$ | $mg/dm^3$ | $mg/dm^3$ | $mg/dm^3$ |
| | TECHNIQUE | | | | | |
| | ICP-OES | ICP-OES | ICP-OES | ICP-OES | ICP-OES | ICP-OES |
| Comp. FL (IV.2) | 12,892 | 130 | 94,105 | 35,486 | 1,096 | 832 |

| | DETERMINATION | | | | | |
|---|---|---|---|---|---|---|
| | $Ba^{++}$ | $Sr^{++}$ | $Fe^{+++}$ | $Cl^-$ | $SO_4^=$ | $CO_3^=$ |
| | UNIT | | | | | |
| | $mg/dm^3$ | $mg/dm^3$ | $mg/dm^3$ | $mg/dm^3$ | $mg/dm^3$ | $mg/dm^3$ |
| | TECHNIQUE | | | | | |
| | ICP-OES | ICP-OES | ICP-OES | Argentometry | Gravimetry | Volumetry |
| Comp. FL (IV.2) | — | — | — | 318,087 | 5,629 | N.D. |

| DETERMINATION | $HCO_3^-$ | pH | Density |
|---|---|---|---|
| UNIT | $mg/dm^3$ | UpH | $kg/dm^3$ |
| TECHNIQUE | Volumetry | Potentiometry | Pycnometry |
| Comp. FL (IV.2) | N/D | 5.02 | 1.303 |

| Ionic balance | Charges+ | 9,676 |
|---|---|---|
| | Charges− | 9,547 |

Deviation=−0.007

Precipitated Solids at Stage (IV.2'):

| Total mass SP (IV.2)= | 4.05 | kg |
|---|---|---|
| Total evaporated w at 105° C. | 50.03 | % |
| H is assumed= | 11 | % |

Chemistry of Solids SP (IV.2):

| | DETERMINATION | | | | | |
|---|---|---|---|---|---|---|
| | $Li^+$ | $Ca^{++}$ | $Mg^{++}$ | B | $Na^+$ | $K^+$ |
| | UNIT | | | | | |
| | % (w/w) | % (w/w) | % (w/w) | % (w/w) | % (w/w) | % (w/w) |
| | TECHNIQUE | | | | | |
| | ICP-OES | ICP-OES | ICP-OES | ICP-OES | ICP-OES | ICP-OES |
| Comp. SP (IV.2) | 0.304 | 0.160 | 12.430 | 3.430 | 4.23 | 6.23 |

| DETERMINATION | Cl$^-$ | SO$_4^=$ | Humidity | Insolubles |
|---|---|---|---|---|
| UNIT | % (w/w) | % (w/w) | % (w/w) | % (w/w) |
| TECHNIQUE | Argentometry | Gravimetry | Gravimetry | Gravimetry |
| Comp. SP (IV.2) | 57.53 | 0.42 | 11.0 | 0.8 |

Theoretical Calculation of the Precipitated Solid Mass SP (IV.2):

| Unit | Mass in FL (IV.1) g | Mass in FL (IV.2) g | Precipitated mass g | Precipitated moles moles g |
|---|---|---|---|---|
| Li$^+$ | 270 | 270 | 0 | 0.0 |
| Na$^+$ | 149 | 23 | 126 | 5 |
| K$^+$ | 187 | 17 | 170 | 4 |
| Ca$^{++}$ | 9 | 3 | 6 | 0.1 |
| Mg$^{++}$ | 2,262 | 1,973 | 290 | 11.9 |
| Cl$^-$ | 7,885 | 6,668 | 1,217 | 34 |
| SO$_4^=$ | 125 | 118 | 7 | 0.1 |
| HCO$_3^-$ | — | — | — | — |
| B$_4$O$_7^=$ | 1,047 | 744 | 303 | 2.0 |
| | | | 217 | |
| Cryst. w NE | | | 2,335 | |

| | | |
|---|---|---|
| STD (IV.1) | 11,934 | g |
| STD (IV.2) | 9,816 | g |
| SP (IV.2) | 2,118 | g |
| Cryst. w NE | 217 | g |
| | 2,335 | g |

Deviation 0.0000
Total precipitated 2,352 g
Calculation of the Moisturizing Solution Volume (Vsm (IV.2)):

| | | |
|---|---|---|
| Vsm (IV.2)= | 0.6 | dm$^3$ |
| Moisturizing solution mass | 0.8 | kg |
| Insoluble mass in SP (IV.2) | 0.02 | kg |

| Precipitated salts: | | (g) |
|---|---|---|
| MgCl$_2$•6H$_2$O | 7 moles | 756 |
| MgCl$_2$•KCl•6H$_2$O | 5 moles | 180 |
| MgCl$_2$•LiCl•7H$_2$O | 1 mole | 126 |
| NaCl | 5 moles | |
| Crystallization water | | 1,062 |

| | | |
|---|---|---|
| Dry precipitated mass plus moisturizing solution | 2.965 | kg |
| Evaporated crystal w | 0.845 | kg |
| Tot. wet mass | 3.810 | kg |
| Harvested crystal mass | 4.050 | kg |

Deviation −0.031

Harvested crystals are washed with 2 kg of fresh water. This water mass is approximately equal to half of the harvested crystal mass. Wash water is concentrated until the same lithium concentration that has FL (IV.2) is reached
Effective volume delivered by stage (IV.2)=20.1 dm$^3$
STAGE V: Treatment
Substage V.1

20.1 dm$^3$ obtained (FL (IV.2)) is placed in a plastic container with a capacity of 60 dm$^3$. Stirring manually with a plastic shovel, 5.833 kg of calcium hydroxide is added at 7.95 dm$^3$ as a solid. Immediately afterwards, and continuing with stirring, a prepared aqueous solution is added by dissolving 11.183 kg of anhydrous sodium sulfate at 28.14 dm$^3$ of fresh water at 35° C. The heterogeneous mixture obtained after treatment is separated by centrifugation, and the following is obtained:

Liquid Phase FL (V.1):

| | | |
|---|---|---|
| Mass FL (V.1) | 54.26 | kg |
| ρ (FL (V.1)) | 1.14 | kg/dm$^3$ |
| Vt (FL (V.1)) | 47.6 | dm$^3$ |
| STD (FL (V.1)) | 228 | g/dm$^3$ |

FL (V.1) Chemistry:

| | DETERMINATION | | | | | |
|---|---|---|---|---|---|---|
| | Li$^+$ | Ca$^{++}$ | Mg$^{++}$ | B$_4$O$_7^-$ | Na$^+$ | K$^+$ |
| | | | UNIT | | | |
| | mg/dm$^3$ | mg/dm$^3$ | mg/dm$^3$ | mg/dm$^3$ | mg/dm$^3$ | mg/dm$^3$ |
| | | | TECHNIQUE | | | |
| | ICP-OES | ICP-OES | ICP-OES | ICP-OES | ICP-OES | ICP-OES |
| Comp. FL (V.1) | 5,379 | 1,194 | 220 | 4,685 | 73,279 | 368 |

| | DETERMINATION | | | | | |
|---|---|---|---|---|---|---|
| | Ba$^{++}$ | Sr$^{++}$ | Fe$^{+++}$ | Cl$^-$ | SO$_4^-$ | CO$_3^-$ |
| | | | UNIT | | | |
| | mg/dm$^3$ | mg/dm$^3$ | mg/dm$^3$ | mg/dm$^3$ | mg/dm$^3$ | mg/dm$^3$ |
| | | | TECHNIQUE | | | |
| | ICP-OES | ICP-OES | ICP-OES | Argentometry | Gravimetry | Volumetry |
| Comp. FL (V.1) | — | 2 | 5 | 128,879 | 14,391 | N.D. |

| DETERMINATION | $HCO_3$ | pH | Density |
|---|---|---|---|
| UNIT | $mg/dm^3$ | UpH | $kg/dm^3$ |
| TECHNIQUE | Volumetry | Potentiometry | Pycnometry |
| Comp. FL (V.1) | N/D | 8.90 | 1.140 |

| Ionic balance | Charges+ | 4,067 | | |
|---|---|---|---|---|
| | Charges− | 4,029 | Deviation | −0.005 |

Precipitated Solids at Stage V.1 (SP V.1):

| Total mass SP (V.1)= | 42.75 | kg |
|---|---|---|
| Total evaporated w at 105° C. | 55.12 | % |
| H is assumed= | 42 | % |

Chemistry of Solids SP (V.1):

| | DETERMINATION | | | | | |
|---|---|---|---|---|---|---|
| | $Li^+$ | $Ca^{++}$ | $Mg^{++}$ | $B_4O_7^-$ | $Na^+$ | $K^+$ |
| | | | UNIT | | | |
| | % (w/w) | % (w/w) | % (w/w) | % (w/w) | % (w/w) | % (w/w) |
| | | | TECHNIQUE | | | |
| | ICP-OES | ICP-OES | ICP-OES | ICP-OES | ICP-OES | ICP-OES |
| Comp. SP (V.1) | 0.310 | 17.46 | 10.55 | 4.720 | 4.54 | 0.04 |

| DETERMINATION | Cl | $SO_4^=$ | Humidity | Insolubles |
|---|---|---|---|---|
| UNIT | % (w/w) | % (w/w) | % (w/w) | % (w/w) |
| TECHNIQUE | Argentometry | Gravimetry | Gravimetry | Gravimetry |
| Comp. SP (V.1) | 49.25 | 39.06 | 42.00 | 1.8 |

Theoretical Calculation of the Precipitated Solid Mass SP (V.1):

| Unit | Mass in FL (IV.2) plus addition g | Mass in FL (V.1) g | Precipitated mass g | Precipitated moles moles |
|---|---|---|---|---|
| $Li^+$ | 259 | 256 | 3 | 0.4 |
| $Na^+$ | 3,644 | 3,488 | 156 | 7 |
| $K^+$ | 17 | 18 | −1 | 0 |
| $Ca^{++}$ | 3,163 | 57 | 3,106 | 77.5 |
| $Mg^{++}$ | 1,892 | 10 | 1,881 | 77.4 |
| $Cl^-$ | 6,394 | 6,135 | 259 | 7 |
| $SO_4^=$ | 7,672 | 685 | 6,987 | 72.8 |
| $OH^-$ | 2,680 | 1 | 2,679 | 157.6 |
| $HCO_3^-$ | — | — | — | — |
| $B_4O_7^=$ | 713 | 223 | 490 | 3.2 |
| | | | 15,561 | g |
| Cryst. w NE | | | 341 | g |
| | | | 15,902 | g |

| STD (IV.2) | 28,864 | g |
|---|---|---|
| STD (V.1) | 10,872 | g |
| SP (V.1) | 17,993 | g |
| Cryst. w NE | 341 | g |
| | 18,334 | g |

Deviation 0.1302

Total precipitated: 18,663 g

Calculation of the Moisturizing Solution Volume (Vsm (V.1)):

| Vsm (V.1)= | 19.6 | $dm^3$ |
|---|---|---|
| Moisturizing solution mass | 22.3 | kg |
| Insoluble mass in SP (V.1) | 0.33 | kg |

Cryst. w (g)

| $CaSO_4 \cdot 2H_2O$ | 73 moles | 2628 |
|---|---|---|
| $Mg(OH)_2$ | 77.4 moles | |
| $CaB_4O_7$ | 3.2 moles | |
| NaCl | 7 moles | |

| Dry precipitated mass plus moisturizing solution | 40.958 |
|---|---|
| Evaporated cryst. w | 2.287 |
| Wet mass | 43.245 |
| Harvested crystal mass | 42.750 |

Deviation 0.006

Drained solids are washed by suspending them at 68 $dm^3$ of fresh water and centrifuged again. Wash water is concentrated until the same lithium concentration of FL (V.1) is reached. The resulting volume of FL (V.1) is:

V(FLV.1)=45.6 $dm^3$

Substage V.2

45.6 $dm^3$ obtained (FL (V.1)) is placed in a plastic container with a capacity of 60 $dm^3$. Stirring manually with a plastic shovel, 300 cm 3 of a 4 N solution (160 $g/dm^3$) of sodium hydroxide is added, verifying that pH reaches 11.2. Immediately afterwards, and continuing with stirring, a prepared aqueous solution is added by dissolving 141.4 g of sodium carbonate at 480 cm 3 of fresh water. Then, and without stopping to stir, a prepared aqueous solution is added by dissolving 1.497 kg of barium chloride dihydrate at 4.290 $dm^3$ of fresh water. The heterogeneous mixture is allowed to stand and then the precipitated solids are separated by vacuum filtration, and the following is obtained:

Liquid Phase FL (V.2):

| Mass FL (V.2) | 53.30 | kg |
|---|---|---|
| ρ (FL (V.2)) | 1.13 | $kg/dm^3$ |
| V (FL (V.2)) | 47.17 | $dm^3$ |
| STD (FL(V.2)) | 220 | $g/dm^3$ |

FL (V.2) Chemistry:

| | DETERMINATION | | | | | |
|---|---|---|---|---|---|---|
| | $Li^+$ | $Ca^{++}$ | $Mg^{++}$ | $B_4O_7^-$ | $Na^+$ | $K^+$ |
| | UNIT | | | | | |
| | $mg/dm^3$ | $mg/dm^3$ | $mg/dm^3$ | $mg/dm^3$ | $mg/dm^3$ | $mg/dm^3$ |
| | TECHNIQUE | | | | | |
| | ICP-OES | ICP-OES | ICP-OES | ICP-OES | ICP-OES | ICP-OES |
| Comp. FL (V.2) | 5,200 | 163 | 27.00 | 4,142 | 72,772 | 366 |

| | DETERMINATION | | | | | |
|---|---|---|---|---|---|---|
| | $Ba^{++}$ | $Sr^{++}$ | $Fe^{+++}$ | $Cl^-$ | $SO_4^-$ | $CO_3^-$ |
| | UNIT | | | | | |
| | $mg/dm^3$ | $mg/dm^3$ | $mg/dm^3$ | $mg/dm^3$ | $mg/dm^3$ | $mg/dm^3$ |
| | TECHNIQUE | | | | | |
| | ICP-OES | ICP-OES | ICP-OES | Argentometry | Gravimetry | Volumetry |
| Comp. FL (V.2) | 24 | 2 | 5 | 136,826 | 242 | N.D. |

| DETERMINATION | $HCO_3^-$ | pH | Density |
|---|---|---|---|
| UNIT | $mg/dm^3$ | UpH | $kg/dm^3$ |
| TECHNIQUE | Volumetry | Potentiometry | Pycnometry |
| Comp. FL (V.2) | 0 | 11.20 | 1.130 |
| Ionic balance | Charges+ | 3,952 | |
| | Charges− | 3,979 | Deviation 0.003 |

Precipitated Solids at Stage V.2 (SP V.2):

| Total mass SP (V.2) = | 1.855 | kg |
|---|---|---|
| Total evaporated w at 105° C. | 8 | % |
| H is assumed= | 8 | % |

Chemistry of Solids SP (V.2):

| | DETERMINATION | | | | | |
|---|---|---|---|---|---|---|
| | $Li^+$ | $Ca^{++}$ | $Mg^{++}$ | $B_4O_7^-$ | $Na^+$ | $K^+$ |
| | UNIT | | | | | |
| | % (w/w) | % (w/w) | % (w/w) | % (w/w) | % (w/w) | % (w/w) |
| | TECHNIQUE | | | | | |
| | ICP-OES | ICP-OES | ICP-OES | ICP-OES | ICP-OES | ICP-OES |
| Comp. SP (V.2) | 0.275 | 2.63 | 0.51 | 0.315 | 3.46 | <0.03 |

| | DETERMINATION | | | | | |
|---|---|---|---|---|---|---|
| | $Cl^-$ | $SO_4^-$ | Humidity | Insolubles | $Ba^{++}$ | $CO_3^-$ |
| | UNIT | | | | | |
| | % (w/w) | % (w/w) | % (w/w) | % (w/w) | % (w/w) | % (w/w) |
| | TECHNIQUE | | | | | |
| | Argentometry | Gravimetry | Gravimetry | Gravimetry | ICP-OES | Titration |
| Comp. SP (V.2) | <0.04 | 38.90 | 8.00 | 1.8 | 47.70 | 4.21 |

Theoretical Calculation of the Precipitated Solid Mass SP (V.2):

| Unit | Mass in FL (V.1) plus addition g | Mass in FL (V.2) g | Precipitated mass g | Precipitated moles Moles |
|---|---|---|---|---|
| $Li^+$ | 245 | 245 | 0 | 0.0 |
| $Na^+$ | 3,432 | 3,433 | −1 | 0 |
| $K^+$ | 17 | 17 | 0 | 0 |
| $Ca^{++}$ | 54 | 8 | 47 | 1.2 |
| $Mg^{++}$ | 10 | 1 | 9 | 0.4 |
| $Ba^{++}$ | 850 | 1 | 849 | 6.2 |
| $Cl^-$ | 6,316 | 6,454 | −138 | −4 |
| $SO_4^=$ | 656 | 11 | 645 | 6.7 |
| $OH^-$ | 24 | 9 | 15 | 0.9 |
| $CO_3^=$ | 81 | 0.0 | 81 | 1.4 |
| $B_4O_7^=$ | 223 | 195 | 28 | 0.2 |
|  |  |  | 1,533 | g |
| Cryst. w NE |  |  | 0 |  |
|  |  |  | 1,533 | g |

| STD (V.1) | 11,895 | g |
| STD (V.2) | 10,368 | g |
| SP (V.2) | 1,527 | g |
| Cryst. w NE | 0 | g |
|  | 1,527 | g |

Deviation −0.0042
Total precipitated=1,555 g
Calculation of the Moisturizing Solution Volume (Vsm (IV.2)):

| Vsm (IV.2)= | 0.16 | $dm^3$ |
| Moisturizing solution mass | 0.2 | kg |
| Insoluble mass in SP (IV.2) | 0.03 | kg |

| Precipitated salts | | |
|---|---|---|
| $CaCO_3$ | 1.2 moles | |
| $Mg(OH)_2$ | 0.4 moles | |
| $BaSO_4$ | 6.2 moles | |

| Precipitated mass plus moisturizing solution | 1.733 | kg |
| Evaporated crystal w | 0.000 | kg |
| Wet mass | 1.733 | kg |
| Harvested crystal mass | 1.855 | kg |

Deviation −0.034

Drained solids are washed with 0.9 $dm^3$ of fresh water and centrifuged again. Wash water is concentrated until the same lithium concentration of FL (V.2) is reached. The resulting volume of FL(V.3) is:

V(FL V.2)=46.1 $dm^3$

STAGE VI: Post-Treatment Concentration

FL (V.2) is exposed to solar evaporation to reach a lithium concentration of 37 $g/dm^3$ (3%) and the following is obtained:

Liquid Phase FL (VI):

| Mass FL (VI) | 8.05 | kg |
| P (FL (VI)) | 1.26 | $kg/dm^3$ |
| V (FL (VI)) | 6.39 | $dm^3$ |
| STD (FL(VI)) | 318 | $g/dm^3$ |

FL (VI) Chemistry:

| | DETERMINATION | | | | | |
|---|---|---|---|---|---|---|
| | $Li^+$ | $Ca^{++}$ | $Mg^{++}$ | $B_4O_7^-$ | $Na^+$ | $K^+$ |
| | UNIT | | | | | |
| | $mg/dm^3$ | $mg/dm^3$ | $mg/dm^3$ | $mg/dm^3$ | $mg/dm^3$ | $mg/dm^3$ |
| | TECHNIQUE | | | | | |
| | ICP-OES | ICP-OES | ICP-OES | ICP-OES | ICP-OES | ICP-OES |
| Comp. FL (VI) | 37,100 | 132 | 11.00 | 16,890 | 35,780 | 1,390 |

| | DETERMINATION | | | | | |
|---|---|---|---|---|---|---|
| | $Ba^{++}$ | $Sr^{++}$ | $Fe^{+++}$ | $Cl^-$ | $SO_4^-$ | $CO_3^-$ |
| | UNIT | | | | | |
| | $mg/dm^3$ | $mg/dm^3$ | $mg/dm^3$ | $mg/dm^3$ | $mg/dm^3$ | $mg/dm^3$ |
| | TECHNIQUE | | | | | |
| | ICP-OES | ICP-OES | ICP-OES | Argentometry | Gravimetry | Volumetry |
| Comp. FL (VI) | 34 | 5 | 8 | 237,830 | 50 | N.D. |

| DETERMINATION | $HCO_3^-$ | pH | Density |
|---|---|---|---|
| UNIT | mg/dm³ | UpH | kg/dm³ |
| TECHNIQUE | Volumetry | Potentiometry | Pycnometry |
| Comp. FL (VI) | 6 | 8.60 | 1.260 |

| Ionic balance | Charges+ | 6,942 |
|---|---|---|
| | Charges– | 6,895 |

Deviation –0.003
Precipitated Solids at Stage VI (SP VI):

| Total mass SP (VI)= | 10.03 | kg |
|---|---|---|
| Total evaporated w at 105° C. | 8 | % |
| H is assumed= | 8 | % |

Chemistry of Solids SP (VI):

| DETERMINATION | | | | | |
|---|---|---|---|---|---|
| Li⁺ | Ca⁺⁺ | Mg⁺⁺ | $B_4O_7^-$ | Na⁺ | K⁺ |
| UNIT | | | | | |
| % (w/w) | % (w/w) | % (w/w) | % (w/w) | % (w/w) | % (w/w) |
| TECHNIQUE | | | | | |
| ICP-OES | ICP-OES | ICP-OES | ICP-OES | ICP-OES | ICP-OES |
| Comp. SP (VI) 0.094 | <0.01 | <0.01 | 0.023 | 38.53 | <0.03 |

| DETERMINATION | Cl⁻ | $SO_4^=$ | Humidity | Insolubles |
|---|---|---|---|---|
| UNIT | % (w/w) | % (w/w) | % (w/w) | % (w/w) |
| TECHNIQUE | Argentometry | Gravimetry | Gravimetry | Gravimetry |
| Comp. SP (VI) | 61.10 | <0.01 | 8.00 | 1.1 |

Theoretical Calculation of the Precipitated Solid Mass SP (VI):

| Unit | Mass in FL (V.2) g | Mass in FL (VI) g | Precipitated mass g | Precipitated moles moles g |
|---|---|---|---|---|
| Li⁺ | 240 | 240 | 0 | 0.0 |
| Na⁺ | 3,355 | 216 | 3,139 | 136 |
| K⁺ | 17 | 9 | 8.2 | 0 |
| Ca⁺⁺ | 7.5 | 0.2 | 7.3 | 0.2 |
| Mg⁺⁺ | 1 | 0 | 1 | 0.1 |
| Cl⁻ | 6,308 | 1,533 | 4,774 | 135 |
| $SO_4^-$ | 11 | 0 | 11 | 0.1 |
| OH⁻ | — | 0 | 0 | 0.0 |
| $B_4O_7^-$ | 191 | 33 | 158 | 1.02 |
| | | | 8,099 | g |
| Cryst. w NE | | | 0 | |
| | | | 8,099 | g |

| STD (V.2) | 10,368 | g |
|---|---|---|
| STD (VI) | 2,031 | g |

| SP (VI) | 8,337 | g |
|---|---|---|
| Cryst. w NE | 0 | g |
| | 8,337 | g |

Deviation 0.0286
Total
precipitated 8429 g
Calculation of the Moisturizing Solution Volume (Vsm (VI)):

| Vsm (VI)= | 0.89 | dm³ |
|---|---|---|
| SM mass | 1.1 | kg |
| Insoluble mass in SP (VI) | 0.09 | kg |

135 moles NaCl

| Precipitated mass t. Dry + SM | 9.549 | kg |
|---|---|---|
| Evaporated cryst. w | 0.0 | kg |
| Tot. wet mass | 9.549 | kg |
| Harvested crystal mass | 10.030 | kg |

Deviation 0.026

Harvested crystals are washed with 5 kg of fresh water. This water mass is approximately equal to half of the harvested crystal mass.

Wash water is concentrated until the same lithium concentration that has FL (VI) is reached:

Effective volume delivered by Stage VI: 6.1 dm³

STAGE VII: Final Concentration

FL (VI) is exposed to solar evaporation to reach a lithium concentration between 75 g/dm³ and 85 g/dm³. At this final concentration, phases are separated, and the following is obtained:

Liquid Phase FL (VII):

| Mass FL (VII) | 3.67 | kg |
|---|---|---|
| ρ (FL (VII)) | 1.26 | kg/dm³ |
| V (FL (VII)) | 2.91 | dm³ |
| STD (FL(VII)) | 498 | g/dm³ |

FL (VII) Chemistry:

| | DETERMINATION | | | | | |
|---|---|---|---|---|---|---|
| | $Li^+$ | $Ca^{++}$ | $Mg^{++}$ | $B_4O_7^=$ | $Na^+$ | $K^+$ |
| UNIT | $mg/dm^3$ | $mg/dm^3$ | $mg/dm^3$ | $mg/dm^3$ | $mg/dm^3$ | $mg/dm^3$ |
| TECHNIQUE | ICP-OES | ICP-OES | ICP-OES | ICP-OES | ICP-OES | ICP-OES |
| Comp. FL (VII) | 78,160 | 38 | 7.00 | 24,911 | 3,830 | 2,130 |

| | DETERMINATION | | | | | |
|---|---|---|---|---|---|---|
| | $Ba^{++}$ | $Sr^{++}$ | $Fe^{+++}$ | $Cl^-$ | $SO_4^=$ | $CO_3^=$ |
| UNIT | $mg/dm^3$ | $mg/dm^3$ | $mg/dm^3$ | $mg/dm^3$ | $mg/dm^3$ | $mg/dm^3$ |
| TECHNIQUE | ICP-OES | ICP-OES | ICP-OES | Argentometry | Gravimetry | Volumetry |
| Comp. FL (VII) | 31 | 5 | 8 | 405,520 | 80 | N.D. |

| DETERMINATION | $CO_3^=$ | pH | Density |
|---|---|---|---|
| UNIT | $mg/dm^3$ | UpH | $kg/dm^3$ |
| TECHNIQUE | Volumetry | Potentiometry | Pycnometry |
| Comp. FL (VII) | ND | 8.20 | 1.260 |

| Ionic balance | Charges+ | 11,453 | | |
|---|---|---|---|---|
| | Charges− | 11,719 | Deviation | 0.011 |

Precipitated Solids at Stage VII (SP VII):

| Total mass SP (VII)= | 0.73 | kg |
|---|---|---|
| Total evaporated w at 105° C. | 8 | % |
| H= | 8 | % |

Chemistry of Solids SP (VII):

| | DETERMINATION | | | | | |
|---|---|---|---|---|---|---|
| | $Li^+$ | $Ca^{++}$ | $Mg^{++}$ | $B_4O_7^=$ | $Na^+$ | $K^+$ |
| UNIT | % (w/w) | % (w/w) | % (w/w) | ppm | % (w/w) | % (w/w) |
| TECHNIQUE | ICP-OES | ICP-OES | ICP-OES | ICP-OES | ICP-OES | ICP-OES |
| Comp. SP (VII) | 0.094 | <0.01 | <0.01 | 0.023 | 38.53 | <0.03 |

| DETERMINATION | $Cl^-$ | $SO_4^=$ | Humidity | Insolubles |
|---|---|---|---|---|
| UNIT | % (w/w) | % (w/w) | % (w/w) | % (w/w) |
| TECHNIQUE | Argentometry | Gravimetry | Gravimetry | Gravimetry |
| Comp. SP (VII) | 61.10 | <0.01 | 8.00 | 1.1 |

Theoretical Calculation of the Precipitated Solid Mass SP VII:

| | Mass in FL Precipitated | | | |
|---|---|---|---|---|
| | Mass in FL (VI) | Mass in FL (VII) | Precipitated mass | Precipitated moles |
| Unit | g | g | g | moles g |
| $Li^+$ | 240 | 229 | 11 | 1.6 |
| $Na^+$ | 216 | 4 | 212 | 9 |
| $K^+$ | 9 | 6 | 3.0 | 0 |
| $Ca^{++}$ | 0.2 | 0.1 | 0.1 | 0.0 |
| $Mg^{++}$ | 0 | 0 | 0 | 0.0 |
| $Cl^-$ | 1,533 | 1,196 | 337 | 10 |
| $SO_4^=$ | 0 | 0 | 0 | 0.0 |
| $OH^-$ | — | 0 | 0 | 0.0 |
| $B_4O_7^=$ | 33 | 17 | 16 | 0.10 |
| | | | 580 | g |
| Cryst. w NE | | | 0 | |
| | | | 580 | g |

| STD (V.2) | 2,031 | g |
|---|---|---|
| STD (VI) | 1,451 | g |
| SP (VI) | 580 | g |
| Cryst. w NE | 0 | g |
| | 580 | g |

Deviation 0.0007
Total precipitated=587 g
Calculation of the Moisturizing Solution Volume (Vsm (VII)):

| | | |
|---|---|---|
| Vsm (VII)= | 0.09 | dm³ |
| SM mass | 0.1 | kg |
| Insoluble mass in SP (VII) | 0.01 | kg |

9 moles NaCl

| | | |
|---|---|---|
| Precipitated mass t. Dry + SM | 0.698 | kg |
| Evaporated cryst. w | 0.0 | kg |
| Tot. wet mass | 0.698 | kg |
| Harvested crystal mass | 0.730 | kg |

Deviation −0.023

Harvested crystals are washed with 40 cm 3 of fresh water. This water mass is approximately equal to half of the harvested crystal mass.

Wash water is concentrated until the same lithium concentration that has FL (VII) is reached:

Effective volume delivered by Stage VII: 2.8 dm³

Calculation of Operating Variables

The calculation of the operating variables for an annual production of 10,000 tons of equivalent lithium carbonate was carried out using brine from the Rio Grande Salt flat when the cooling process at stage II is carried out in natural crystallizers and stages VI and VII are carried out in solar evaporation ponds.

Stage I: Initial Pre-Concentration Ponds
First Unharvested Period

| | Substage I.1 | Substage I.2 |
|---|---|---|
| Incoming volume (m³/year) | 8,002,135 | 2,603,262 |
| Lithium concentration in the incoming brine (kg/m³) | 0.382 | 0.956 |
| Outcoming volume (m³/year) | 2,603,262 | 936,624 |
| Lithium concentration in the outcoming brine (kg/m³) | 0.956 | 2.228 |
| SP (t/year) | 1,492,884 | 495,877 |
| Pumping water (m³/year) | 40,011 (brackish) | 26,033 (brackish) |
| Default SL height (cm) | 12 | 12 |
| precipitated salt h every two years (cm) | 123 | 103 |
| Pond area (m²) | 2,550,000 | 940,000 |
| Charging time (days) | 39 | 39 |

Stage I: Initial Pre-Concentration Ponds
Next Unharvested Periods

| | Substage I.1 | Substage I.2 |
|---|---|---|
| Incoming volume (m³/year) | 8,002,134 | 3,042,657 |
| Lithium concentration in the incoming brine (kg/m³) | 0.382 | 0.956 |
| Outcoming volume (m³/year) | 3,042,657 | 1,268,516 |
| Lithium concentration in the outcoming brine (kg/m³) | 0.956 | 2.228 |
| SP (t/year) | 1,492,884 | 579,574 |
| Pumping water (m³/year) | 40,010 (brackish) | 30,427 (brackish) |
| Default SL height (cm) | 12 | 12 |
| precipitated salt h every two years (cm) | 114 | 103 |
| Pond area (m²) | 2,550,000 | 1,100,000 |
| Charging time (days) | 37 | 39 |

Brackish water: water with a density less than 1,100 g/dm³

Auxiliary pond for stage I: 500,000 m²

Stage II: Cooling

Accumulation Ponds

Total brine volume to be accumulated for cooling (first unharvested period in the ponds at Stage I): 936,624 m 3

Total brine volume to be accumulated for cooling (subsequent unharvested periods in the ponds at Stage I): 1,268,516 m³

Lithium concentration in the accumulated brine for cooling: 2.228 g/dm³

Total area and depth of accumulation ponds: 650,000 m 2 and 2.5 m

Quantity of accumulation ponds: 6

Auxiliary accumulation pond: 1 of 100,000 m 2

Total area of crystallizers (depth 0.5 m): 320,000 m 2

Cycle of each crystallizer (this includes charging, discharging, draining, washing crystals and draining wash water): 8 days Total brine volume which is accumulated after cooling (first unharvested period in the ponds at Stage I): 928,330 m 3

Total brine volume which is accumulated after cooling (subsequent unharvested periods in the ponds at Stage I): 1,257,282 m³

Lithium concentration in the accumulated brine after cooling: 3.023 g/dm³

Quantity of crystals after cooling (anhydrous sodium sulfate base): 180,000 t

Fresh water for crystal wash: 250,000 m³

Stage III: Pre-Treatment

Quantity of Reagents and Water Used Per Ton of Equivalent Lithium Carbonate

Calcium chloride dihydrate: 3.54 t
Fresh water: 3.78 m³

Liquid Phase after Pre-Treatment:

Volume (next unharvested periods): 919,027 m³
Lithium concentration: 2.860 g/dm³
Density: 1,215 g/dm³
Total dissolved solids: 286 g/dm³

Quantity of Solid Effluents Generated in Pre-Treatment Per Ton of Equivalent Lithium Carbonate: 5.4 t Approximate Quantity of Products to be Obtained by Processing the Solid Effluent (Per Ton of Equivalent Lithium Carbonate:

Agricultural gypsum: 2.52 t

Stage IV: Final Pre-Concentration Ponds
First Unharvested Period:

| | Substages IV.1 | Substage IV.2 |
|---|---|---|
| Incoming volume (m³/year) | 698,136 | 154,047 |
| Lithium concentration in the incoming brine (kg/m³) | 2.86 | 9.618 |
| Outcoming volume (m³/year) | 154,047 | 108,525 |
| Lithium concentration in the outcoming brine (kg/m³) | 9.618 | 12.982 |
| SP (t/year) | 111,438 | 12,058 |
| Pumping water (m³/year) | 7,000 | 1,500 |
| Default SL height (cm) | 12 | 12 |
| precipitated salt h (cm every 2 years) | 76 | 78 |
| Pond area (m²) | 380,000 | 40,000 |
| Charging time (days) | 99 | 14 |

Stage IV: Final Ore-Concentration Ponds
Next Unharvested Periods:

|  | Substages IV.1 | Substage IV.2 |
|---|---|---|
| Incoming volume (m³/year) | 919,027 | 257,943 |
| Lithium concentration in the incoming brine (kg/m³) | 2.86 | 9.618 |
| Outcoming volume (m³/year) | 257,943 | 189,065 |
| Lithium concentration in the outcoming brine (kg/m³) | 9.618 | 12.982 |
| SP (t/year) | 146,697 | 20,190 |
| Pumping water (m³/year) | 9,200 | 2,600 |
| Wash water (m³/year) | 15,236 | 6,173 |
| Default SL height (cm) | 12 | 12 |
| precipitated salt h (cm every 2 years) | 76 | 78 |
| Pond area (m²) | 500,000 | 70,000 |
| Charging time (days) | 99 | 14 |

Stage V: Treatment
Substage V.1
Quantity of Reagents and Water Used Per Ton of Equivalent Lithium Carbonate
    Hydrated lime: 4.98 t
    Sodium sulfate (anhydrous base): 9.55 t
        0 t if separate salts are used at stage II
    Fresh water: 31 m³
Liquid Phase after Substage V.1:
    Volume (next unharvested periods): 428,547 m³
    Lithium concentration: 5.379 g/dm³
    Density: 1.14 g/dm³
    Total dissolved solids: 228 g/dm³
Quantity of Solid Effluents Generated at Substage V.1 Per Ton of Equivalent Lithium Carbonate: 12.7 t
Approximate Quantity of Products to be Obtained by Processing the Generated Solid Effluent (Expressed Per Ton of Equivalent Lithium Carbonate):
    Agricultural gypsum: 5.9 t
    Magnesium sulfate: 4.4 t
Substage V.2
Quantity of Reagents and Water Used Per Ton of Equivalent Lithium Carbonate
    Sodium hydroxide (dry base): 0.041 t
    Sodium carbonate (dry base): 0.12 t
    Barium chloride dihydrate: 1.28 t
    Fresh water: 4.33 m³
Liquid Phase after Substage V.2:
    Volume: 427,640 m³
    Lithium concentration: 5.200 g/dm³
    Density: 1.13 g/dm³
    Total dissolved solids: 220 g/dm³
Quantity of Solid Effluents Generated at Substage V.2, Expressed Per Ton of Equivalent Lithium Carbonate: 0.94 t
Approximate Quantity of Products to be Obtained by Processing the Generated Solid Effluent (Expressed Per Ton of Equivalent Lithium Carbonate):
    Barium sulfate: 0.83 t
Ponds of Stages VI and VII
First Unharvested Period:

|  | Stage VI | Stage VI.1 | Stage VII |
|---|---|---|---|
| Incoming volume (m³/year) | 245,468 | 73,915 | 24,605 |
| Lithium concentration in the incoming brine (kg/m³) | 5.200 | 15.000 | 37.500 |
| Outcoming volume (m³/year) | 73,915 | 24,605 | 10,915 |
| Lithium concentration in the outcoming brine (kg/m³) | 15.000 | 37.500 | 78.160 |
| SP (t/year) | 28,474 | 12,772 | 1,973 |
| Pumping water (m³/year) | 2,500 | 740 | 246 |
| Default SL height (cm) | 12 | 12 | 12 |
| precipitated salt h (cm every 2 years) | 76 | 91 | 50 |
| Pond area (m²) | 90,000 | 31,000 | 12,000 |
| Charging time (days) | 60 | 63 | 55 |

Ponds of Stages VI and VII
Next Unharvested Periods:

|  | Stage VI | Stage VI.1 | Stage VII |
|---|---|---|---|
| Incoming volume (m³/year) | 427,640 | 144,353 | 55,803 |
| Lithium concentration in the incoming brine (kg/m³) | 5.200 | 15.000 | 37.500 |
| Outcoming volume (m³/year) | 144,353 | 55,803 | 26,269 |
| Lithium concentration in the outcoming brine (kg/m³) | 15.000 | 37.500 | 78.160 |
| SP (t/year) | 49,606 | 24,944 | 4,475 |
| Pumping water (m³/year) | 4,300 | 1,450 | 560 |
| Wash water (m³/year) | 14,760 | 7,320 | 1,350 |
| Default SL height (cm) | 12 | 12 | 12 |
| salt h (cm) |  |  |  |
| precipitated salt h (cm every 2 years) | 76 | 91 | 51 |
| Pond area (m₂) | 155,000 | 62,000 | 26,000 |
| Charging time (days) | 60 | 63 | 52 |

Auxiliary pond area for stages IV, VI and VII: 100,000 m²
Specific Water and Reagent Consumption of the Procedure Calculated Per Ton of Equivalent Lithium Carbonate
    Brackish water: 70 m³
    Fresh water: 127.12 m³
    Calcium chloride: 3.54 t
    Barium chloride: 1.28 t
    Calcium hydroxide: 4.98 t
    Sodium sulfate (anhydrous base): 9.55 t
        0 t if separate salts are used at stage II
    Sodium hydroxide (dry base): 0.041 t
    Sodium carbonate (dry base): 0.12 t
Solid Effluent Generation at the Pre-Treatment and Treatment Stages, Calculated Per Ton of Equivalent Lithium Carbonate
    Pre-treatment stage: 5.4 t
    Treatment stage: 13.64 t
Co-Production of Anhydrous Sodium Sulfate Calculated Per Ton of Equivalent Lithium Carbonate
    Detergent grade anhydrous sodium sulfate: 8 t
Conclusions
    This example shows the importance of the implementation of stage II of the procedure in obtaining more than 18 tons of anhydrous sodium sulfate per ton of equivalent lithium carbonate. In this case, the only option is natural cooling since because of the latent crystallization heat of sodium sulfate decahydrate, the mechanical energy consumption of a cooling crystallization equipment is very high. As is apparent from the results of the field and laboratory test for this example, without adding potassium chloride it is only possible to ensure that the magnesium/lithium mass ratio in the liquid phase only drops from 12.6 in natural brine to 7.3 in brine with final pre-concentration. The increased consumption of lime and anhydrous sodium sulfate required to treat a liquid phase with the referred magnesium/lithium ratio is largely compensated with the production of anhydrous sodium sulfate which is obtained. It is important to note that even when the reagent consumption at stage V is high, lithium recovery is 68% and the environmental impact resulting from the application of the procedure is minimum.

Example 4: Determination of the Evaporation Rate for Liquid Phases Concentrated in Solar Evaporation Ponds at Stages I, IV, VI and VII of the Procedure A natural brine from any evaporite is the initial liquid phase entering into stage I. As the procedure evolves, this liquid phase changes its chemical composition and physical properties. But also, when water evaporates from a liquid phase that is saturated, different salts crystallize and precipitate. Then, a safe way to measure the quantity of water that evaporates per time unit from a given area of a liquid phase exposed to solar evaporation is by mass difference. As one of the characteristics of the procedure object of this invention is that in none of the stages involved crystallize and precipitate lithium-containing salts in their chemical formula, the variation in the evaporation rate can be expressed based on lithium concentration, variable related to the physical and chemical properties of the evolving liquid phase.

Figure 9:
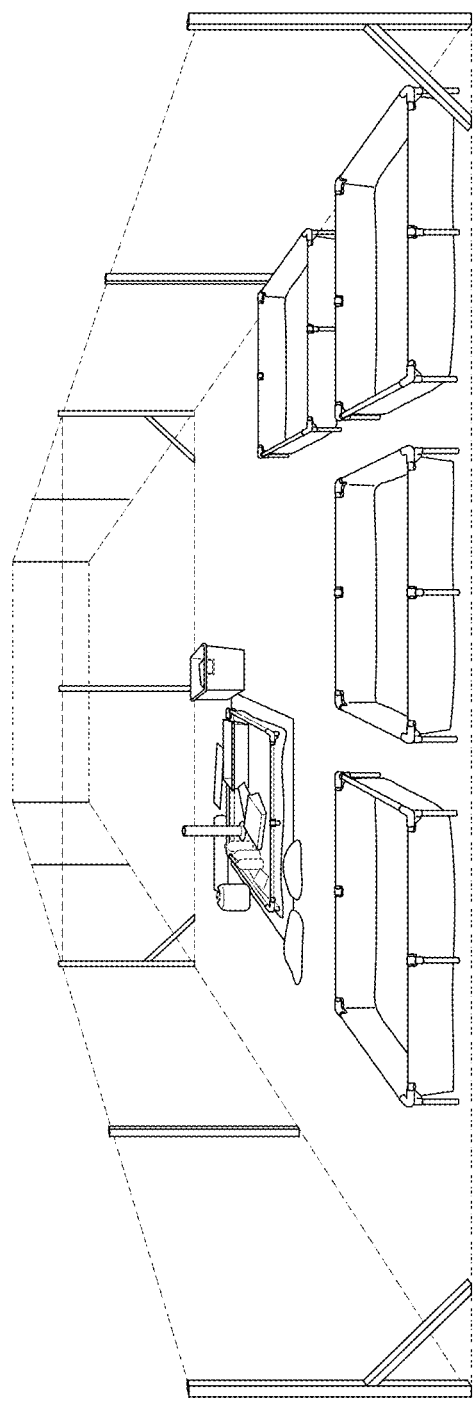
FIG. 9 shows a view of the experimental outdoor center located in the area of Tres Morros, Jujuy province, Argentina, where the tests of Examples 1, 2, 3 and 4 were conducted.
Figure 10:
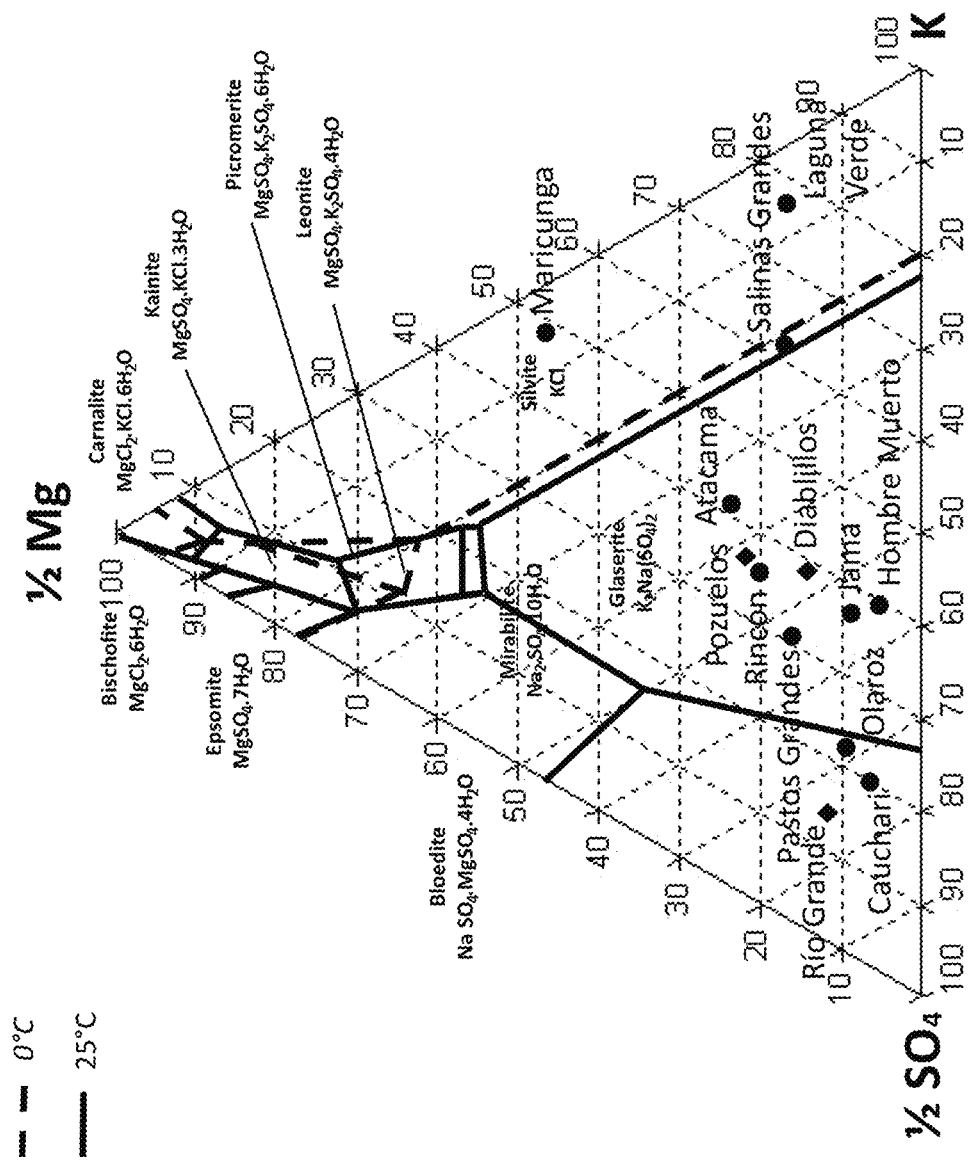
FIG. 10 shows a ternary diagram for 25° C. in full line and 0° C. in dotted line with brine compositions of some salt flats, where brines in the examples are indicated as a diamond.
Figure 11:
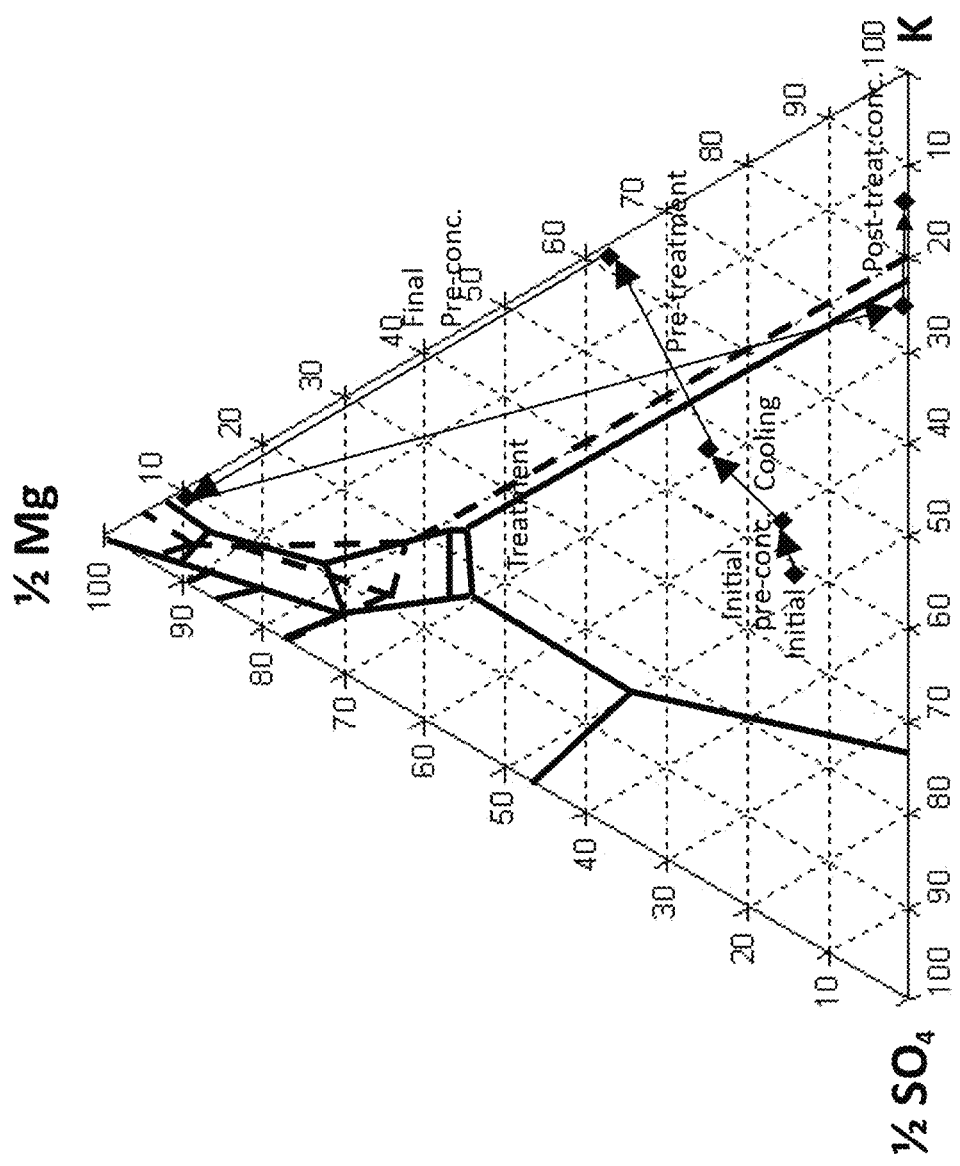
FIG. 11 shows the evolution in a ternary diagram of the brine in Diablillos salt flat in accordance with Example 1, as the procedure progresses in accordance with this invention during the field test carried out in the experimental outdoor center located in the area of Tres Morros, Jujuy province, Argentina.
Figure 12:
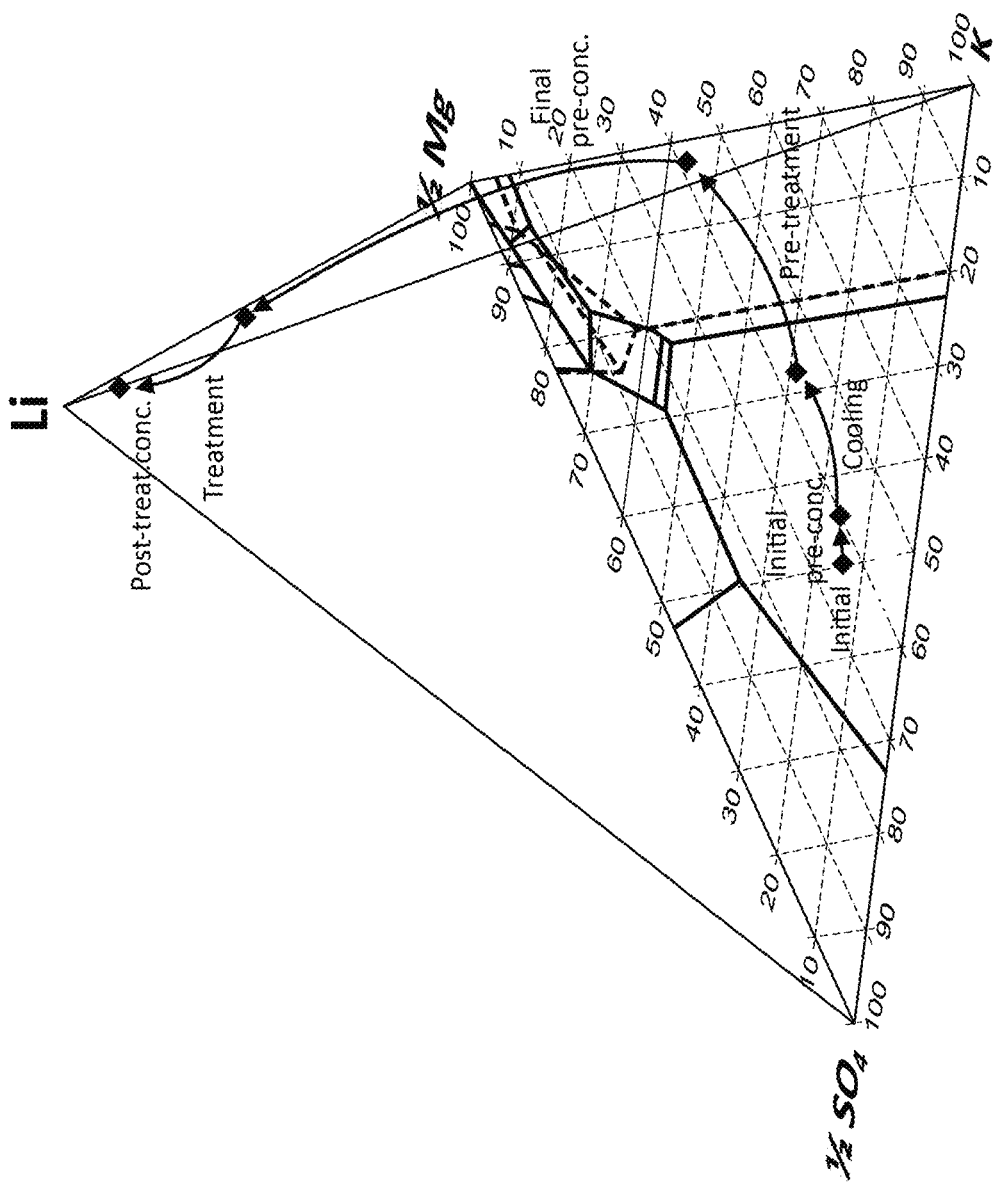
FIG. 12 shows a modified phase diagram, in which lithium is added as an additional element. That is, as brine evolves, the percentage of lithium in proportion to the other elements ($Mg^{++}$, $K^+$, $SO_4^=$) increases. This modified diagram shows the evolution of the brine in Diablillos salt flat in accordance with Example 1, as the procedure progresses in accordance with this invention during the field test carried out in the experimental outdoor center located in the area of Tres Morros, Jujuy province, Argentina.

In the Experimental outdoor center located in the area of Tres Morros, Jujuy province, Argentina, see FIG. 9, field tests were conducted for the three Examples presented, and tests were also conducted to determine the evaporation rate of a saturated natural brine that initially had a lithium concentration between 630-680 mg/dm$^3$. In order to describe the methodology used, the results obtained for the evolution of the liquid phase at stage I, from a lithium concentration of 670 mg/dm$^3$ to a lithium concentration of 9,500 mg/dm$^3$, are detailed below.

Measurements were made using plastic containers capable of containing around 20 dm$^3$ of liquid phase each, making it easy to measure the area exposed to solar evaporation and the mass of each container. Each test began with 300 dm$^3$ of liquid phase, contained in 15 plastic containers. The containers containing brine were initially weighed and exposed to the solar evaporation process. After a period of 4 to 6 days in summer and 15 to 20 days in winter, the containers were weighed again, precipitated solids were separated and drained and an aliquot of the liquid phase obtained to determine the lithium concentration was extracted. For each container, the evaporation rate associated with the corresponding lithium concentration range was determined. Averaging the obtained values, an average evaporation rate corresponding to the arithmetic mean of the average lithium concentration range was determined. The obtained liquid phase was charged into the required quantity of plastic containers, containing 20 dm$^3$ each. The containers were weighed and the new liquid phase mass was exposed again to the solar evaporation process. This results in the evaporation rate corresponding to different lithium concentrations in the liquid phase. Tests are repeated throughout the year and with the obtained results the evaporation rate values are plotted as a function of lithium concentrations for the months of April, May, June, July, August and September (for the southern hemisphere), considered as months with a low evaporation rate; this results in functional dependence on the evaporation rate with the lithium concentration. The same is repeated with the values corresponding to the months of October, November, December, January, February and March (also for the southern hemisphere), considered as months with a high evaporation rate.

5 tests were carried out in the following periods:

Test 1: from 12/04 to 01/08
Test 2: from 02/03 to 03/13
Test 3: from 04/06 to 05/28
Test 4: from 06/02 to 08/02
Test 5: from 08/18 to 10/04

Table 10 details the obtained results by expressing the lithium concentration at mg/dm$^3$ and the evaporation rate at dm$^3$/m$^2$, which is equivalent to millimeters per day (mm/d).

Table of TE measurements based on Li concentrations:

| Test 1 | | Test 2 | | Test 3 | | Test 4 | | Test 5 | |
|---|---|---|---|---|---|---|---|---|---|
| [Li$^+$] | TE | [Li$^+$] | TE | [Li$^+$] | TE | [Li$^+$] | TE | [Li$^+$] | TE |
| 671 | 7.4 | 672 | 7.6 | 670 | 5.6 | 674 | 4.2 | 671 | 5.6 |
| 1,140 | 7.4 | 1,105 | 7.6 | 1,210 | 5.6 | 1,110 | 4.2 | 1,160 | 5.6 |
| 1,140 | 7.1 | 1,105 | 5.7 | 1,210 | 4.4 | 1,110 | 3.6 | 1,160 | 4.8 |
| 2,870 | 7.1 | 2,420 | 5.7 | 2,520 | 4.4 | 2,630 | 3.6 | 2,720 | 4.8 |
| 2,870 | 5.7 | 2,420 | 5.5 | 2,520 | 3.9 | 2,630 | 3.3 | 2,720 | 4.4 |
| 6,120 | 5.7 | 6,080 | 5.5 | 6,120 | 3.9 | 6,210 | 3.3 | 6,530 | 4.4 |
| 6,120 | 4.3 | 6,080 | 3.8 | 6,120 | 3.1 | 6,210 | 2.5 | 6,530 | 4.1 |
| 9,050 | 4.3 | 9,050 | 3.8 | 9,100 | 3.1 | 9,100 | 2.5 | 9,320 | 4.1 |
| [Li$^+$]$_P$ | TE | [Li$^+$]$_P$ | TE | [Li$^+$]$_P$ | TE | [Li$^+$]$_P$ | TE | [Li$^+$]$_P$ | TE |
| 906 | 7.4 | 889 | 7.6 | 940 | 5.6 | 892 | 4.2 | 915 | 5.6 |
| 2,005 | 7.1 | 1,763 | 5.7 | 1,865 | 4.4 | 1,870 | 3.6 | 1,940 | 4.8 |
| 4,495 | 5.7 | 4,250 | 5.5 | 4,320 | 3.9 | 4,420 | 3.3 | 4,625 | 4.4 |
| 7,585 | 4.3 | 7,565 | 3.8 | 7,610 | 3.1 | 7,655 | 2.5 | 7,925 | 4.1 |

[Li+]: lithium concentration in the liquid phase
[Li$^+$]$_P$: average lithium concentration in the liquid phase TE: Evaporation Rate These values obtain the functional dependence on the evaporation rate with the lithium concentration for the months with a low evaporation rate and for the months with a high evaporation rate. In this way it is possible to obtain the evaporation rate for any lithium concentration value within the range for which the tests were carried out. The average annual evaporation rate is obtained by averaging the corresponding rate values for the periods with a high and low evaporation rate. The evaporation rate for the operation of a pond with a given lithium concentration is estimated by multiplying the obtained value for the containers, by factor 0.7.

By way of example, Tables A and B below indicate the evaporation rate values for different lithium concentrations, for periods with a high evaporation rate, low evaporation rate and annual average values.

TABLE A

| | HIGH TE | | | LOW TE | |
|---|---|---|---|---|---|
| [Li$^+$] | Containers TE | Ponds TE | [Li$^+$] | Containers TE | Ponds TE |
| 900 | 7.26 | 5.08 | 900 | 4.80 | 3.36 |
| 1,500 | 6.88 | 4.81 | 1,500 | 4.63 | 3.24 |
| 2,700 | 6.17 | 4.32 | 2,700 | 4.31 | 3.01 |
| 5,000 | 5.02 | 3.51 | 5,000 | 3.75 | 2.63 |
| 8,000 | 3.83 | 2.68 | 8,000 | 3.13 | 2.19 |

TABLE B

| | ANNUAL | |
|---|---|---|
| [Li$^+$] | Containers TE | Ponds TE |
| 900 | 6.03 | 4.22 |
| 1,500 | 5.75 | 3.74 |
| 2,700 | 5.24 | 3.67 |
| 5,000 | 4.39 | 3.07 |
| 8,000 | 3.48 | 2.44 |

FINAL CONCLUSIONS

The procedure object of this invention has innovative advantages in relation to the known procedures that are applied and those that are intended to apply. The main advantages are detailed below:

It has a lithium recovery whose value falls in the range 60%-70%. None of the procedures of prior art (no return of depleted and/or adulterated brine to salt flat) reach these values when lithium recovery is measured as the quantity of lithium contained in the final product (lithium carbonate, lithium hydroxide, lithium chloride, etc.) effectively obtained, divided the quantity of lithium contained in the volume of natural brine extracted from the salt flat for obtaining. It is important to note that natural brine is brine that is not adulterated by discharge of any liquid effluent to the salt flat.

For the processing of the same brine, compared to the procedures that are applied or proposed in prior art, the procedure object of this invention has the lowest specific reagent consumption and, consequently, the lowest generation of solid effluent.

It produces a concentrated brine with low impurity content that is one of the most difficult stages of O-P processes, which are the processes that ensure the non-discharge of depleted and/or adulterated brine, or any other liquid effluent to the salt flat.

It simplifies and facilitates the process of obtaining "raw" and purified lithium carbonate, ensuring the production of a high-purity product.

Obtaining concentrated brine with low impurity content enables to obtain lithium hydroxide without first producing lithium carbonate.

It has sufficient flexibility for the process of obtaining lithium carbonate to be carried out in the vicinity of the location of the ponds, or in any other distant place. For the latter case, it also has sufficient flexibility for the lithium carbonate plant to operate independently from the pond sector, or by transporting the same volume of liquid to and from the plant, thus optimizing the transport cost.

Having maximum recovery ensures a minimum flow of natural brine pumping for the same CLE production. This reduces the risk of the fact that the catchment area of the pumping point affects nearby freshwater aquifers.

As shown in the description above, the procedure object of this patent of invention is fully applicable on an industrial scale. This is a fundamental condition for any procedure proposed for the processing of brine contained in the Argentine Puna, Bolivian Altiplano and Atacama Desert salt flats.

The invention claimed is:

1. A procedure of minimum environmental impact and maximum lithium recovery to obtain concentrated brines with minimum impurity content from brines that embed natural salt flats and salt marshes, the procedure wherein the following stages are comprised:
    a) building fractional crystallization ponds by solar evaporation;
    b) filling ponds with natural brine;
    c) initially pre-concentrating natural brine to the maximum possible lithium concentration in the liquid phase without precipitating lithium-containing salts;
    d) cooling the pre-concentrated brine obtained in stage c) to a temperature of between approximately −8° C. and approximately −6° C. ensuring maximum precipitation of sulfate anion-containing salts in these conditions and separation of a liquid phase in which sulfate anions are minimized;
    e) chemically pre-treating the liquid phase of stage d) by adding stoichiometrically an aqueous calcium chloride solution and/or an aqueous barium chloride solution, and separating crystallized and precipitated calcium sulfate and/or barium sulfate as solid effluent;
    f) pre-concentrating the liquid phase obtained in stage e) to a possible maximum lithium concentration in the same without precipitating lithium-containing salts, so the mass ratio of the magnesium/lithium concentrations is reduced to values less than approximately 2 by crystallization and precipitation of magnesium and potassium salts;
    g) chemically treating the liquid phase of stage f) to minimize the concentration of magnesium, calcium, boron and sulfate in the liquid phase by adding a quantity of water to reduce the lithium concentration by approximately 50%, then adding calcium hydroxide with approximately 10% in excess of the stoichiometric value needed to precipitate all magnesium ions, then adding an aqueous solution containing a stoichiometrically calculated quantity of sulfate anions to precipitate the remaining calcium ions in the liquid phase, then adding an aqueous sodium hydroxide solution in order to increase pH at approximately 11.2, then adding aqueous sodium carbonate solution in order to minimize the calcium ion content in the liquid phase, and then adding an aqueous barium chloride solution containing the stoichiometric quantity needed to precipitate all the sulfate anions contained in the liquid phase; and
    h) concentrating the liquid phase obtained at the stage g), by crystallizing and precipitating by evaporation principally sodium chloride crystals.

2. The procedure of claim 1, wherein brine is obtained with a lithium concentration between approximately 65 g/dm$^3$ and approximately 75 g/dm$^3$, and having the following mass ratios of ion/lithium concentrations: magnesium/lithium<0.00005, potassium/lithium<0.09, calcium/lithium<0.03, sulfate/lithium<0.015 and boron/lithium<0.09.

3. The procedure of claim 1, wherein sodium chloride salt with more than 95% of sodium chloride content is obtained at the stage c) of initial pre-concentration.

4. The procedure of claim 1, wherein at the cooling stage d) selected salts are separated from the group consisting of sodium sulfate, potassium chloride, potassium sulfate and their mixtures, according to the chemical composition of the brine.

5. The procedure of claim 1, wherein the lithium recovery is increased by the efficient wash of solid effluents obtained at the pre-treatment stage e), using a water mass equal to one third of the mass of drained solid effluents obtained.

6. The procedure of claim 1, wherein at the pre-treatment stage e) barium sulfate is obtained from the solid effluents obtained when barium chloride is used.

7. The procedure of claim 1, wherein at the pre-treatment stage e) calcium sulfate is obtained from the solid effluents obtained when calcium chloride is used.

8. The procedure of claim 1, wherein at stage f) the possible maximum lithium concentration allows minimizing the magnesium/lithium ratio.

9. The procedure of claim 1, wherein at the final pre-concentration stage f) a mixture of sodium chloride and potassium chloride is obtained from which potassium chloride can be obtained.

10. The procedure of claim 1, wherein, when necessary, potassium chloride is added to the brine of stage f) to achieve a mass ratio of magnesium/lithium concentrations is reduced to less than approximately 2, without crystallizing lithium-containing salts in their chemical formula.

11. The procedure of claim 1, wherein, when necessary, pre-concentrated brine at the stage f) with more than 35 g/dm$^3$ of lithium is transported to a plant located in a sites with industrial infrastructure where stages g) and h) are performed, by improving the performance of the procedure.

12. The procedure of claim 1, wherein the separated sodium sulfate precipitated in stage d) is used as an input of sulfate anions in stage g).

13. The procedure of claim 1, wherein treatment stage g) is carried out at two substages, wherein at the first substage g.1) calcium hydroxide and sodium sulfate, or other water-soluble sulfates of chemical or mining origin are used as reagents, to reduce the contents of magnesium, calcium and boron; and at the second substage g.2) sodium hydroxide, sodium carbonate and barium chloride are used to reduce the contents of magnesium, calcium and sulfate resulting from the first substage g.1).

14. The procedure of claim 13, wherein when performing the treatment substage g.1) a lithium recovery greater than approximately 95% is obtained due to the separation and wash of solid effluents obtained.

15. The procedure of claim 1, wherein stage h) is carried out using thermally assisted evaporative crystallizers from any primary source.

16. The procedure of claim 15, wherein the procedure allows obtaining fresh water, when stage h) is carried out in a mechanical equipment.

17. The procedure of claim 1, wherein it allows to define and calculate the variables necessary to determine the solar evaporation pond system, auxiliary ponds, accumulation ponds and natural crystallizers used at the different stages of the procedure.

18. The procedure of claim 1, wherein it allows to determine that the volume of water for washing salts separated from brine during the procedure is in the order of the volume of the effective porosity of the crystal bed deposited on the floor of ponds and natural crystallizers, and with the lithium concentration in the liquid phase that embeds crystals.

19. The procedure of claim 11, wherein the quantity of pre-concentrated brine that it is transported to the pond sector from the plant located in the site with industrial infrastructure is the same quantity as the liquid transported from the pond sector to the plant located in the site with industrial infrastructure.

20. The procedure of claim 11, which allows operating the plant located in the site with industrial infrastructure for producing "raw" lithium carbonate and purified lithium carbonate without the need to transport solutions that are recycled to the location of the ponds.

21. The procedure of claim 11, wherein the following is transported to the plant located in the site with industrial infrastructure from any salt flat or salt marsh:

i) pre-concentrated brine with more than 35 g/dm$^3$ of lithium to perform the stages g) and h) to produce the lithium compounds, and ii) treated and concentrated brine with more than 65 g/dm$^3$ of lithium to produce lithium compounds, allowing the production of lithium carbonate and/or lithium hydroxide in the plant located in the site with industrial infrastructure.

22. The procedure of claim 1, wherein after processing the entire brine extracted from the salt flat or salt marsh depleted and/or adulterated brine or any other liquid effluent is not dumped into the basin.

23. The procedure of claim 1, wherein, when necessary, potassium chloride is added to the brine of stage f) to reach a lithium concentration greater than approximately 35 g/dm$^3$, without crystallizing lithium-containing salts in their chemical formula.

* * * * *